US012689944B2

(12) United States Patent
Adachi et al.

(10) Patent No.: US 12,689,944 B2
(45) Date of Patent: Jul. 21, 2026

(54) WIRELESS COMMUNICATION DEVICE

(71) Applicant: KABUSHIKI KAISHA TOSHIBA, Tokyo (JP)

(72) Inventors: Tomoko Adachi, Kawasaki (JP); Masahiro Sekiya, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 783 days.

(21) Appl. No.: 17/903,277

(22) Filed: Sep. 6, 2022

(65) Prior Publication Data

US 2023/0180058 A1      Jun. 8, 2023

(30) Foreign Application Priority Data

Dec. 8, 2021      (JP) ................................. 2021-199331

(51) Int. Cl.
　　*H04W 28/16*　　　(2009.01)
　　*H04B 7/024*　　　(2017.01)
　　*H04W 74/0816*　　(2024.01)

(52) U.S. Cl.
　　CPC ............ *H04W 28/16* (2013.01); *H04B 7/024* (2013.01); *H04W 74/0816* (2013.01)

(58) Field of Classification Search
　　CPC ............. H04W 28/16; H04W 74/0816; H04W 74/085; H04B 7/024
　　See application file for complete search history.

(56) References Cited

U.S. PATENT DOCUMENTS

| | | | | |
|---|---|---|---|---|
| 10,200,989 | B2 | 2/2019 | Huang et al. | |
| 10,536,979 | B2 * | 1/2020 | Ko | ............................ H04L 1/00 |

| | | | | |
|---|---|---|---|---|
| 2017/0055290 | A1 * | 2/2017 | Lv | ..................... H04W 52/0219 |
| 2017/0171723 | A1 | 6/2017 | Adachi | |
| 2018/0279369 | A1 * | 9/2018 | Xing | ..................... H04L 12/189 |
| 2019/0239205 | A1 * | 8/2019 | Ko | ........................ H04W 72/20 |
| 2020/0076551 | A1 | 3/2020 | Cherian et al. | |
| 2020/0120544 | A1 | 4/2020 | Liu et al. | |

(Continued)

FOREIGN PATENT DOCUMENTS

| | | |
|---|---|---|
| JP | 2020014235 A | 1/2020 |
| JP | 2023043967 A | 3/2023 |
| WO | 2021147934 A1 | 7/2021 |

OTHER PUBLICATIONS

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications", IEEE Std 802.11axTM-2021 (Amendment to IEEE Std 802.11-2020), 2021, pp. 1-767, DOI: 10.1109/IEEESTD.2021. 9442429.

(Continued)

*Primary Examiner* — Angela Widhalm De Rodriguez
(74) *Attorney, Agent, or Firm* — Holtz, Holtz & Volek PC

(57)　　　　　　ABSTRACT

According to one embodiment, a wireless communication device updates a first parameter when a received packet is from a first communication group, updates a second parameter when the received packet is not from the first communication group and is from an extended communication group, updates a third parameter when the received packet is not from the first communication group and is from the extended communication group, and determines whether to communicate a packet based on the first, second, and third parameter.

9 Claims, 30 Drawing Sheets

(56)        References Cited

U.S. PATENT DOCUMENTS

| | | | |
|---|---|---|---|
| 2020/0229233 A1 | 7/2020 | Huang et al. | |
| 2020/0260488 A1* | 8/2020 | Cherian | H04W 56/001 |
| 2020/0267636 A1 | 8/2020 | Cavalcanti et al. | |
| 2021/0051722 A1 | 2/2021 | Huang et al. | |
| 2021/0111855 A1* | 4/2021 | Verma | H04W 72/044 |
| 2021/0143884 A1 | 5/2021 | Kwon et al. | |
| 2021/0307064 A1* | 9/2021 | Ryu | H04W 74/0808 |
| 2021/0329698 A1* | 10/2021 | Jang | H04W 80/02 |
| 2022/0104257 A1* | 3/2022 | Ryu | H04W 74/0866 |
| 2023/0007708 A1 | 1/2023 | Sun et al. | |
| 2023/0090228 A1 | 3/2023 | Sekiya et al. | |

OTHER PUBLICATIONS

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications", IEEE Std 802.11TM-2020 (Revision of IEEE Std 802.11-2016), 2021, pp. 1-4379, DOI: 10.1109/IEEESTD.2021.9363693.

Au, "Compendium of straw polls and potential changes to the Specification Framework Document Part 2", IEEE 802.11-20/1935r44, Wireless LANs, Sep. 23, 2021.

Au, "Specification framework for TGbe", IEEE 802.11-19/1262r23, Wireless LANs, Jan. 17, 2021.

Verma, et al., "Coordinated AP Time/Frequency Sharing in a Transmit Opportunity in 11be", Nov. 2019, 16 pages, doc.: IEEE 802.11-19/1582r1.

Japanese Office Action (and English translation thereof) dated Jan. 7, 2025, issued in counterpart Japanese Application No. 2021-199331.

* cited by examiner

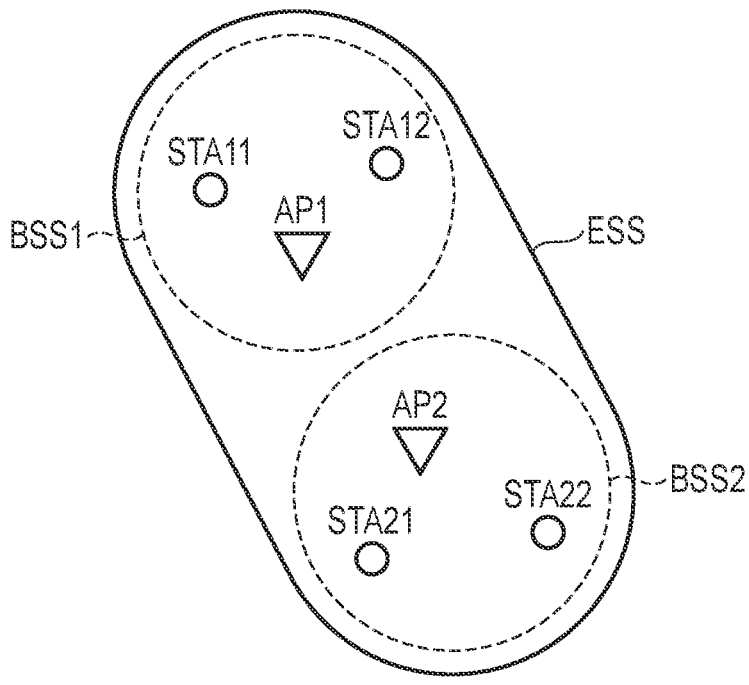
F I G. 1

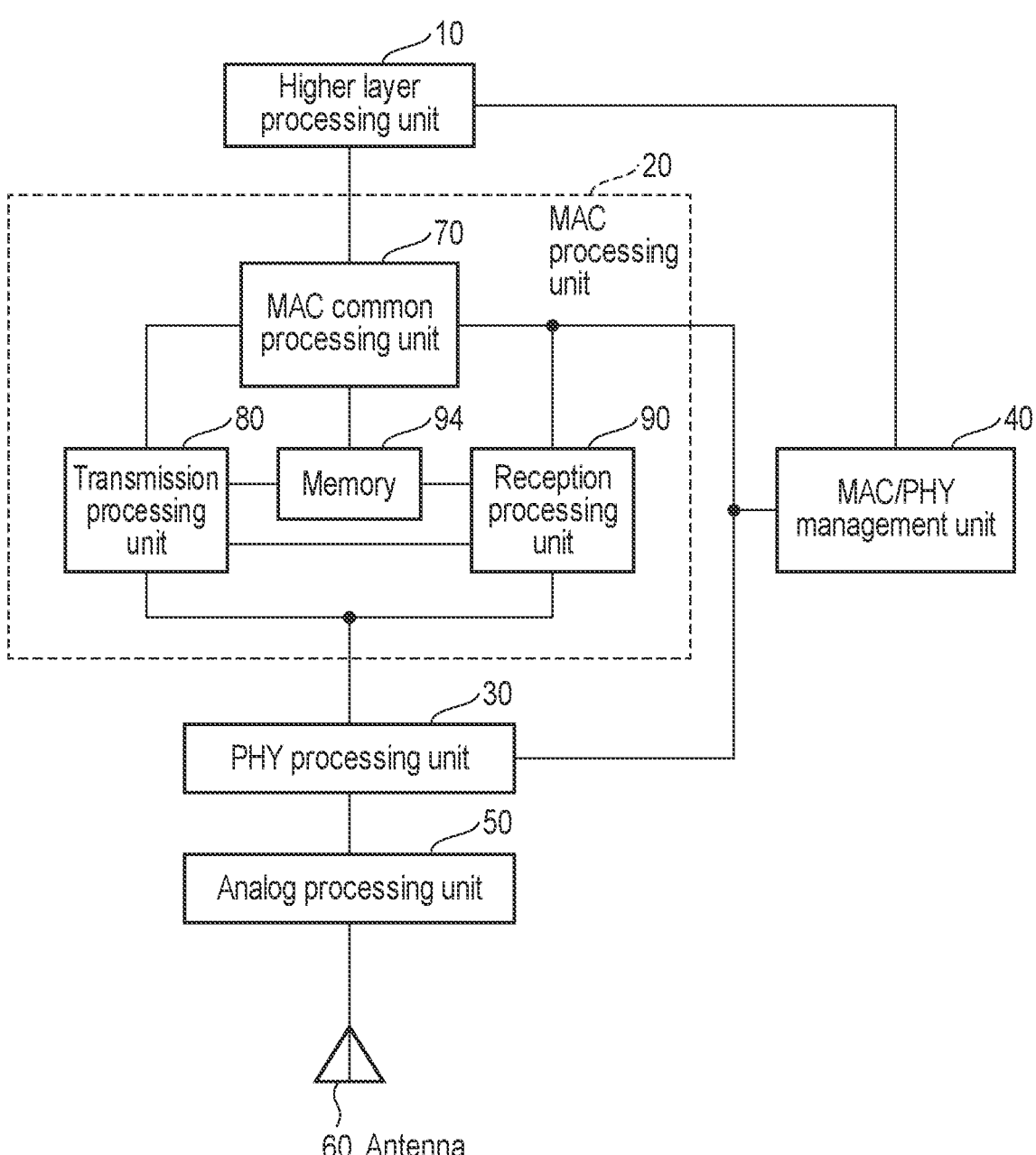
F I G. 2

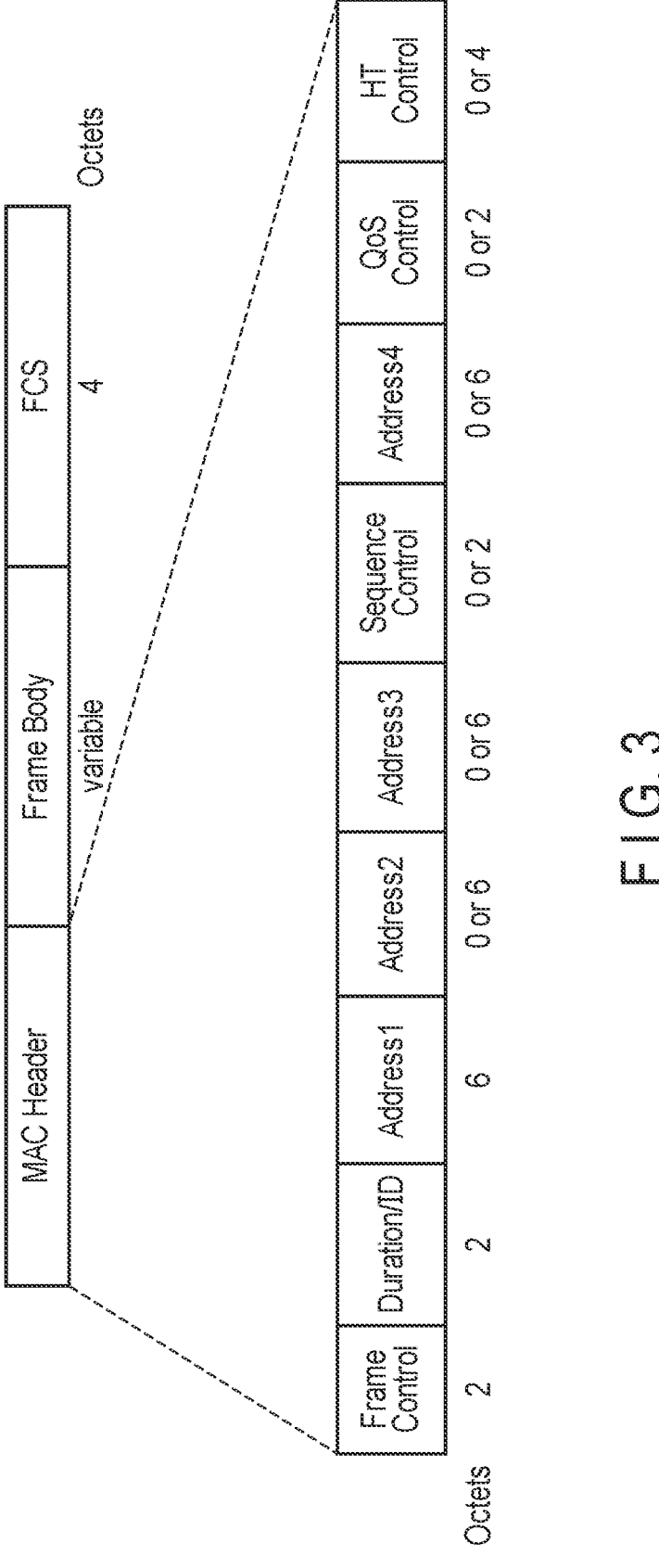
F I G. 3

| | Basic NAV | Intra-BSS NAV | Obtaining transmission opportunity | Response to Trigger frame |
|---|---|---|---|---|
| (1) | Non-zero | Non-zero | Disable | Disable |
| (2) | Non-zero | Zero | Disable | Disable |
| (3) | Zero | Non-zero | Disable | Enable |
| (4) | Zero | Zero | Enable | Enable |

F I G. 4

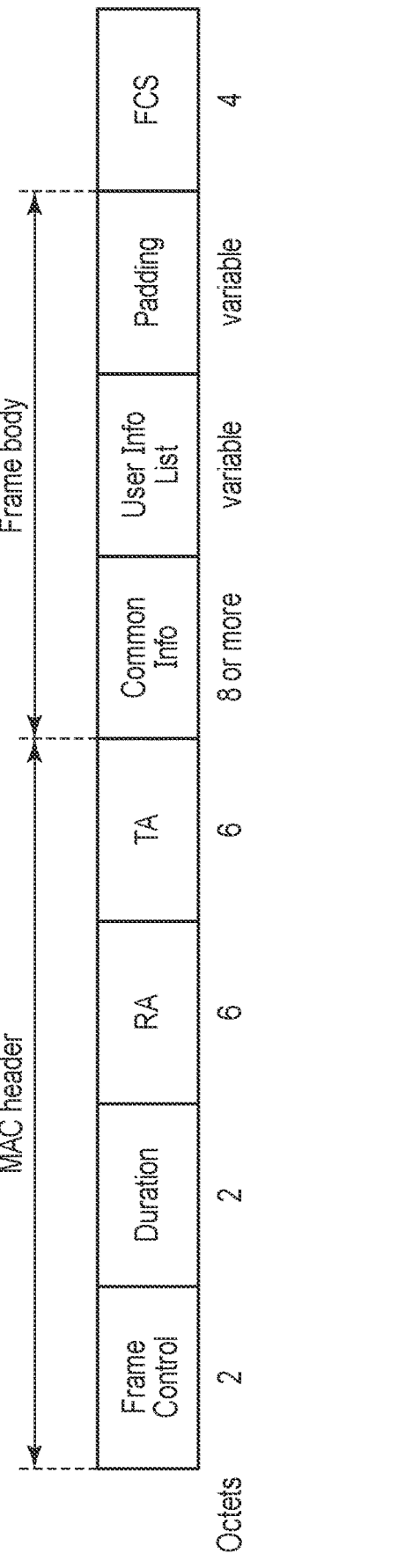
F I G. 5

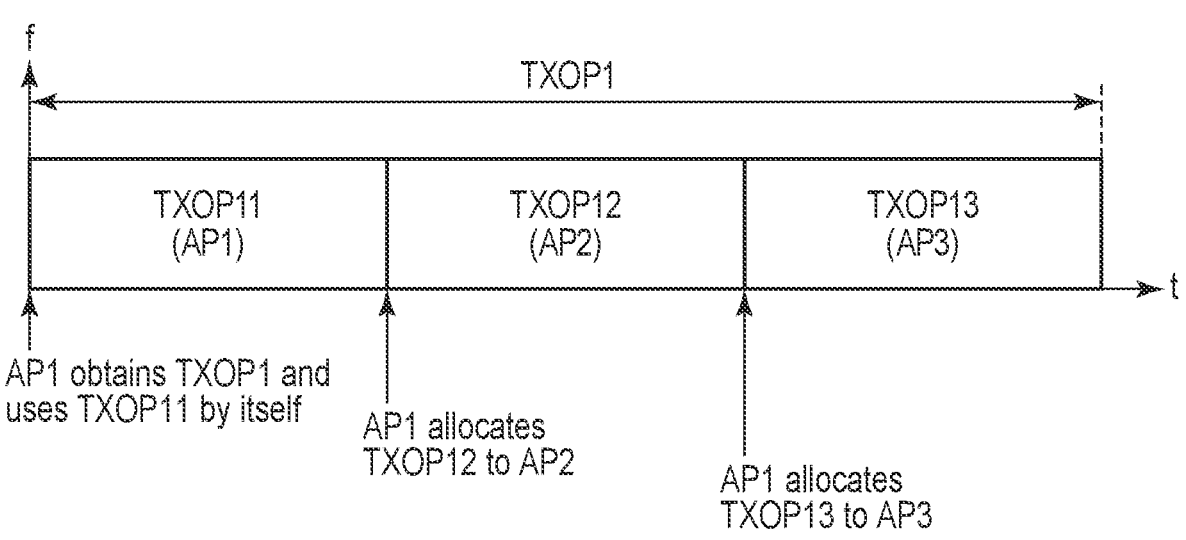
F I G. 6
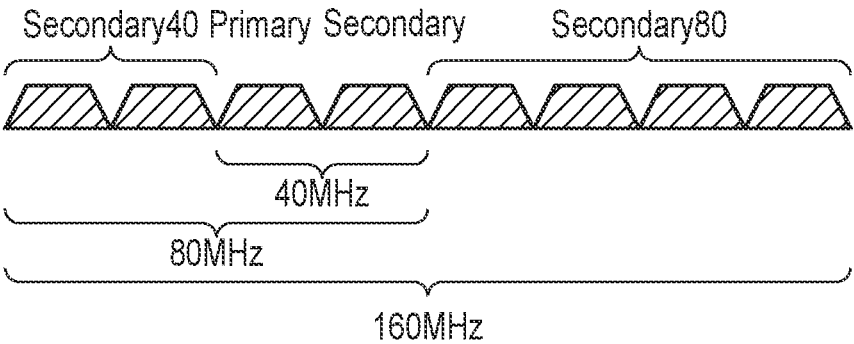
F I G. 7A
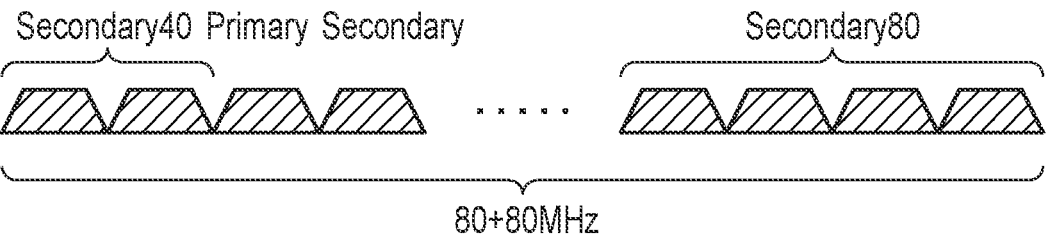
F I G. 7B

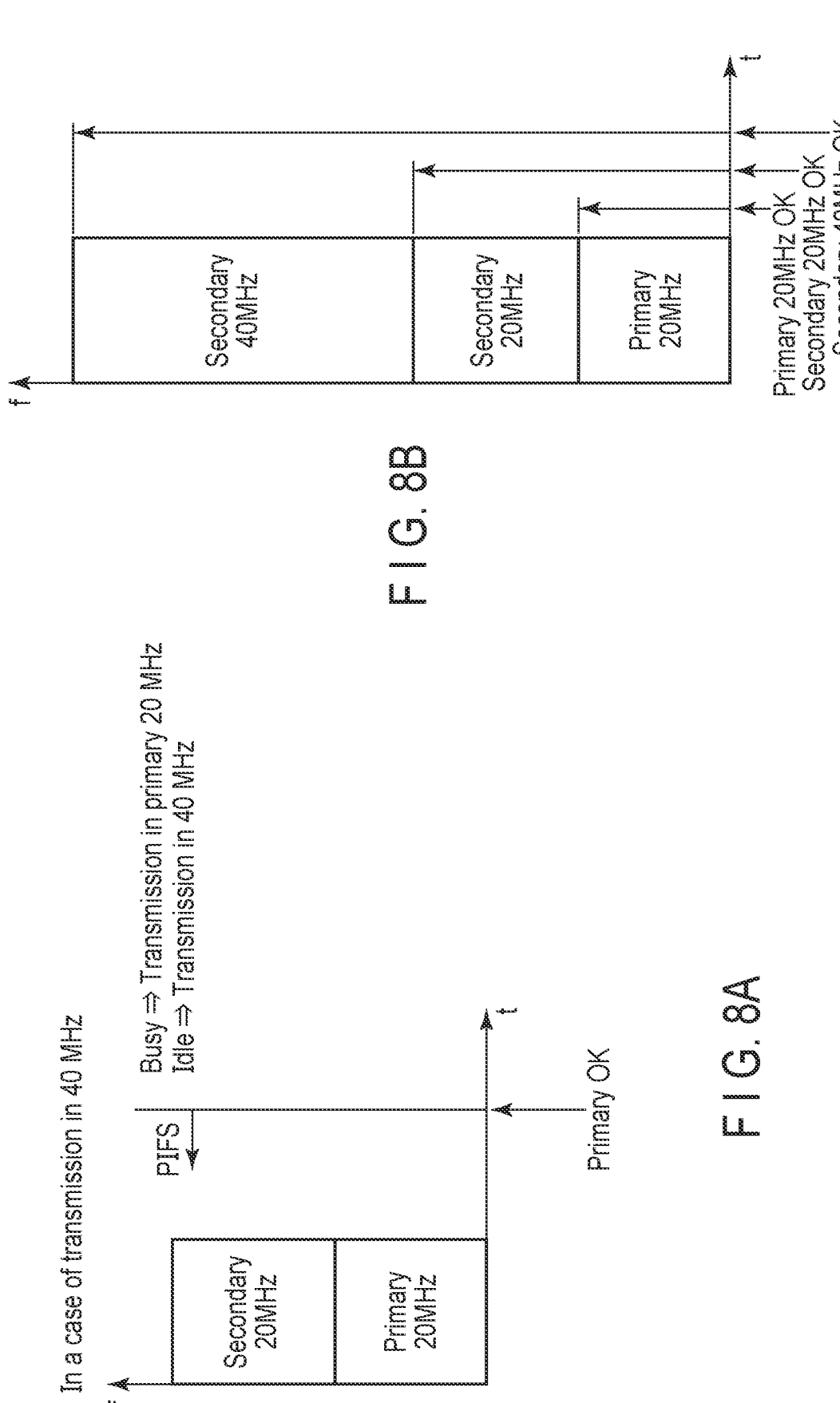
F I G. 8B
F I G. 8A

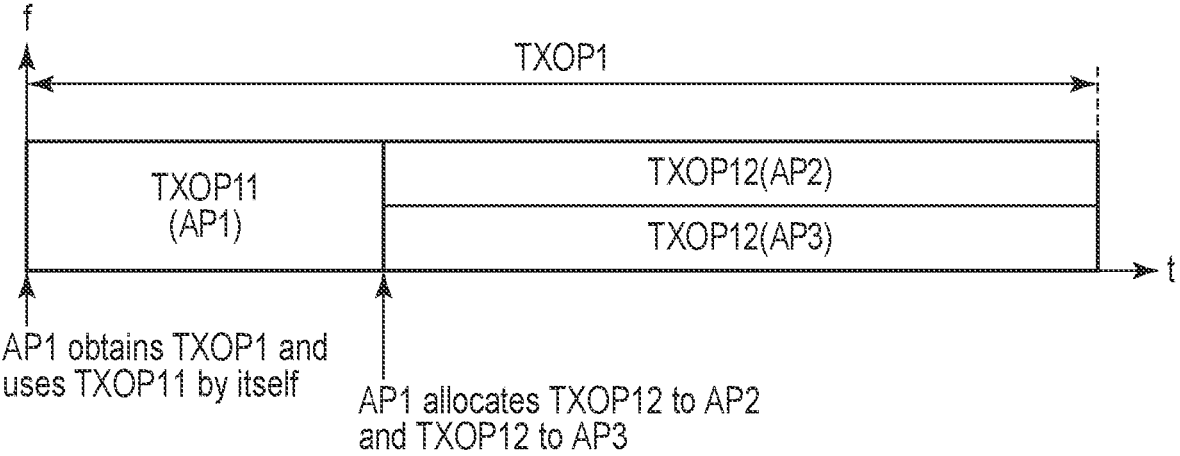
F I G. 9
| Element ID | Length | Element ID Extension | Information |
|---|---|---|---|
| 1 | 1 | 0 or 1 | variable |
Octets
F I G. 10

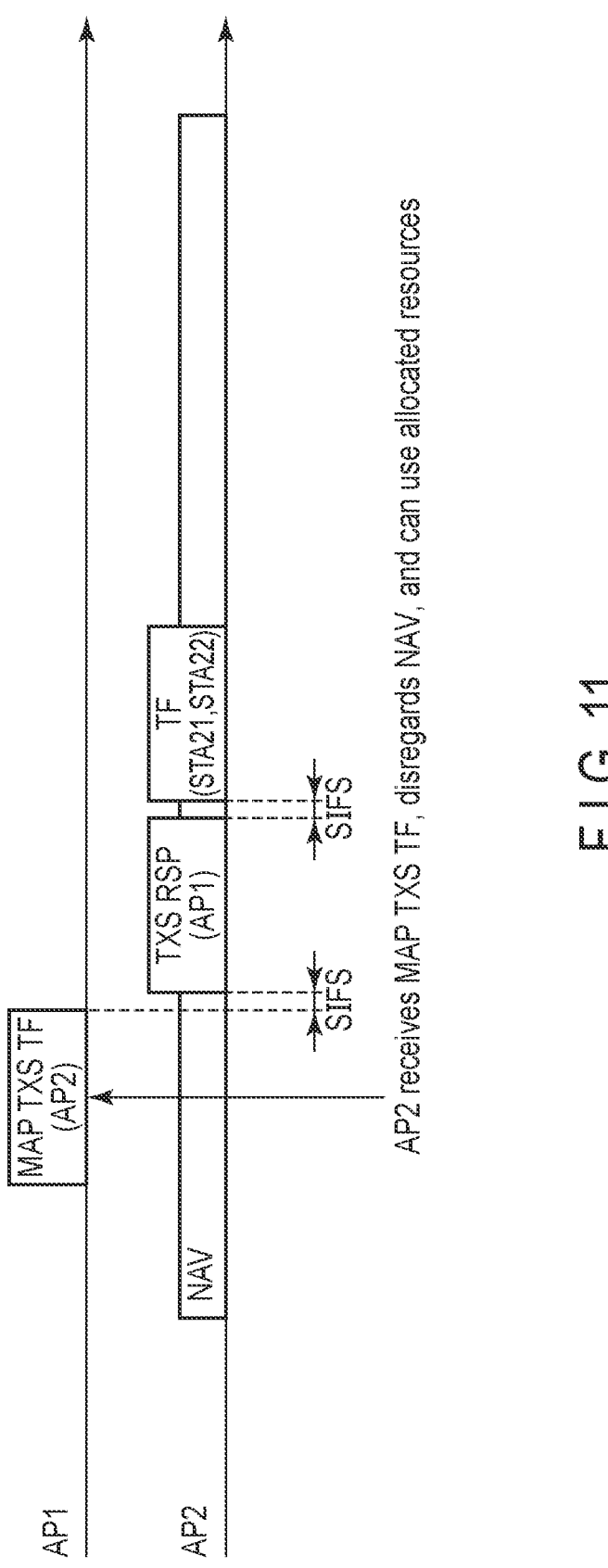
F I G. 11

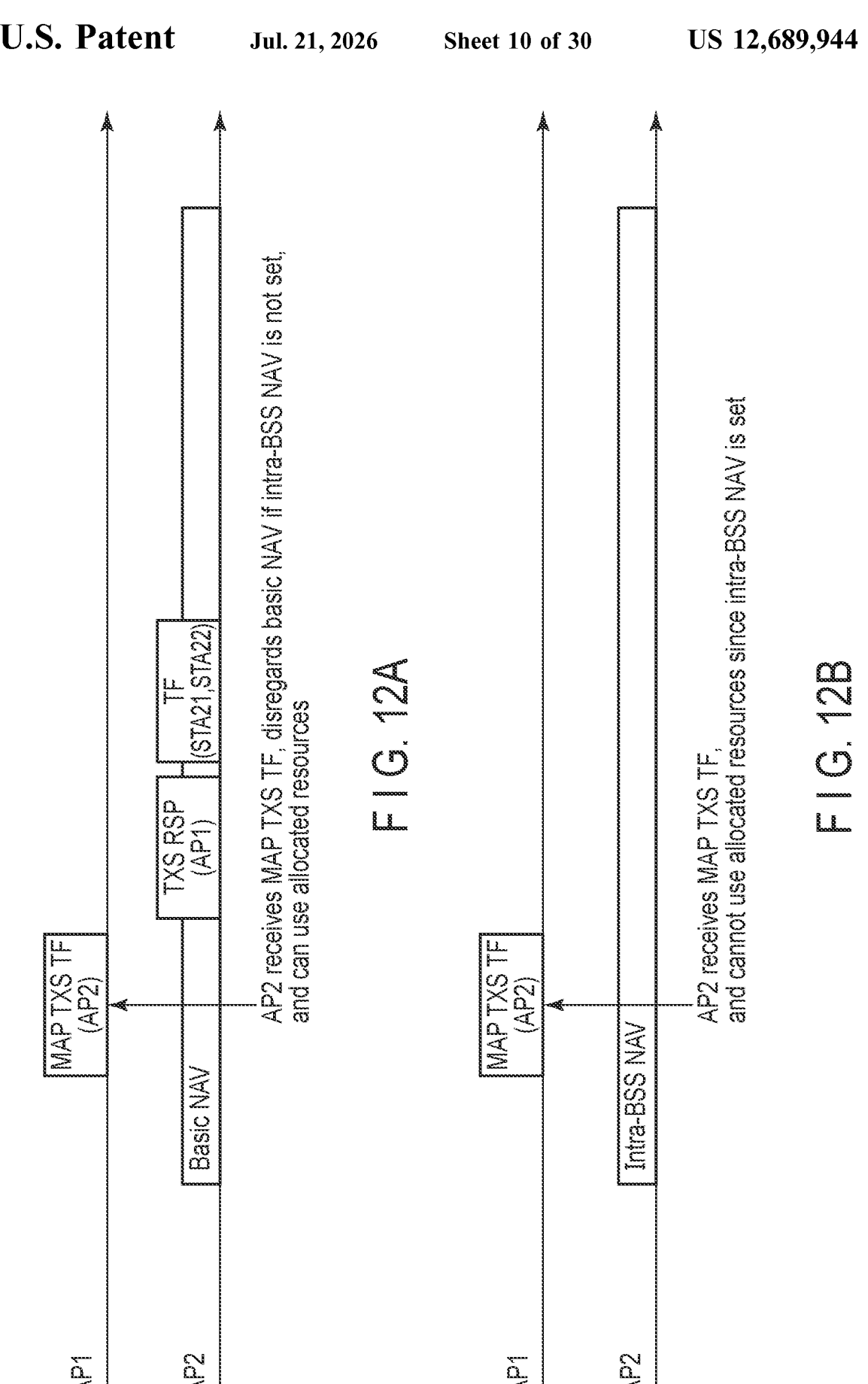
F I G. 12A
F I G. 12B

| | Basic NAV | Intra-BSS NAV | Obtaining transmission opportunity | MAP transmission |
|---|---|---|---|---|
| (1) | Non-zero | Non-zero | Disable | Disable |
| (2) | Non-zero | Zero | Disable | Enable |
| (3) | Zero | Non-zero | Disable | Disable |
| (4) | Zero | Zero | Enable | Enable |

F I G. 13

F I G. 14A

F I G. 14B

|  | Basic NAV | ESS NAV | Obtaining transmission opportunity | MAP transmission |
|---|---|---|---|---|
| (1) | Non-zero | Non-zero | Disable | Disable |
| (2) | Non-zero | Zero | Disable | Disable |
| (3) | Zero | Non-zero | Disable | Enable |
| (4) | Zero | Zero | Enable | Enable |

F I G. 15

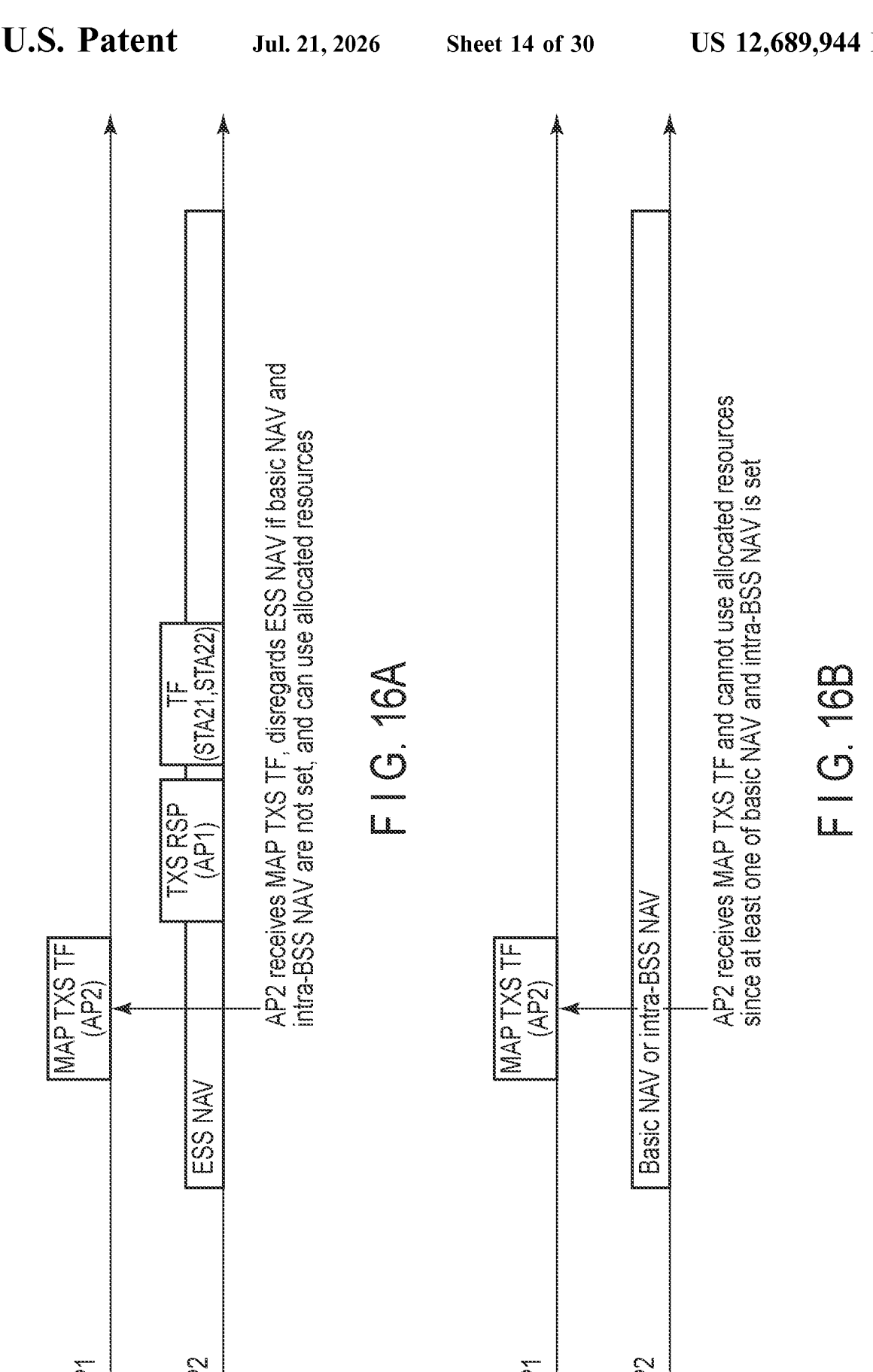
F I G. 16A
F I G. 16B

| | Basic NAV | Intra-BSS NAV | ESS NAV | Obtaining transmission opportunity | MAP transmission |
|---|---|---|---|---|---|
| (1) | Non-zero | Non-zero | Non-zero | Disable | Disable |
| (2) | Non-zero | Non-zero | Zero | Disable | Disable |
| (3) | Non-zero | Zero | Non-zero | Disable | Disable |
| (4) | Non-zero | Zero | Zero | Disable | Disable |
| (5) | Zero | Non-zero | Non-zero | Disable | Disable |
| (6) | Zero | Non-zero | Zero | Disable | Disable |
| (7) | Zero | Zero | Non-zero | Disable | Enable |
| (8) | Zero | Zero | Zero | Enable | Enable |

F I G. 17

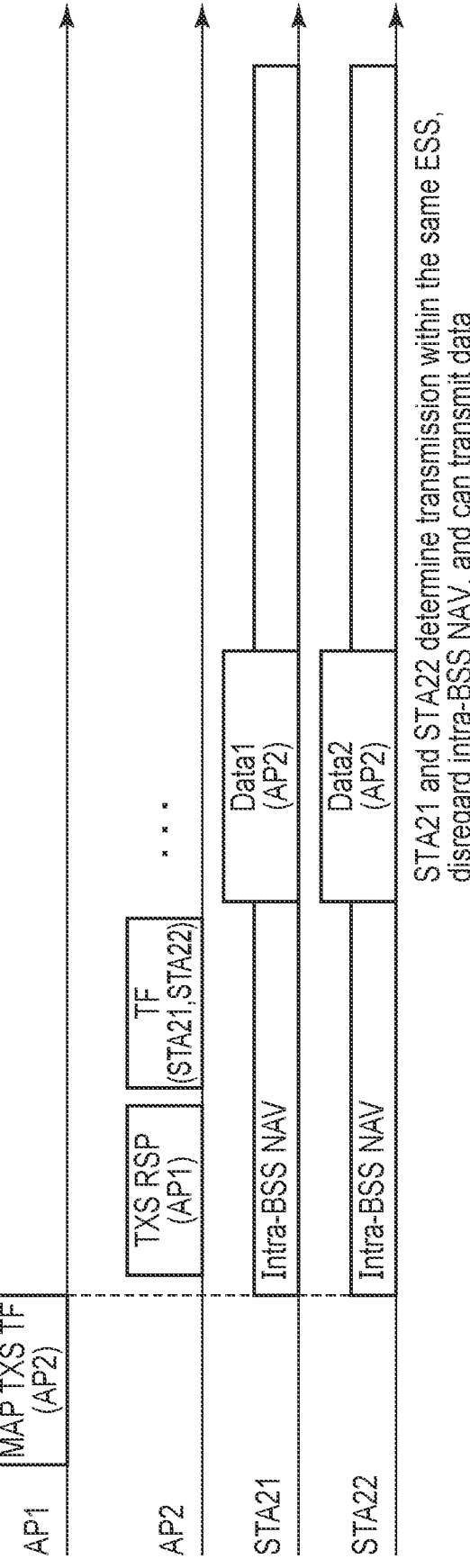
F I G. 18

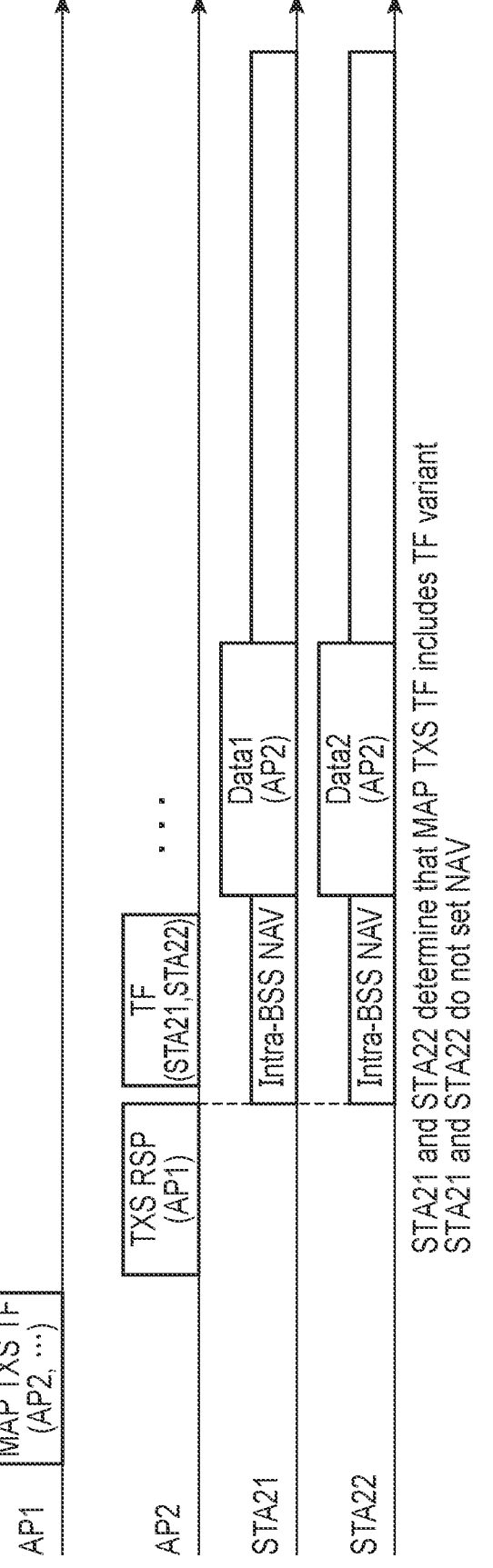
F I G. 20

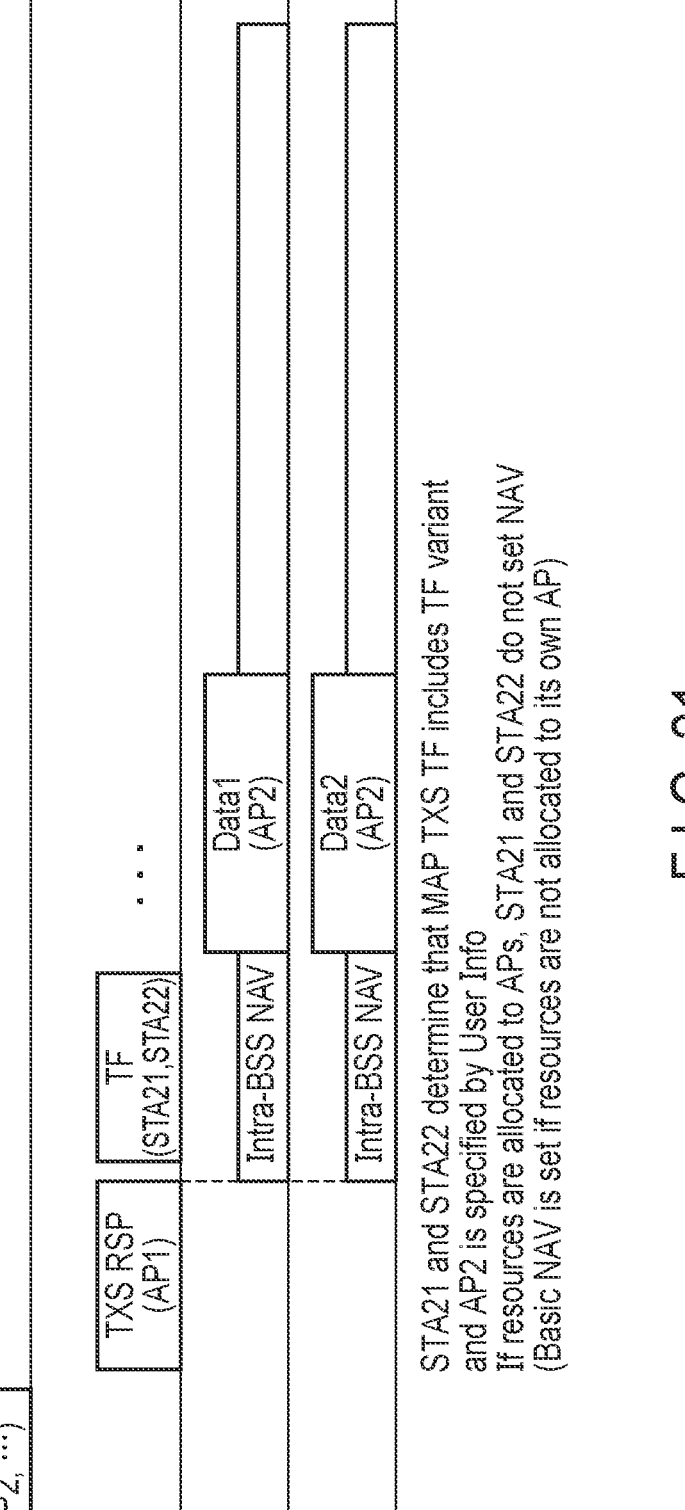
F I G. 21

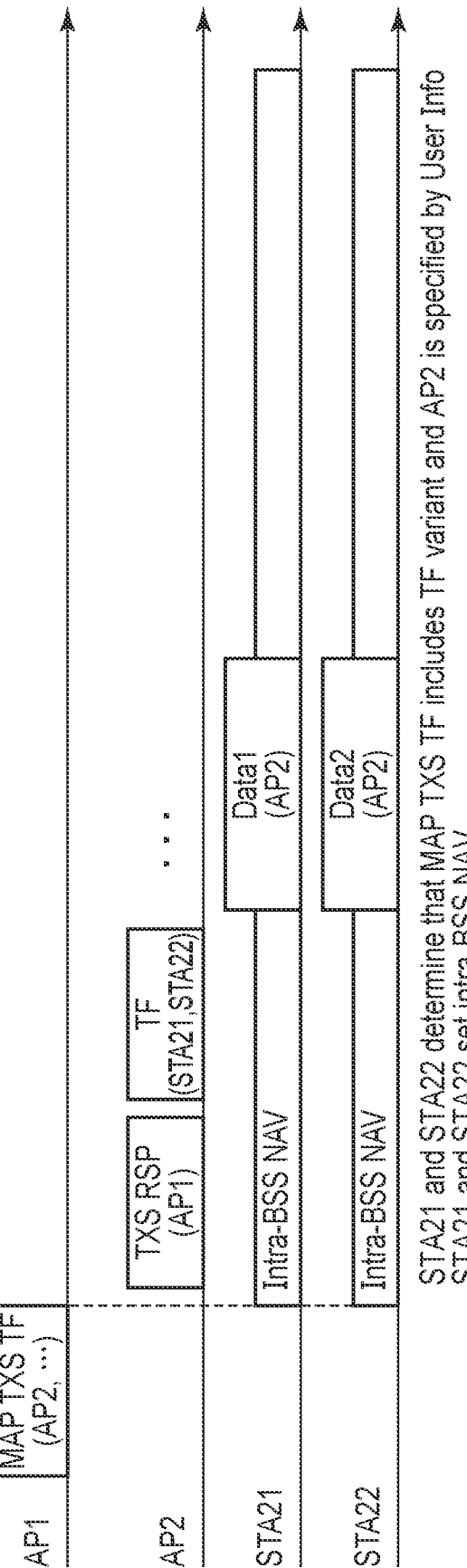
F I G. 22

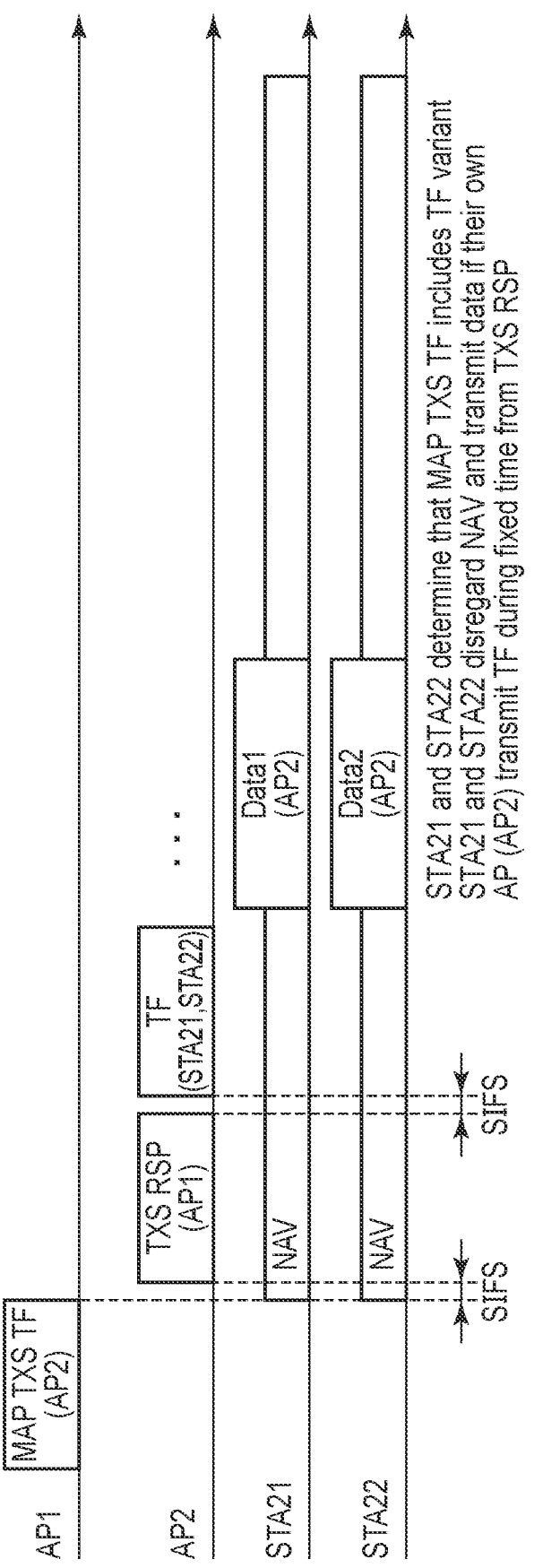
F I G. 23

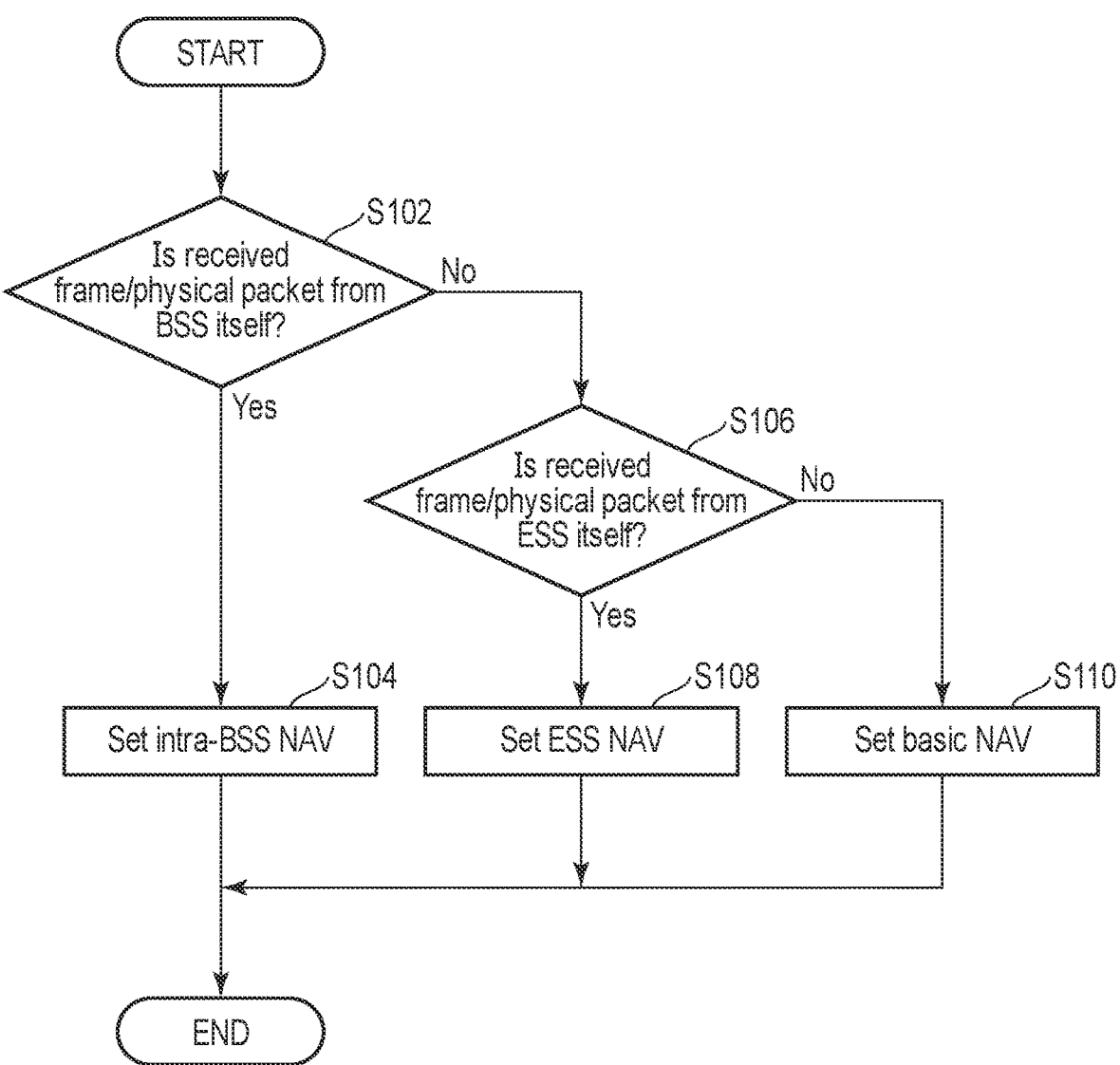
F I G. 24

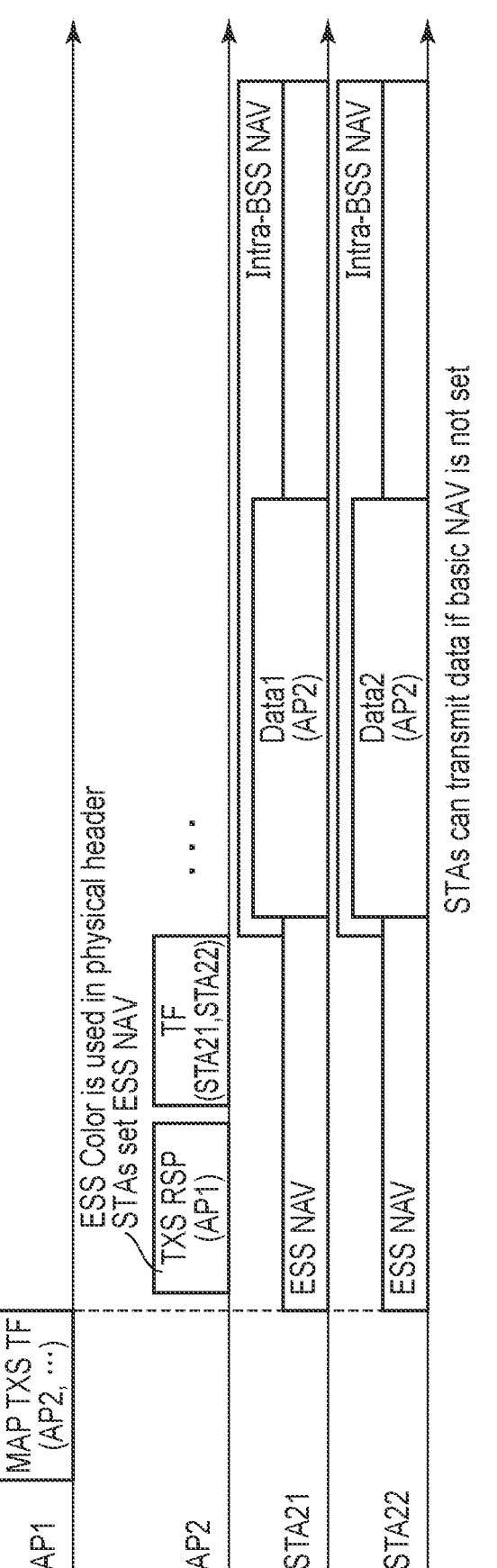
F I G. 25

| | Basic NAV | Intra-BSS NAV | ESS NAV | Obtaining transmission opportunity | Response to Trigger frame @non-AP | MAP transmission @AP |
|---|---|---|---|---|---|---|
| (1) | Non-zero | Non-zero | Non-zero | Disable | Disable | Disable |
| (2) | Non-zero | Non-zero | Zero | Disable | Disable | Disable |
| (3) | Non-zero | Zero | Non-zero | Disable | Disable | Disable |
| (4) | Non-zero | Zero | Zero | Disable | Disable | Disable |
| (5) | Zero | Non-zero | Non-zero | Disable | Enable | Disable |
| (6) | Zero | Non-zero | Zero | Disable | Enable | Disable |
| (7) | Zero | Zero | Non-zero | Disable | Enable | Enable |
| (8) | Zero | Zero | Zero | Enable | Enable | Enable |

F I G. 26

| Frame Control | Duration | RA | BSSID(TA) | FCS |
|---|---|---|---|---|
| 2 | 2 | 6 | 6 | 4 |
Octets
F I G. 27
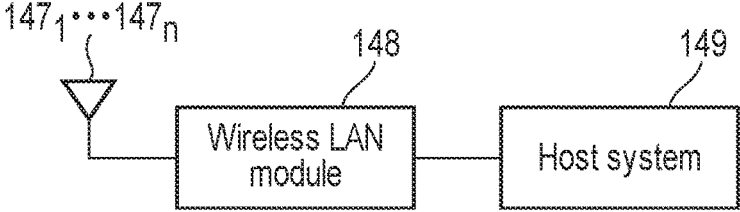
$147_1 \cdots 147_n$
148
149
Wireless LAN module
Host system
F I G. 30

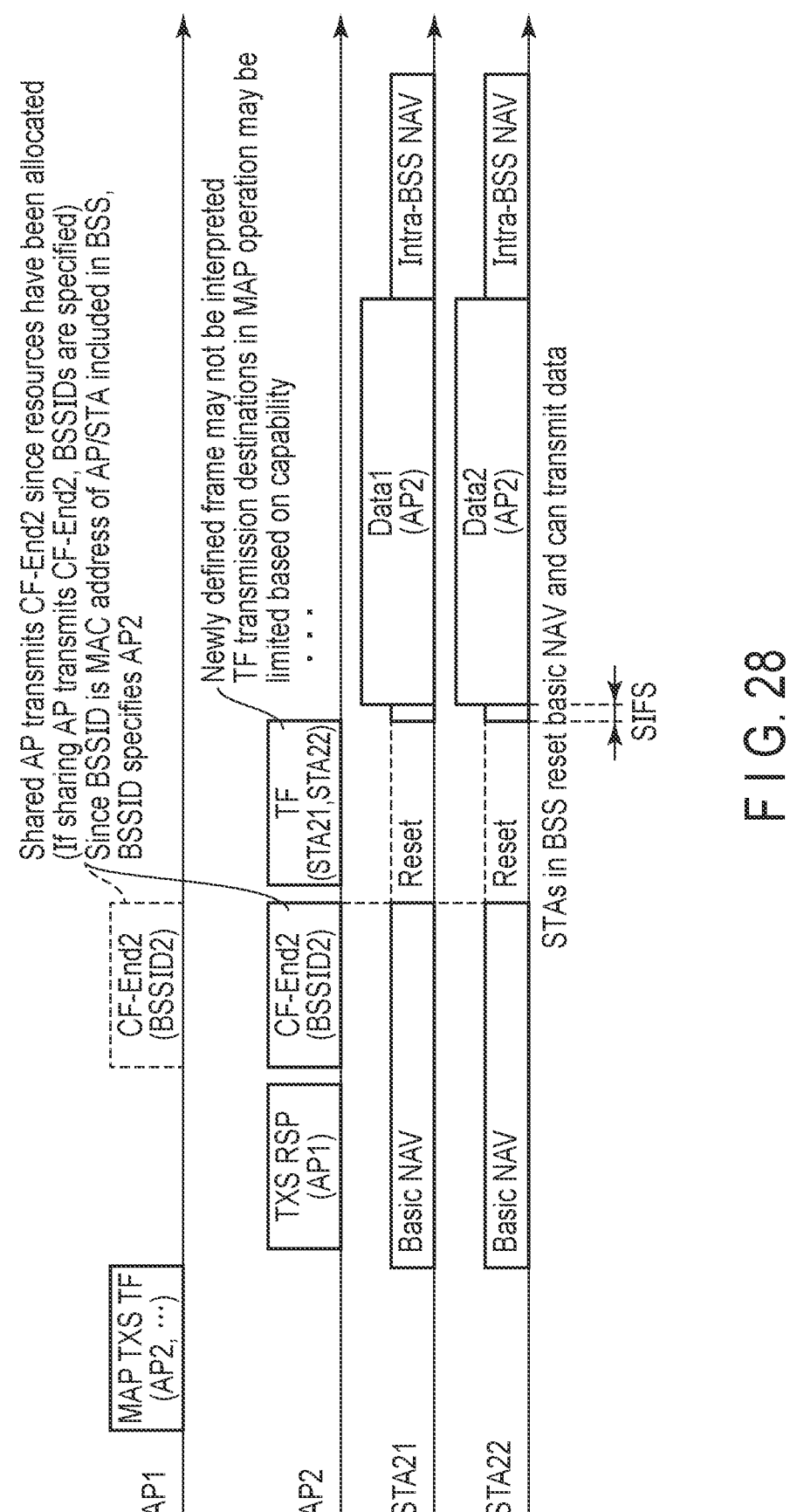
F I G. 28

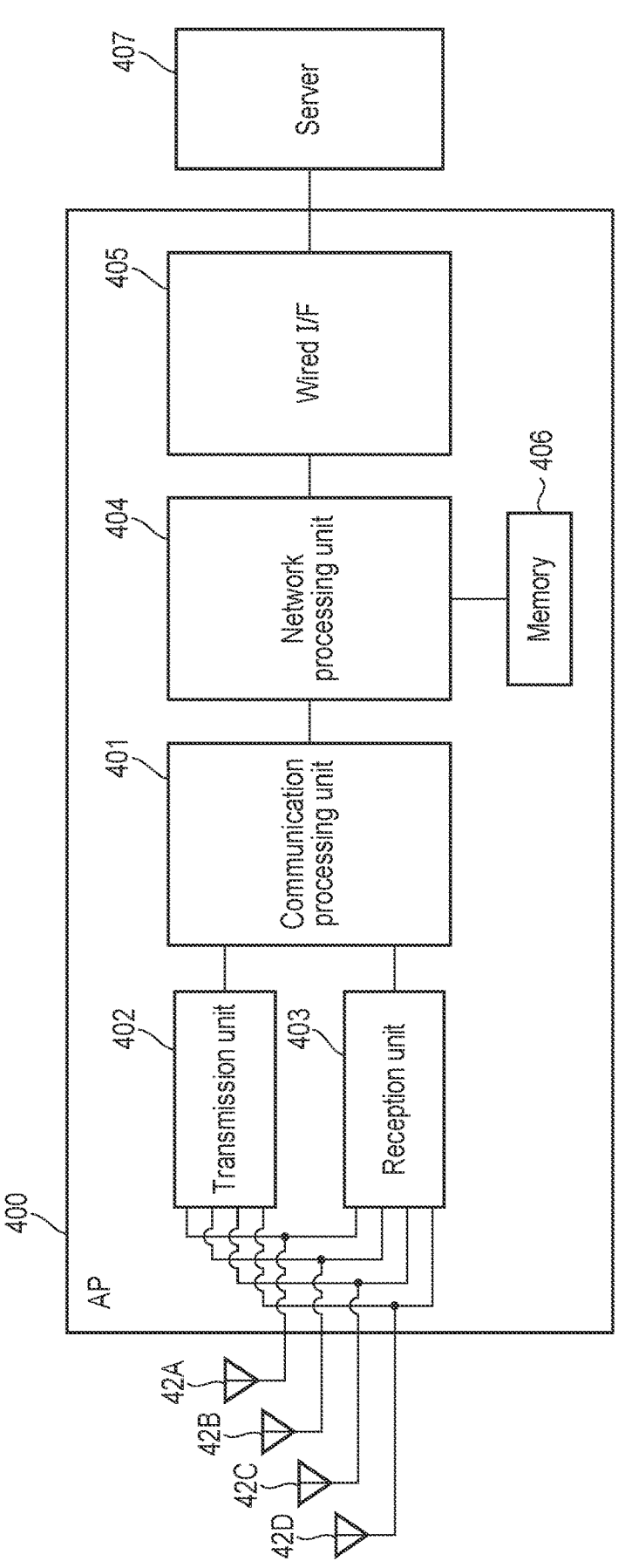
F I G. 29

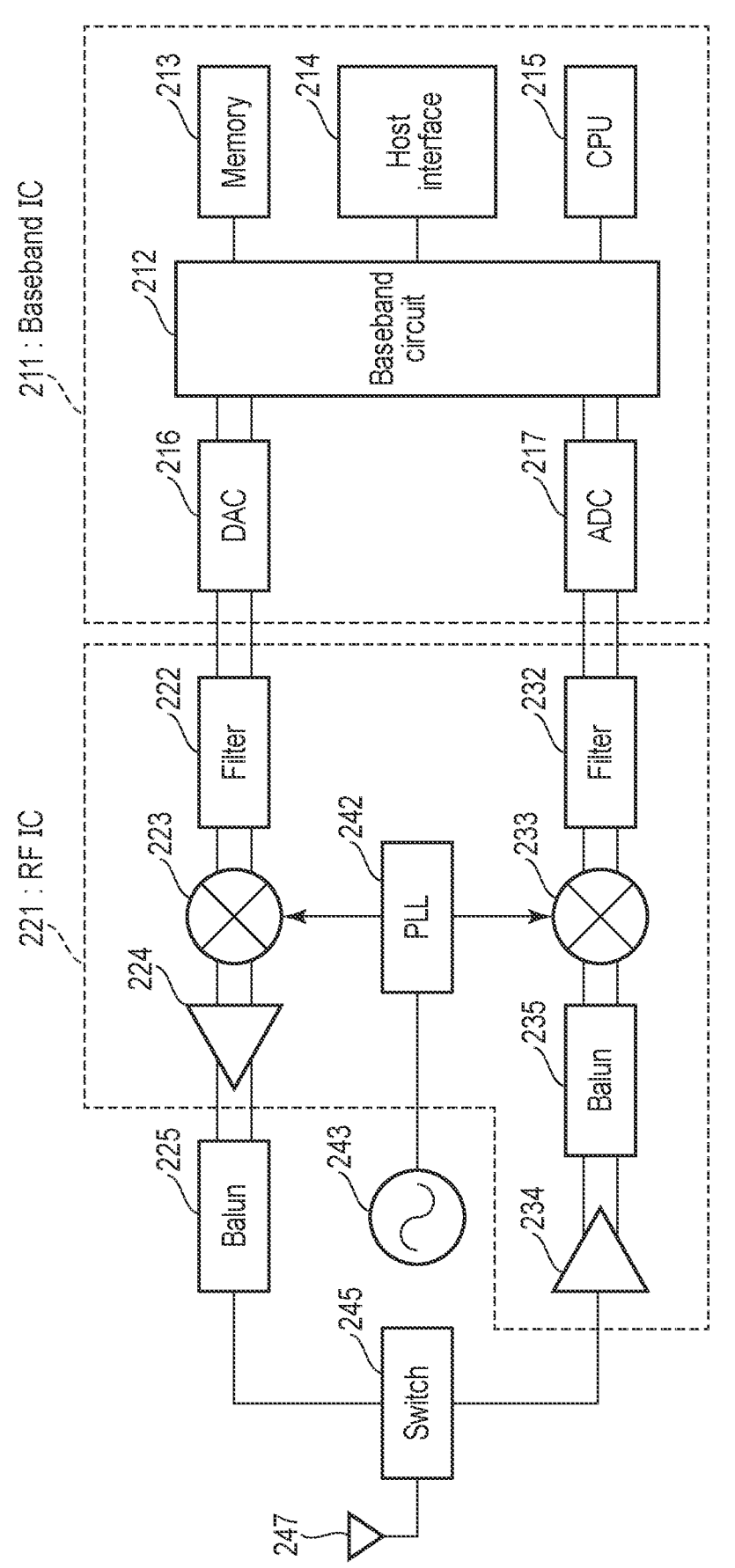
F I G. 31

F I G. 32A
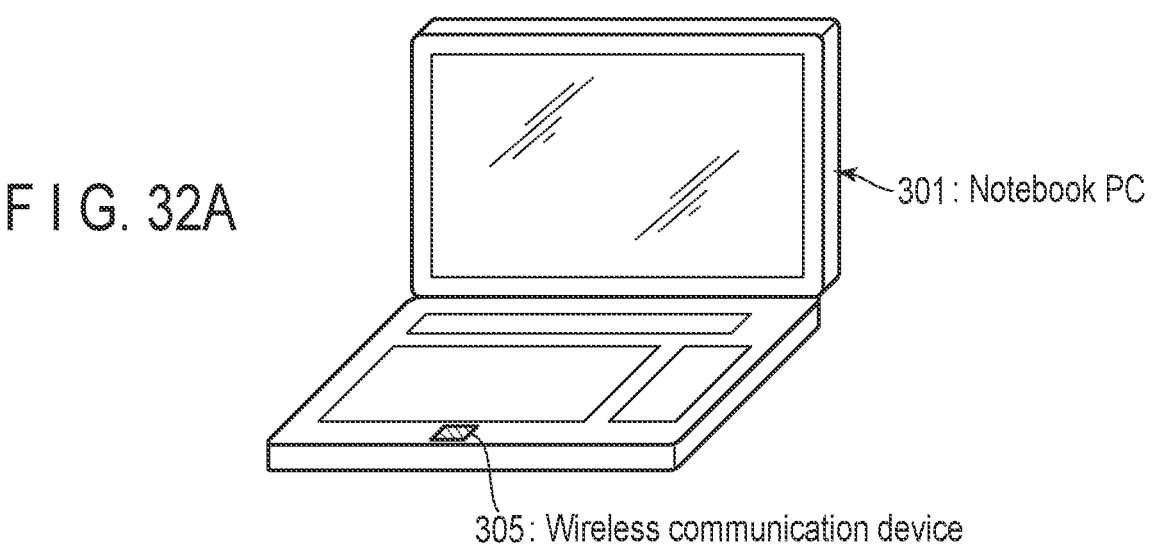
301 : Notebook PC
305 : Wireless communication device
F I G. 32B
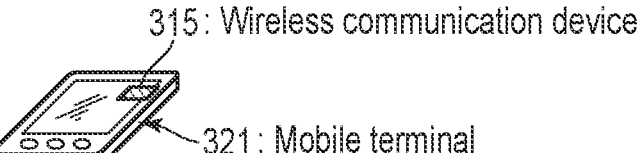
315 : Wireless communication device
321 : Mobile terminal
331 : Memory card
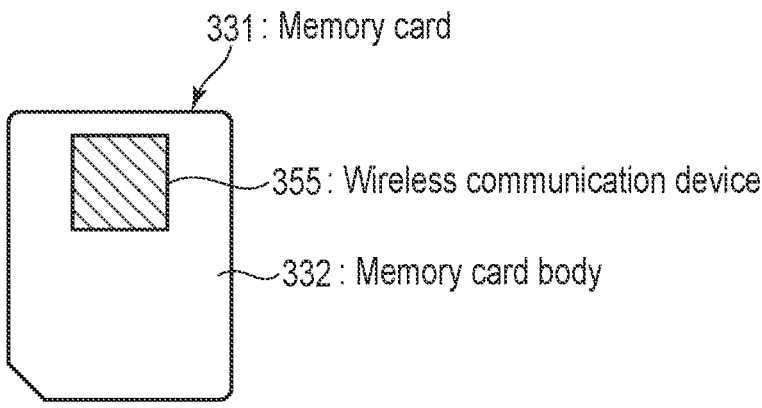
355 : Wireless communication device
332 : Memory card body
F I G. 33

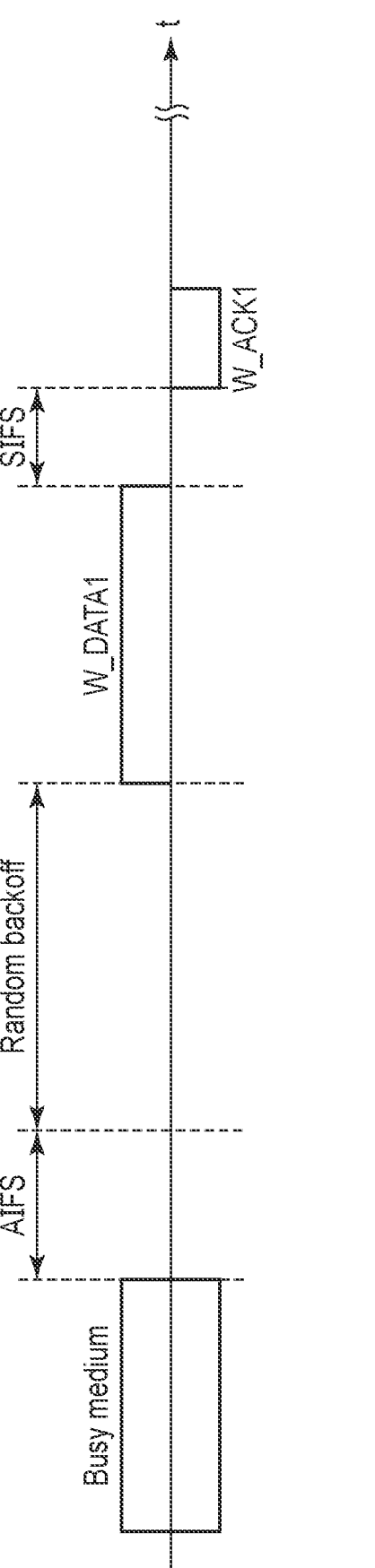
F I G. 34

WIRELESS COMMUNICATION DEVICE

CROSS-REFERENCE TO RELATED APPLICATIONS

This application is based upon and claims the benefit of priority from Japanese Patent Application No. 2021-199331, filed Dec. 8, 2021, the entire contents of which are incorporated herein by reference.

FIELD

Embodiments described herein relate generally to a wireless communication device.

BACKGROUND

In a wireless local area network (LAN) system, a cooperative operation of a plurality of access points (APs), which are also referred to as base stations, has been proposed. As an example, a method has been proposed in which an AP obtains transmission opportunity (TXOP) and allocates wireless resources during transmission opportunity, such as time and frequency, to other APs. It has been decided to adopt the concept of the method in the 802.11 Task Group (TG) be for the next generation high-speed wireless LAN standard.

However, in a wireless communication system using carrier sense multiple access with collision avoidance (CSMA/CA), a network allocation vector (NAV) is set to protect the TXOP. Thus, if the proposed method is simply applied to the wireless communication system using the CSMA/CA, an AP or its subordinate non-AP STA (also referred to as simply a STA or a station hereinafter), to which wireless resources are allocated, cannot transmit a frame in the allocated resources.

BRIEF DESCRIPTION OF THE DRAWINGS

FIG. 1 shows an example of a wireless communication system according to an embodiment.

FIG. 2 shows an example of a wireless communication device according to the embodiment.

FIG. 3 is a diagram showing a basic format of a MAC frame.

FIG. 4 is a diagram showing whether UL MU transmission can be performed in response to a Trigger frame, depending on the relationship between the setting state of a basic NAV and an intra-BSS NAV.

FIG. 5 is a diagram showing an example of the format of the Trigger frame.

FIG. 6 shows an example of MAP in which part of the wireless resources (time) of the TXOP obtained by the sharing AP is divided by time and allocated to the shared AP.

FIG. 7A shows a diagram illustrating an example of the channel bonding.

FIG. 7B shows a diagram illustrating another example of the channel bonding.

FIG. 8A illustrates an example of a transmission opportunity obtaining method.

FIG. 8B illustrates another example of the transmission opportunity obtaining method.

FIG. 9 shows an example of MAP in which part of the wireless resources (time) of the TXOP obtained by the sharing AP itself is divided into resources by frequency and the resources are shared with sharing APs.

FIG. 10 shows an example of the format of an Information Element included in a Frame Body of the MAC frame.

FIG. 11 is an illustration of example 1 of AP operation.

FIG. 12A is a diagram illustrating example 2 of AP operation performed when only the basic NAV is set.

FIG. 12B is a diagram illustrating example 2 of AP operation performed when the intra-NAV is set.

FIG. 13 shows the relationship between the setting state of two NAVs and the state as to whether an AP can use part of the wireless resources of the TXOP allocated from another AP in example 2 of AP operation.

FIG. 14A is a diagram illustrating an example 3 of AP operation performed when only the ESS NAV is set.

FIG. 14B is a diagram illustrating example 3 of AP operation performed when the basic NAV is set.

FIG. 15 shows the relationship between the setting state of two NAVs and the state as to whether an AP can use part of the wireless resources of the TXOP allocated from another AP.

FIG. 16A is a diagram illustrating an example 4 of AP operation performed when only the ESS NAV is set.

FIG. 16B is a diagram illustrating example 4 of AP operation performed when at least one of the basic NAV and intra-BSS NAV is set.

FIG. 17 shows the relationship between the setting state of three NAVs and the state as to whether an AP can use part of the wireless resources of the TXOP allocated from another AP.

FIG. 18 is a diagram illustrating an example 1 of STA operation.

FIG. 20 is a diagram illustrating an example 2 of STA operation.

FIG. 21 is a diagram illustrating an example 3 of STA operation.

FIG. 22 is a diagram illustrating an example 4 of STA operation.

FIG. 23 is a diagram illustrating an example 5 of the STA operation.

FIG. 24 is a flowchart showing an example of the NAV setting in example 6 of the STA operation.

FIG. 25 is a diagram illustrating an example 6 of the STA operation.

FIG. 26 shows how three NAVs are set such that a STA can respond to the TF from the AP itself.

FIG. 27 shows an example of the format of a CF-End frame.

FIG. 28 is a diagram illustrating an example 7 of the STA operation.

FIG. 29 is a functional block diagram of an AP.

FIG. 30 shows an example of the overall configuration of the STA (non-AP STA) or the AP.

FIG. 31 shows a hardware configuration example of a wireless LAN module.

FIG. 32A is a perspective view of an example of a wireless STA.

FIG. 32B is a perspective view of another example of a wireless STA.

FIG. 33 shows an example in which the wireless communication device is mounted on a memory card.

FIG. 34 shows an example of frame exchange in a collision period based on the random access in IEEE 802.11 wireless LAN.

DETAILED DESCRIPTION

Figure 19:
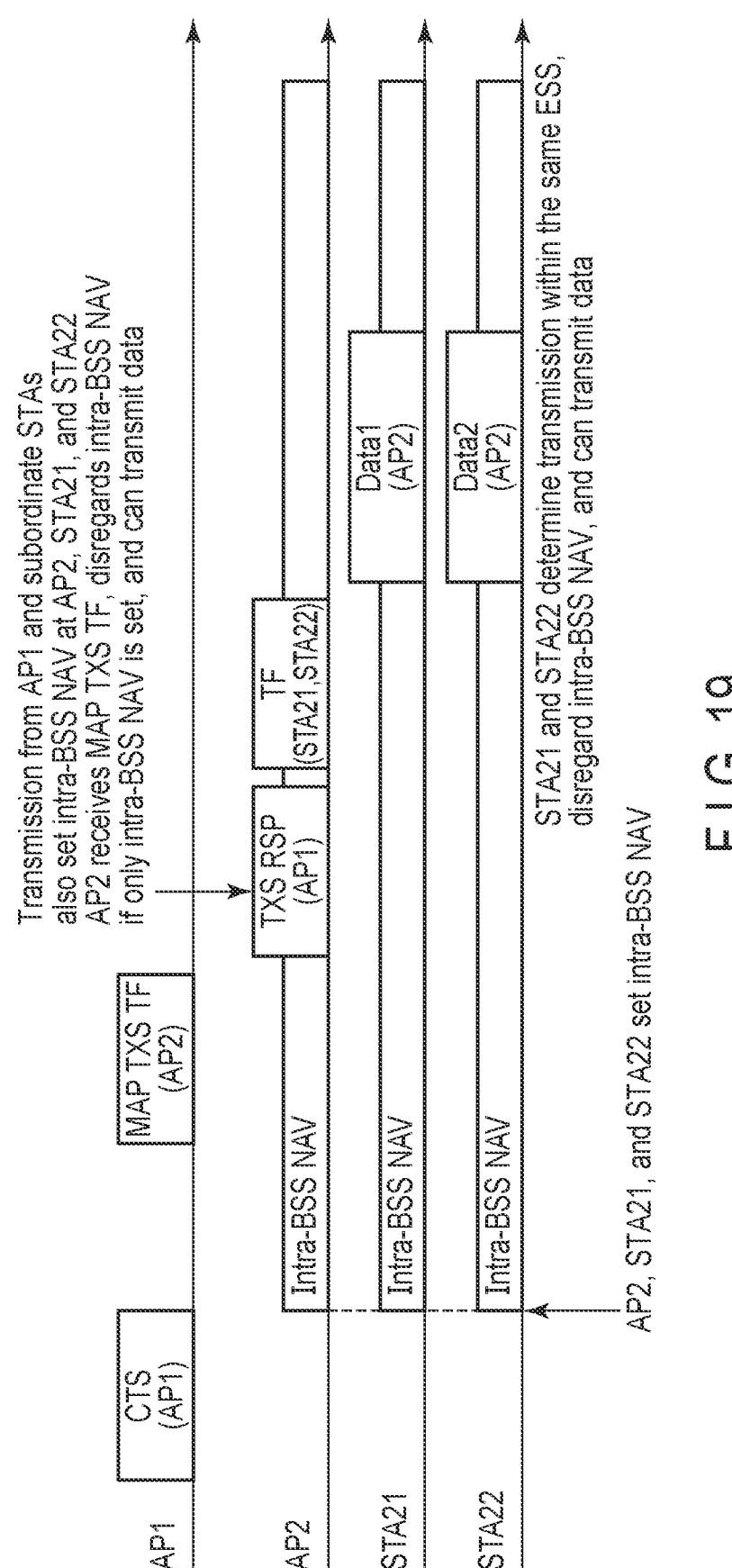
FIG. 19 is a diagram illustrating an example of AP/STA operation.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless communication device belongs to a first wireless communication group. The wireless communication device comprises a memory and a processor connected to the memory. The first wireless communication group is configuring an extended wireless communication group together with a second wireless communication group. The processor is configured to write a first parameter, a second parameter, and a third parameter into the memory; update the first parameter when the processor determines that a received packet is transmitted from a wireless communication device included in the first wireless communication group; update the second parameter when the processor determines that the received packet is not transmitted from a wireless communication device included in the first wireless communication group and that the received packet is transmitted from a wireless communication device included in the extended wireless communication group; update the third parameter when the processor determines that the received packet is not transmitted from a wireless communication device included in the first wireless communication group and that the received packet is transmitted from a wireless communication device included in the extended wireless communication group; and determine whether to communicate a packet based on the first parameter, the second parameter, and the third parameter.

IEEE Std 802.11-2020 and IEEE Std 802.11ax-2021 which are known as specifications for wireless local area networks (LAN), and IEEE 802.11-20/1935r44 dated Sep. 23, 2021 which is a specification framework document for IEEE Std 802.11be that is the next generation wireless LAN standard, are hereby incorporated by reference in their entirety.

(BSS, Infrastructure BSS, ESS)

FIG. 1 shows an example of a wireless communication system according to an embodiment. In IEEE 802.11 standard (including an extended standard such as IEEE Std 802.11ax-2021 described above, which is similarly applied to the following), the minimum unit of a wireless communication group is a basic service set (BSS). The BSS is identified by a BSS identifier (BSSID). For example, in a broadcast frame transmitted to all stations within the BSS, the BSSID is included in one of the address fields of a data frame to be transmitted. A station that has received a data frame determines by the BSSID whether the frame is transmitted to all stations in a BSS to which the station belongs, and performs a process of, for example, extracting a payload of the data frame when the station determines the frame is transmitted to all the stations in the BSS.

IEEE 802.11 standard specifies two different BSS types. As one of the types, an access point (AP) starts up a BSS and then a station (STA) is connected to the BSS. This is called an infrastructure BSS. As the other form, there is no AP, and a BSS is configured by STAs only. This is called an independent BSS. In the embodiment, the infrastructure BSS is described as the BSS.

In the infrastructure BSS (hereinafter referred to as BSS unless it is specifically contrasted with the independent BSS), a medium access control (MAC) address of the AP corresponds to the BSSID. The AP is one type of STA and in this specification both of them may be referred to as a wireless communication device. The AP has a function of enabling data to be transferred from a STA as a source of the data to another STA as a destination of the data. The STA does not have this transfer function. In this case, one of the STAs need not necessarily be in the same BSS as the AP, but may be connected to the BSS via another AP or may be connected to a wired LAN.

A system for connecting an AP and another AP is called a distribution system (DS). A plurality of APs may be connected to the DS, and the APs connected by the DS form an extended service set (ESS). An identifier that identifies the same ESS is a service set identifier (SSID).

In FIG. 1, there are AP1 and AP2 as APs. AP1 communicates with STA11 and STA22 to form BSS1. AP2 communicates with STA21 and STA22 to form BSS2. BSS1 and BSS2 form an ESS.

(Wireless Communication Device)

FIG. 2 shows an example of a wireless communication device according to the embodiment. The wireless communication device includes a higher layer processing unit 10, a MAC processing unit 20, a physical (PHY) processing unit 30, a MAC/PHY management unit 40, an analog processing unit 50, and an antenna 60. FIG. 2 shows a single analog processing unit 50 and a single antenna 60, but a plurality of analog processing units 50 and a plurality of antennas 60 may be provided for multiplexing communication. Both the number of analog processing units 50 and the number of antennas 60 may be equal to or different from each other. For example, two or more antennas 60 may be connected in common to one analog processing unit 50.

The MAC processing unit 20, MAC/PHY management unit 40, and PHY processing unit 30 correspond to an example of a control unit or a baseband integrated circuit which performs a process of communicating with another wireless communication device. The analog processing unit 50 corresponds to an example of a radio frequency (RF) integrated circuit or a wireless communication unit which transmits and receives signals via the antenna 60, for example. The integrated circuit for wireless communication according to the embodiment includes at least the baseband integrated circuit. The function of the baseband integrated circuit may be performed by software (programs) executed on a processor such as a CPU, by hardware, or by both software and hardware. The software may be stored in a storage medium such as a memory such as a ROM or a RAM, a hard disk drive, or an SSD, and read and executed by the processor. The memory may be a volatile memory such as an SRAM and a DRAM, or a nonvolatile memory such as a NAND and an MRAM.

The higher layer processing unit 10 performs a process for a higher layer with reference to the MAC layer. The higher layer processing unit 10 can exchange signals with the MAC processing unit 20. Typical higher layers include a TCP/IP layer, a UDP/IP layer, and their higher layer (application layer), but the embodiment is not limited to the layers. The higher layer processing unit 10 may include a buffer for exchanging data between the MAC layer and the higher layer. The wireless communication device may be connected to a wired infrastructure via the higher layer processing unit 10.

The MAC processing unit 20 performs a process for the MAC layer. As described above, the MAC processing unit 20 can exchange signals with the higher layer processing unit 10. The MAC processing unit 20 can also exchange signals with the PHY processing unit 30. The MAC processing unit 20 includes a MAC common processing unit 70, a transmission processing unit 80, a reception processing unit 90, and a memory 94. The memory 94 is connected to the MAC common processing unit 70, transmission processing unit 80, and reception processing unit 90. The memory 94 stores data necessary for processing of the MAC common processing unit 70, transmission processing unit 80, and reception processing unit 90. When the function of the MAC processing unit 20 is performed by software, the memory 94 also stores the software of the MAC processing unit 20.

The MAC common processing unit 70 performs a process common to transmission and reception in the MAC layer. The MAC common processing unit 70 is connected to the higher layer processing unit 10, transmission processing unit 80, reception processing unit 90, and MAC/PHY management unit 40 to exchange signals with each of these units.

The transmission processing unit 80 and reception processing unit 90 are connected to each other. The transmission processing unit 80 is connected to the MAC common processing unit 70 and PHY processing unit 30. The reception processing unit 90 is connected to the MAC common processing unit 70 and PHY processing unit 30. The transmission processing unit 80 performs a process of transmission in the MAC layer. The reception processing unit 90 performs a process of reception in the MAC layer.

The PHY processing unit 30 performs a process for the PHY layer. As described above, the PHY processing unit 30 can exchange signals with the MAC processing unit 20. The PHY processing unit 30 is connected to the antenna 60 via the analog processing unit 50.

The MAC/PHY management unit 40 is connected to the higher layer processing unit 10, MAC processing unit 20 (more specifically, the MAC common processing unit 70), and PHY processing unit 30. The MAC/PHY management unit 40 manages a MAC operation and a PHY operation in the wireless communication device.

The analog processing unit 50 includes an analog-to-digital and digital-to-analog (AD/DA) converter and an RF circuit to convert a digital signal from the PHY processing unit 30 into an analog signal of a desired frequency, transmit the analog signal from the antenna 60, and convert a high-frequency analog signal received from the antenna 60 into a digital signal. Note that the analog processing unit 50 performs AD/DA conversion, but the PHY processing unit 30 may have an AD/DA conversion function.

In the wireless communication device according to the embodiment, by including the antenna 60 in (integrated with) a single chip as a component, it is possible to decrease the mounting area of the antenna 60.

When transmitting a signal to a wireless medium, the PHY processing unit 30 receives a MAC frame from the transmission processing unit 80. The PHY processing unit 30 performs a process such as addition of a preamble and a PHY header to MAC frame, encoding and modulation of the MAC frame to convert the MAC frame into a PHY packet. The analog processing unit 50 converts the PHY packet, which is a digital signal, into an analog signal of a desired frequency. The antenna 60 radiates the analog signal from the analog processing unit 50 to the wireless medium.

During the signal transmission, the PHY processing unit 30 outputs a signal indicating that the wireless medium is busy to the MAC processing unit 20 (more precisely, the reception processing unit 90).

The PHY processing unit 30 may perform at least one of uplink multi-user MIMO (UL-MU-MIMO) and downlink multi-user MIMO (DL-MU-MIMO). The UL-MU-MIMO and the DL-MU-MIMO is an expansion of the MIMO. In the UL-MU-MIMO, an AP receives at a plurality of antennas simultaneously streams transmitted by spatial multiplex (simultaneously in the same frequency band) from a plurality of STAs, and separates the received streams into frames of each STA by MIMO demodulation. The AP can thus receive the frames simultaneously transmitted from a plurality of STAs in the same frequency band. In the DL-MU-MIMO, the AP transmits streams from a plurality of antennas to their respective STAs by spatial multiplex, and each of the STAs separates the received streams into frames by MIMO demodulation, and receives frames directed to itself. The AP can thus transmit the frames simultaneously to a plurality of STAs in the same frequency band.

When receiving a signal from the wireless medium, the analog processing unit 50 converts the analog signal received by the antenna 60 into a baseband signal that can be processed by the PHY processing unit 30, and converts it into a digital signal. The PHY processing unit 30 receives the digital signal from the analog processing unit 50 and detects its reception level. The PHY processing unit 30 compares the detected reception level with a carrier sense level (threshold value). If the reception level is equal to or higher than the carrier sense level, the PHY processing unit 30 supplies the MAC processing unit 20 (more precisely, the reception processing unit 90) with a signal indicating that the medium (clear channel assessment (CCA)) is busy. If the reception level is lower than the carrier sense level, the PHY processing unit 30 supplies the MAC processing unit 20 (more precisely, the reception processing unit 90) with a signal indicating that the medium (CCA) is idle.

The PHY processing unit 30 performs a demodulation process, a preamble and PHY header removing process, and the like for the received signal to extract a payload. In IEEE 802.11 standard, the payload is called a physical layer convergence procedure (PLCP) service data unit (PSDU) on the PHY side. The PHY processing unit 30 transfers the extracted payload to the reception processing unit 90. The reception processing unit 90 handles it as a MAC frame. In IEEE 802.11 standard, the MAC frame is called a medium access control (MAC) protocol data unit (MPDU). In addition, the PHY processing unit 30 notifies the reception processing unit 90 of the start of reception of a signal and the end of the reception of a signal. If the PHY processing unit 30 successfully decodes the received signal as a PHY packet (if it detects no error), the PHY processing unit 30 notifies the reception processing unit 90 of the end of reception of the signal and transfers a signal indicating that the medium is idle to the reception processing unit 90. When the PHY processing unit 30 detects an error in the received signal, the PHY processing unit 30 notifies the reception processing unit 90 of the detection of the error with an appropriate error code corresponding to a type of the error. When the PHY processing unit 30 determines that the medium is idle, the PHY processing unit 30 notifies the reception processing unit 90 of a signal indicating that the medium is idle.

The MAC common processing unit 70 transfers transmission data from the higher layer processing unit 10 to the transmission processing unit 80 and transfers reception data from the reception processing unit 90 to the higher layer processing unit 10. In IEEE 802.11 standard, data in the MAC frame is called as a medium access control (MAC) service data unit (MSDU). The MAC common processing unit 70 temporarily receives an instruction from the MAC/PHY management unit 40, converts the instruction into data suitable for the transmission processing unit 80 and the reception processing unit 90, and outputs the data.

The MAC/PHY management unit 40 corresponds to, for example, a station management entity (SME) in IEEE 802.11 standard. In this case, the interface between the MAC/PHY management unit 40 and the MAC common processing unit 70 corresponds to a MAC sublayer management entity (MLME) service access point (SAP) in IEEE 802.11 standard. The interface between the MAC/PHY management unit 40 and the PHY processing unit 30 corresponds to a physical layer management entity (PLME) service access point (SAP) in IEEE 802.11 wireless LAN.

In FIG. 2, the MAC/PHY management unit 40 is depicted as if a function unit for MAC management and a function unit for PHY management are integrated as one unit, but they may be separated from each other.

(Method of Connection to BSS and Start of Exchange of Data Frames)

When the AP starts up the BSS, the AP periodically transmits Beacon frames. Since the Beacon frames are actually transmitted using carrier sense multiple access with carrier avoidance (CSMA/CA), the interval between the Beacon frames is not strictly fixed.

The Beacon frames are broadcast frames to indicate the attribute of the BSS, wireless communication capability of the AP, and timestamp information for synchronization of the STA. In the broadcast frames, fields designating a direct receiver address (RA) are all set to "1". In 802.11 standard, the PA field is an address field set first when there are a plurality of address fields. The Beacon frames may or may not include the SSID. The transmission mode excluding the SSID is called a stealth mode.

Upon receiving a Probe Request frame from the STA, the AP transmits a Probe Response frame to the STA. The Probe Request frame is usually transmitted in a broadcast frame. The Probe Response frame is a unicast frame to basically indicate the same information as the Beacon frame. In the unicast frame, the MAC address of a specific STA is specified in the RA field. The STA can request more detailed information in the Probe Request frame. In this case, the AP adds the requested information to the Probe Response frame other than the same information as the Beacon frame, and transmits it. For example, when the STA designates an additionally requested Element ID (using 9.4.2.10 Extended Request element of IEEE Std 802.11-2020) in the Probe Request frame, the AP adds the requested Information to the Probe Response frame and transmits it. Alternatively, when the STA makes a unique request for the same vendors in the Probe Request frame (9.4.2.218 Vendor Specific Request element of IEEE Std 802.11-2020), the AP may include the requested information in the Probe Response frame and transmit it. The STA may also include a specific SSID in the Probe Request frame. In this case, among the APs that have received the Probe Request frame, an AP whose SSID matches the specific SSID transmits the Probe Response frame. The STA transmits a Probe Request frame specifying the SSID based on user's input information. If, therefore, the AP is in a stealth mode and the AP whose SSID matches is in the area capable of receiving the Probe Request frame, the STA can detect the AP.

Upon receiving a Beacon frame or a Probe Response frame, the STA detects an AP to which the STA can be connected. If there are a number of candidate APs, the STA selects one of them for connection.

According to IEEE 802.11 standard, the STA has to perform an authentication process and an association process to be connected to the AP and exchange data frames with the AP.

In the authentication process, Authentication frames are exchanged between the STA and the AP two or four times. The authentication process starts when the STA transmits an Authentication frame to the AP. The Authentication frame is a unicast frame. The Authentication frame receiving side transmits an Ack frame. Subsequently, when the receiving side transmits the Authentication frame, it needs to obtain the access right by itself. When the Authentication frames are exchanged four times, wired equivalent privacy (WEP) may be used. However, the WEP is not being used because of its vulnerability. Thus, exchange of Authentication frames is usually completed in two times (transmission from the STA to the AP and transmission from the AP to the STA), not in four times. The Authentication frame transmitted from AP to STA includes a status code field. The status code notifies the STA whether the AP accepts a request from the STA. When the AP accepts a request, it sets "0" representing SUCCESS in the status code field. When the AP does not accept the request, it can set a value other than "0" in the status code field to notify the STA of the reason for not accepting the request. As values other than 0, for example, 1 is used to reject the request without any specific reason, and 13 is used to reject the request after indicating a reason that the STA does not support an algorithm for a specific authentication specified by the AP.

If the authentication process started from the STA ends in success, that is, if the AP sets "0" in the status code field in the Authentication frame, then the STA starts the association process. The association process starts when the STA transmits an Association Request frame to the AP. The STA can set its wireless communication capability in the Association Request frame, and transmit the frame to the AP to notify the AP of its wireless communication capability. Both the Association Request frame and the Association Response frame are unicast frames, and their receiving sides transmit an Ack frame. Upon receiving the Association Request frame from the STA, the AP transmits the Association Response frame to the STA. The Association Response frame includes the status code field and the wireless communication capability information of the AP. The Association Response frame for notifying that the status code field is "0" (SUCCESS), i.e., that the association request is accepted, includes an association identifier (AID) that is an identifier for identifying the STA in the BSS. The AP assigns an AID to each STA. The STA to which the AID is assigned is completely connected to the AP, and can exchange data frames with the AP. If the STA is connected to the AP, the AID of the STA is effective. The field indicating the AID is an AID field and is composed of 16 bits. The effective value range of the AID is from 1 to 2007. If the AP transmits a frame containing the AID field outside the association process, the AP may set values other than "1" to "2007" in the AID field. When the AID field value is set other than "1" to "2007", the AID field is used to specify, for example, the attribute of a target STA.

When the STA transmits an Association Request frame through a reassociation process for reconnection from an AP to another AP, the same information exchange is performed in the similar procedure as the association process. The reassociation process differs from the association process in that the MAC address of the currently-connected AP is added to the Reassociation Request frame when the STA transmits the Reassociation Request frame to the other AP to which a reconnection is requested. The other AP transmits a Reassociation Response frame that is a response to the Reassociation Request frame.

Once the STA is ready to exchange data frames with an AP, the STA can be connected to an authentication server via the AP. Thus, an encryption process such as an advanced security standard (AES) can be applied to a frame to be transmitted, through a 4-way handshake.

(MAC Frame)

MAC frames are generated in the MAC layer. The MAC frames are basically divided into three different types, which are Management frames, data frames, and Control frames. In some IEEE 802.11 extended standards, extension frames are also defined.

The foregoing Beacon frame, Probe Request frame, Probe Response frame, Authentication frame, Association Request frame, Association Response frame, Reassociation Request frame, Reassociation Response frame, and the like are classified as a Management frame of the MAC frames. The Management frame is used to manage a communication link between STAs.

The foregoing data frame is classified as a data frame of the MAC frames. The data frame is finely divided according to whether it corresponds to quality of service (QoS), whether it stores data only, or whether it includes additional information such as whether it also includes the meaning of an Ack frame. Note that the data frame usually stores data transferred from a higher layer. However, as a special example, the data frames may also include data frames that are generated in the MAC layer and contain no data. The data frames containing no data are a Null frame and a QoS Null frame.

The above Ack frame is classified as a Control frame of the MAC frames. There are a BlockAck frame as another response type Control frame, a BloukAckReq frame for requesting transmission of the BlockAck frame, a request to send (RTS) frame, and a CTS (clear to send) frame. The RTS frame is transmitted to reduce damage of retransmission at the beginning of frame exchange for acquiring transmission opportunity. The CTS frame is transmitted as a response to the RTS frame or transmitted at the beginning of the frame exchange when no response is required from transmission destination. The Control frame is used to control transmission/reception (i.e., exchange) of a Management frame and a data frame with other wireless communication devices.

(MAC Frame Format)

FIG. 3 is a diagram showing a basic format of a MAC frame. The Management frame, data frame, and Control frame according to the embodiment are based on the basic frame format. The frame format includes fields of a MAC header, a Frame Body (variable length in units of octets) and a Frame Check Sequence (FCS) (4 octets). Note that there may be a MAC frame having no field of the Frame Body, such as the foregoing Null frame and QoS Null frame which are data frames containing no data.

The MAC header includes fields of Frame Control (2 octets), Duration/ID (2 octets), Address1 (6 octets), Address2 (0 or 6 octets), Address3 (0 or 6 octets), Sequence Control (0 or 2 octets), Address4 (0 or 6 octets), QoS control (0 or 2 octets), and HT (High Throughput) control (0 or 4 octets).

A MAC header needs not include all of the fields. Some of the fields may not be present in a MAC header. For example, there is a MAC header including neither the Address3 field nor Address4 field. Also, there Is a MAC header Including neither or only either one of two fields of QoS Control and HT control. Other fields not shown in FIG. 3 may be newly added to the MAC header.

The Frame Control field includes, for example, two fields of a Type and a Subtype. A large classification into a Management frame, a data frame, a Control frame, and the like is described by the Type field. The frames described by the large classification are finely classified by the Subtype field. As for the Control frame, for example, information of resolution such as the BlockAck frame, BlockAckReq frame, RTS frame, and CTS frame as described above is set to the Subtype field.

Medium reservation time is set to the Duration/ID field. If, in this case, a STA other than the STA specified by the RA field receives the frame, the STA uses the Duration/ID field as time (NAV value) for setting a network allocation vector (NAV) to be described later. In a power save (PS)-Poll frame used during power saving in the Control frame, not the medium reservation time but an AID of the STA that transmits the frame which is assigned by an AP, is set to the Duration/ID field. When the STA other than the STA specified by the RA field receives the PS-Poll frame, the STA determines that the Type field represents a Control frame and the Subtype field is a PS-Poll frame and thus determines that the NAV value cannot be set by the Duration/ID field. In this case, the STA sets the sum of the fixed time of short interframe space (SIFS) and an estimated time for which an Ack frame transmitted as a response to the PS-Poll frame occupies the medium as the NAV value. The STA obtains the estimated time from the Ack frame transmission rate estimated from the transmission rate of the PS-Poll frame and the Ack frame length (fixed at 14 octets).

A receiver address (RA) is set to the Address1 field. The Address2 field may not be included in some Control frames. If the Address2 field is included in a Control frame, a transmitter address (TA field) is set to the Address2 field. The Address3 field is included in none of the Control frames. The Address3 field is included in the Management frames and data frames. A BSSID that is a BSS identifier, a TA field, a data destination address (DA), or a data source address (SA field) is set to the Address3 field according to the purpose of the frames. The BSSID may be a wildcard BSSID (all bits are 1) for all BSSIDs. The Address4 field is included in the data frames in the case where data from the STA is transferred between the APs. The Address4 field is used when the Address3 field indicates a DA to indicate an SA field.

The Sequence Control field is divided into a Sequence Number subfield and a Fragment Number subfield. The sequence numbers assigned to the frames are set to the Sequence Number subfield, and the fragment numbers corresponding to the frames when data is divided into fragments by a fragment process are set to the Fragment Number subfield.

The QoS field is used to perform QoS control for transmitting the frames in consideration of the priority of the frames. The HT Control field is introduced in IEEE 802.11n standard, and is also used in IEEE 802.11ac standard and IEEE 802.11ax standard, which are successors to IEEE 802.11n standard. An HT variant is included in the HT Control field when conforming to IEEE 802.11n standard. A VHT variant is included in the HT Control field when conforming to IEEE 802.11ac standard. An HE variant is included in the HT Control field when conforming to IEEE 802.11ax standard. Each of the variants is identified by the first 1 or 2 bits of the HT Control field.

The Frame Body field includes information corresponding to the type and subtype of a frame. In the data frames other than the Null frame and QoS Null frame, data is set to the Frame Body field. In the Management frame, a plurality of fixed fields or a plurality of Information Elements are set to the Frame Body field in accordance with the subtype. Some Control frames may not include the Frame Body field in accordance with the subtype, or the fixed fields may be included in the Frame Body field in accordance with the subtype or in combination with one of the fixed fields.

The FCS field includes FCS information which is a checksum code for use in detecting a frame error on the reception side. An example of the FCS information is a cyclic redundancy code (CRC).

(Explanation of NAV)

According to IEEE 802.11 standard, when a STA (including an AP) obtains a medium access right (hereinafter referred to as transmission opportunity) by CSMA/CA and obtains transmission opportunity (TXOP) to occupy a medium, the STA can exchange MAC frames continuously with another STA (including an AP), with restrictions such as for a quality of service (QoS) attribute.

In the TXOP, when a third-party STA other than the two STAs that exchange MAC frames transmits another MAC frame, the frames being exchanged between the two STAs (strictly speaking, a physical protocol data unit (PPDU) including a frame) collide with the MAC frame transmitted by the third-party STA. Thus, in order to postpone the obtainment of transmission opportunity by the third-party STA until after the end of the TXOP, a mechanism called a NAV is defined. While a NAV is set for the third-party STA around the two STAs between which the MAC frames are exchanged, the TXOP, that is, wireless resources are protected.

In the CSMA/CA process, the reception processing unit 90 first checks whether the medium is available, that is, it performs carrier sense. The carrier sense includes both physical carrier sense regarding busy/idle of a clear channel assessment (CCA) and virtual carrier sense based on the value of the Duration/ID field of a received frame or the type of the received frame. The physical carrier sense is activated when a signal of −62 dBm or more is detected on a physical medium. A mechanism for determining that a medium is virtually busy or a period for which a medium is virtually busy is called a NAV. Note that when one channel is divided into a plurality of resource units (RU) and some of them are used for transmission and reception, the reception processing unit 90 may apply the result information of the CCA performed for each channel or the carrier sense information based on the NAV to the said some of the PUs. For example, in an RU belonging to a channel whose carrier sense information indicates idle, the reception processing unit 90 determines that the carrier sense is idle. When a STA (including an AP) receives a MAC frame addressed to another STA, it sets a NAV from the end of a physical packet including the MAC frame. The reception processing unit 90 can set the NAV by writing an NAV value to the memory 94. When the reception processing unit 90 receives a new frame, and a NAV set by the new frame is longer than the current NAV, that is, the end timing of a NAV set by the new frame is later than the end timing set by the current NAV, the reception processing unit 90 updates the current NAV value stored in the memory 94 by the NAV value set by the new frame. By updating the NAV value, the end time of the current NAV is extended to the end time of the NAV set by the new frame.

According to 802.11ax standard, the foregoing transmission opportunity (TXOP) indicated by the Duration/ID field is also set to the TXOP field of the HE-SIG-A field in the physical (PHY) header of a newly defined physical packet (HE PPDU). The STA (including an AP) receives the HE PPDU, which cannot be decoded, and obtains a NAV value from a significant value when the significant value is set to the TXOP field. The HE-SIG-A field of the HE PPDU includes a BSS Color field. Using this field, the STA (including an AP) can determine whether the HE PPDU is an HE PPDU within the BSS itself or is an HE PPDU transmitted from another BSS (overlapping BSS; OBSS). When the STA (including the AP) transmits the HE PPDU, it sets a BSS color value set by the BSS itself to the BSS Color field. The BSS color value used in the BSS itself of the STA is determined by the AP.

In addition, according to 802.11ax standard, in order to achieve uplink (UL) multi-user (MU) transmission, an intra-BSS NAV is specially defined as a NAV applied to the case where the received physical packet is a physical packet transmitted from the BSS itself. The intra-BSS NAV is distinguished from a NAV applied to another case, that is, a case where it cannot be determined whether a physical packet is received from the OBSS or the source of the received physical packet received is from the BSS or OBSS itself. The NAV applied to the other case is called a basic NAV. A frame in which an AP instructs one or more STAs to perform UL MU transmission is a Trigger frame. The Trigger frame is a type of a Control frame. FIG. 4 is a diagram showing whether UL MU transmission can be performed in response to a Trigger frame, depending on the relationship between the setting state of the basic NAV and that of the intra-BSS NAV. Strictly speaking, when the Trigger frame includes a CS Required subfield indicating whether carrier sense is required and the CS Required subfield is "1", that is, indicative of carrier sense, the STA (including an AP) checks the two NAV setting states to determine that it can respond to the Trigger frame, with the result that an UL MU packet can be transmitted.

(1) If neither the basic NAV nor the intra-BSS NAV is "0" (that is, they are both set), transmission opportunity cannot be obtained or no response can be made to the Trigger frame (that is, UL MU transmission cannot be performed).

(2) If the basic NAV is not "0" (that is, it is set) but the intra-BSS NAV is "0" (that is, it is not set), transmission opportunity cannot be obtained or no response can be made to the Trigger frame (that is, UL MU transmission cannot be performed).

(3) If the basic NAV is "0" (that is, it is not set) but the intra-BSS NAV is not "0" (that is, it is set), transmission opportunity cannot be obtained but a response can be made to the Trigger frame (that is, UL MU transmission can be performed).

(4) If both the basic NAV and intra-BSS NAV are "0" (that is, neither is set), transmission opportunity can be obtained and a response can be made to the Trigger frame (that is, UL MU transmission can be performed).

The intra-BSS NAV is set in a case where the BSSID of the BSS itself is set to an RA field, a TA field, or a BSSID field, which are address fields of the MAC frame included in the physical packet received by the STA (including an AP). Alternatively, the intra-BSS NAV is set when the Control frame included in the physical packet received by the STA (including an AP) includes no TA field but an RA field, the value set to the PA field is determined as the same as the MAC address held as a TXOP holder who has obtained transmission opportunity before, and the intra-BSS is set when the TXOP holder is held (that is, when it can be determined that an RA field included in a response frame transmitted in response to a frame from the TXOP holder of the TXOP recognized as intra-BSS communication is addressed to the TXOP holder while the response frame does not include a TA field). The intra-BSS NAV is also set if the STA (including an AP) cannot decode a physical packet but can determine from the header information of the physical packet that communications are within the same BSS. The header information of the physical packet is, for example, the BSS Color field described above. Alternatively, the STA (including an AP) may determine that it is communication within the same BSS when the STA received a data frame based on d Partial AID field of the VHT-SIG-A field included in the header of the physical packet (VHT PPDU) defined by 802.11ac standard.

In 802.11ax standard, an AP does not always maintain the two NAVs. In other words, it is optional for the AP to maintain an intra-BSS NAV. If an AP maintains no intra-BSS NAV, it performs the same operation as a normal operation maintaining one NAV up to 802.11ac standard. The intra-BSS NAV is optional in the AP because it is always the AP that transmits the Trigger frame in 802.11ax standard, and it is always the STA that receives the Trigger frame and performs UL MU transmission as a response thereto. That is, the AP has no case of responding to the Trigger frame as shown in FIG. 4.

(Trigger Frame)

FIG. 5 is a diagram showing an example of the format of the Trigger frame.

A Duration field (2 octets) is the Duration/ID field described above.

A Common Info field (8 octets or more) is an area indicating instruction information common to all STAs that are targeted for UL MU transmission. The Common Info field includes a Trigger Type subfield indicating the type of a Trigger frame and a UL Length subfield indicating the time length of a UL MU packet as well as the foregoing CS Required subfield.

The User Info List field (variable length in units of octets) includes a plurality of User Info fields. Each of the User Info fields indicates control information for each STA. The AID of each STA is specified in the AID12 subfield in the User Info field. When STAs (associated STAs) connected to an AP are targeted without designating a specific STA by UL orthogonal frequency division multiple access (UL OFDMA) based random access (UORA)STA, "0" is set to the AID12 subfield. When STAs (unassociated STAs) not connected to an AP are targeted without designating a specific STA by UORA, "2045" is set to the AID12 subfield. The User Info field includes an RU Allocation subfield that indicates which RU is allocated for transmission, and a UL HE-MCS subfield for indicating a modulation and coding scheme (MCS) used for transmission as well as the AID12 subfield.

(Explanation of Multi-AP)

Multi-AP coordination (MAP) is a generic name of coordination of a plurality of APs which form an ESS.

For example, there is a cooperative operation in which an AP obtains transmission opportunity and shares part of the wireless resources of the TXOP obtained by the AP with another one AP or other APs. The AP that obtains transmission opportunity and shares part of the wireless resources of the TXOP is a sharing AP, and the AP with which part of the wireless resources is shared is a shared AP. An example of the wireless resources may be time or frequency.

FIG. 6 shows an example of MAP in which part of the wireless resources (time) of the TXOP obtained by the sharing AP by itself is divided by time and allocated to the shared AP. The part of the wireless resources (time) of the TXOP is not divided by frequency. In this case, the sharing AP shares the TXOP to a plurality of shared APs in a time division. AP1 as a sharing AP obtains TXOP1 and uses part of the time TXOP11 by itself. After the end of TXOP11, AP1 shares the remaining part of the time TXOP12 with AP2 that is one of the shared APs. After the end of TXOP12, AP1 shares the remaining part of the time TXOP13 with AP3 that is another one of the shared APs. The frequency band of the TXOP shared with the shared APs is the same as the frequency band with which the shared AP obtains transmission opportunity. For example, when the shared AP obtains 80 MHz channel of four consecutive 20 MHz channels, a plurality of shared APs each uses the 80 MHz channel in a time division.

A method of using a plurality of reference frequency channels (20 MHz in the above example) together is called channel bonding. FIGS. 7A and 7B show diagrams illustrating examples of the channel bonding.

FIG. 7A shows an example of the channel bonding for generating bonding channels of 40 MHz, 80 MHz, and 160 MHz. STAs adapted to different channel bandwidths including the maximum channel bandwidth that an AP accepts and designates, can be connected to a BSS. The 20 MHz channel capable of performing an operation common to all STAs (including an AP) constituting the BSS is a primary channel. In the primary channel, a Beacon frame must be transmitted. The 20 MHz channel which is continuous with the primary channel and constitutes a 40 MHz bonding channel together with the primary channel is a secondary channel. FIG. 7A shows an example in which the right side (high frequency side) of the primary channel is the secondary channel. The placement of the secondary channel is not limited to the example shown in FIG. 7A. Two 20 MHz channels which are continuous with the 40 MHz bonding channel including the primary and secondary channels and form an 80 MHz bonding channel together with the 40 MHz bonding channel, form a secondary 40-MHz channel (bonding channel). FIG. 7A shows an example in which the left side (low frequency side) of the primary channel is the secondary 40 MHz channel. The placement of the secondary 40 MHz channel is not limited to the example shown in FIG. 7A. Four 20 MHz channels which are continuous with the 80 MHz bonding channel including the primary channel, secondary channel and secondary 40 MHz channel and form a 160 MHz bonding channel together with the 80 MHz bonding channel, form a secondary 80 MHz channel (bonding channel). FIG. 7A shows an example in which the right side (high frequency side) of the secondary channel is the secondary 80 MHz channel. The placement of the secondary 80 MHz channel is not limited to the example shown in FIG. 7A. In a 320 MHz channel bonding, a secondary 160 MHz channel (bonding channel) including eight consecutive 20 MHz channels is connected to its preceding 160 MHz bonding channel.

As shown in FIG. 7B, a 160 MHz channel in total can be secured with the 80 MHz bonding channel and the secondary 80 MHz channel separated from each other and these channels are referred to as an 80+80 MHz bonding channel.

FIGS. 8A and 8B are illustrations of transmission opportunity obtaining method in an example of the channel bonding shown in FIG. 7A. This method is applied when each AP or each STA obtains transmission opportunity with a channel bandwidth greater than 20 MHz. FIG. 8A illustrates an example of a transmission opportunity obtaining method in the case of 40 MHz channel bonding. Hereinafter, a case where a transmission source AP obtains transmission opportunity, will be described as an example. The transmission source AP performs CS on the primary 20 MHz channel. When transmission opportunity for the primary 20 MHz channel can be obtained, the transmission source AP checks the CS status of the secondary 20 MHz channel during PIFS (SIFS+1 slot time) preceding period. If the transmission source AP can obtain transmission opportunity without detecting busy during the PIFS period for the secondary 20 MHz channel, the transmission source AP uses the 40 MHz bonding channel for transmission. If the transmission source AP detects busy during the PIFS period for the secondary 20 MHz channel, the transmission source AP determines that transmission opportunity cannot be obtained on the secondary 20 MHz channel. Thus, the transmission source AP may resume operation by checking the CS status on the primary 20 MHz channel in order to perform transmission only on the primary 20 MHz channel or to attempt transmission on the 40 MHz channel again.

FIG. 8B illustrates an example of a transmission opportunity obtaining method in the case of 80 MHz channel bonding. When the sharing AP supports, for example, a maximum channel bandwidth of 80 MHz in the BSS itself, the sharing AP sets one 20 MHz channel continuous with the primary channel to a secondary channel and sets two 20 MHz channels continuous with the 40 MHz bonding channel including the primary and secondary channels to the secondary 40 MHz channel. The sharing AP notifies a STA of how to set the secondary channel and the secondary 40 MHz channel by a Beacon frame and a Probe Response frame. The sharing AP notifies it in the same manner even when it uses only the 40 MHz channel to the maximum in the BSS. In addition, the sharing AP similarly notifies a STA of the secondary 80 MHz channel when it uses a 160 MHz channel or an 80+80 MHz channel, and the sharing AP similarly notifies a STA of the secondary 160 MHz channel when it uses a 320 MHz channel. When the transmission source AP attempts to obtain transmission opportunity in the 80 MHz channel, as in the case of the 40 MHz channel described above, the transmission source AP checks the CS status for each secondary 20 MHz channel and for each secondary 40 MHz channel within the preceding PIFS from the time when it determines that transmission opportunity can be obtained for the primary 20 MHz channel with reference to the primary 20 MHz channel, and performs transmission with the maximum channel bandwidth that satisfies the condition. That is, if the transmission source AP detects busy during PIFS on the secondary 20 MHz channel, the transmission source AP performs transmission only on the primary 20 MHz channel even if it does not detect busy during PIFS on the secondary 40 MHz channel. Alternatively, the transmission source AP may resume the operation by checking the CS status on the primary 20 MHz channel in order to attempt transmission on the 80 MHz channel again, in the hope that a broader band may be obtained in the next opportunity. If the primary 20 MHz channel and the secondary 20 MHz channel satisfy the CS condition and busy is detected during PIFS on the secondary 40 MHz channel, transmission can be performed on the 40 MHz channel using the primary 20 MHz channel and the secondary 20 MHz channel. That is, in order to perform transmission on the 80 MHz channel, the CS condition on the primary channel has to be satisfied, and the condition that busy is not detected during PIFS on the secondary 20 MHz channel nor the secondary 40 MHz channel has to be satisfied. Similarly, in order to perform transmission on the 160 MHz channel, the condition that busy is not detected during PIFS on the secondary 20 MHz channel, the secondary 40 MHz channel, nor the secondary 80 MHz channel with reference to the primary 20 MHz channel, has to be satisfied. In order to perform transmission on the 320 MHz channel, the condition that busy is not detected during PIFS on the secondary 20 MHz channel, the secondary 40 MHz channel, the secondary 80 MHz channel, nor the secondary 160 MHz channel with reference to the primary 20 MHz channel, has to be satisfied. The above is the basis of CS using channel bonding, but a technique (puncture technique) in which CS is performed for wideband channels in units of sub-channels every 20 MHz and transmission is not performed on some busy 20 MHz sub-channels can be used. As a physical packet transmission method to which the puncture technique is applied, there is a method for puncturing a frame from the physical head and transmitting the frame as one physical packet (puncture packet transmission method) and a method for not transmitting a frame on some of the 20 MHz sub-channels but transmitting the same physical packet in units of the remaining 20 MHz sub-channels (duplicate packet transmission method). Thus, it becomes easier to obtain transmission opportunity of a broader band. When the puncture technique is used, transmission opportunity has to be obtained on the primary 20 MHz channel. When a physical packet is transmitted using the puncture technique, the physical header notifies which 20 MHz channel is punctured. The combination of punctured 20 MHz sub-channels may be limited. If the physical header is obtained on one of the 20 MHz sub-channels, it is possible to determine whether it is transmitted on any of the other 20 MHz sub-channels. An AP and a STA notify each other of whether a physical packet using the puncture technique can be received and decoded (the AP notifies by a Beacon frame and a Probe Response frame and the STA notifies by an Association Request frame and a Reassociation Request frame), and transmit the physical packet only to the counterpart to which the AP or STA can be adapted. Assume in the MAP that the transmission source AP can transmit a punctured physical packet when the transmission destination AP can receive the punctured physical packet.

FIG. 9 shows an example of MAP in which part of the wireless resources (time) of the TXOP obtained by the sharing AP itself is divided into wireless resources by frequency and the wireless resources are shared with a plurality of sharing APs. In this case, the sharing AP shares the TXOP with a plurality of sharing APs by frequency division. AP1 that is a sharing AP obtains TXOP1 and uses time TXOP11 of part of the TXOP1. After the end of TXOP11, AP1 shares TXOP12 of a first frequency band with AP2 that is one of the shared APs, and shares TXOP12 of a second frequency band with AP3 that is another one of the shared APs. The frequency band of time TXOP12 is divided to generate TXOP12 of the first frequency band and TXOP12 of the second frequency band. The sum of the frequency bands allocated to the shared APs is equal to or smaller than the frequency band for which the sharing AP obtains transmission opportunity. Naturally, the frequency band allocated to each of the shared APs falls within the frequency band at which the sharing AP obtains transmission opportunity. This means that the TXOP, which is a period during which transmission opportunity is obtained, extends in the frequency direction, and TXOP1 of the sharing AP protects a certain frequency band, and thus the protected frequency band can be shared with other APs. For example, in FIG. 9, when the sharing AP1 obtains an 80 MHz channel, 40 MHz channel is allocated to the shared AP2 and the shared AP3. In this case, the total of frequency bands allocated to AP2 and AP3 is 80 MHz, which is the same as the 80 MHz channel obtained by AP1. Alternatively, 40

MHz channel may be allocated to AP2 and 20 MHz channel may be allocated to AP3. In this case, the total of frequency bands allocated to AP2 and AP3 is 60 MHz, which is smaller than the 80 MHz obtained by AP1.

Time division MAP and frequency division MAP may be combined with each other. The sharing AP may share part of the wireless resources of the TXOP with other APs, and may use part of the wireless resources of the TXOP in the same manner as the other APs. For example, in FIG. 6, AP1 may use the TXOP again if time remains until the end of TXOP1 after TXOP13. For example, in FIG. 9, TXOP12 is allocated to AP2 and AP3 by frequency division, but AP1 itself may use part of the frequency of TXOP12 to use TXOP12 in parallel with AP2 and AP3.

When part of the wireless resources of the TXOP is shared with the shared APs, the AP uses a Trigger frame. In the conventional 802.11ax standard, the Trigger frame allocates part of the wireless resources from an AP to STAs connected to the AP. In the embodiment, therefore, when the sharing AP allocates part of the wireless resources to the shared APs, another Trigger Type subfield is defined. Alternatively, a new Control frame other than the Trigger frame may be defined. Alternatively, an existing Trigger Type subfield may be used in the embodiment in which an AP allocates part of the wireless resources of the TXOP to another AP, by redefining a reserved field of a Basic variant (referred to as a Basic Trigger frame) which is generally used to indicate UL MU transmission, or by redefining some fields while maintaining backward compatibility. When the Basic Trigger frame is modified and reused or when a new Trigger Type subfield is defined, the User Info field may be the same as in the existing case. In this case, for example, an identifier is allocated to each AP to identify the AP within the ESS and the identifier of the AP is set to the AID12 subfield. In this case, the AID used by the ordinary STA is "1" to "2007", and a value with a special meaning as described above is defined as the AID12 subfield in the existing Trigger frame. Thus, the identifier of the AP may be assigned to avoid them. For example, a first AP forming the ESS may be configured to assign an identifier to another AP, or the identifier of each AP may be specified manually via a user interface. When a new Control frame is defined, a subfield such as the AID12 subfield may be defined in the User Info field as described above. The shared AP to which the sharing source AP allocates part of the wireless resources may be indicated by the identifier of the AP or the MAC address of the shared AP may be indicated as it is. In the former case, the field for designating an AP can be shortened, but a method for assigning an identifier for identifying APs is required.

The shared AP to which part of the wireless resources of the TXOP is allocated from the sharing AP uses the wireless resources as if the AP itself obtained transmission opportunity. For example, in FIG. 6, during TXOP12, AP2 can transmit data frames to STA21 and STA22 connected to AP2 and receive frame responses to the data frames, such as Ack frames and BlockAck frames, or can transmit a Trigger frame to STA21 and STA22, let each of the STAs transmit data frames, and transmit frame responses to the data frames. These continuous frames may be exchanged if they fall within TXOP12.

(Notification of MAP Capability)

In performing a MAP operation, it is necessary for the sharing AP to determine in advance that an AP serving as a shared candidate is capable of performing a special operation related to the NAV as described later. When the shared AP reallocates part of the wireless resources to the STA of the BSS itself under MAP operation, it is necessary to determine in advance that the STA that is a candidate for the reallocation is a STA that can perform a special operation related to the NAV as described later. In other words, it is necessary to notify the propriety of capability which is indispensable for MAP operation such as the special operation related to the NAV as described later.

For example, if a notification related to the capability of MAP operation is transmitted while being included in a Beacon frame to be transmitted by each AP or an Action frame to be transmitted to another AP, the APs constituting an ESS receive the frames to determine the propriety of the MAP operation.

The Action frame is also one type of Management frame. The Subtype field of the Action frame is represented as an Action frame. A Category subfield in the Action field, located at the head of the Frame Body field of the Action frame, indicates an approximate category of the Action frame. In addition, the Action Details subfield subsequent to the Category subfield stores a subfield indicating the type of a finer Action frame corresponding to the Category subfield.

A notification that a MAP operation can be performed is made using, for example, one of the Information Elements to be set to the Frame Body field of the Action frame and the Beacon frame. The Information Elements for making a notification that a MAP operation can be performed may also include a notification about capabilities other than the MAP operation. The notification may be included in, for example, an EHT Capabilities element as a field to report 802.11be standard-related capabilities. Alternatively, a new Information Element may be defined to notify MAP operation-related information (and other information). In this case, a new identifier (Element ID, Element ID Extension) is defined as the Information Element.

FIG. 10 shows an example of the format of an Information Element included in the Frame Body of the MAC frame. The Information Element includes an Element ID field (1 octet), a Length field (1 octet), an Element ID Extension field (0 or 1 octet), and an Information field (variable length in units of octets).

The Element ID Extension field is used when the number of the Element ID for identifying the Information Element reaches the maximum number that can be represented in one octet. Only when the Element ID takes the maximum value of "255", the Element ID Extension field can be added to add a Sub-Element ID to identify the Information Element.

The Element ID Extension field is also a 1-octet field. In the current wireless LAN standard conforming to 802.11 standard, a value of "0" in the field is reserved, and a value of "1" or more is allocated to identify the Information Element like the Element ID. The unique value for identifying the Information Element is described here.

The Length field indicates the length (size) of the Information Element excluding the Element ID field and the Length field. The Information field represents the contents of the information.

When the STA connected to an AP operable of the MAP is further allocated, from the AP itself, part of the wireless resources of the TXOP, which is allocated from the sharing AP to the AP itself (the AP to which the STA is connected), the STA performs a specific operation related to the NAV depending on the conditions, and transmits to the AP itself the fact that a data frame or the like can be transmitted, that is, a data frame can be transmitted in the TXOP allocated from another AP by the instruction of the AP itself. In the case where the STA notifies the AP itself, an Information Element for indicating that a MAP operation can be performed can be also set to the Association Request frame and the Reassociation Request frame. This STA can determine in advance whether an AP of a connection candidate can operate the MAP if the AP sets a similar Information Element to the Beacon frame and the Probe Response frame. When the STA determines that an AP to which the Association Request frame and the Reassociation Request frame are transmitted can perform the MAP operation, it may set the Information Element to the Association Request frame and the Reassociation Request frame to notify the AP itself that the MAP operation can be performed. When the AP receives a notification from the STA that a frame can be transmitted by the instruction in the TXOP allocated from another AP by the Association Request frame and the Reassociation Request frame, the AP can include an Information Element in the Association Request frame and the Reassociation Response frame to indicate that MAP operation is possible.

(MAP Candidate Set)

The number of APs capable of MAP operation is limited even in the same ESS as described above, and thus the number of APs that perform MAP operation in cooperation with each other is actually limited. In this case, an AP that performs MAP operation needs to determine other APs that are candidates for cooperation in the MAP operation. A group of APs as candidates for cooperation in the MAP operation will be referred to as a MAP candidate set. In the following descriptions concerning an NAV operation, read the wording "AP in the same ESS" as "AP in the MAP candidate set" if the number of APs capable of MAP operation is limited even in the same ESS.

Example of Operation Using Part of the Wireless Resources of TXOP Allocated to AP from Another AP As described above, in 802.11ax standard, it is optional to set an intra-BSS NAV, and a single conventional NAV has to be only set within an AP.

Below is a description of an example of MAP operation using part of the wireless resources of the TXOP allocated to an AP from another AP. This example is classified into an example in which MAP operation is implemented in the AP and an example in which MAP operation is implemented in the STA. First is a description of an example of MAP operation implemented in the AP.

Example 1 of AP Operation: Only One NAV

First is a description of an example of operation in which when only one NAV is set by the reception processing unit 90, the transmission processing unit 80 is configured to use part of the wireless resources of the TXOP allocated from another AP regardless of the NAV.

In this case, when the reception processing unit 90 of the AP receives a frame that shares part of the wireless resources of the TXOP, which is allocated to the AP itself from another AP, the transmission processing unit 80 disregards the NAV within the wireless resources of the allocated the TXOP and transmits data. FIG. 11 is an illustration of example 1 of the AP operation. In FIG. 11, AP1 is a sharing AP, and AP2 is a shared AP, and part of the wireless resources of the TXOP obtained by the sharing AP1 is allocated to the shared AP2. A frame for allocating part of the wireless resources of the TXOP to the shared AP2 is d MAP Transmission Sharing Trigger frame (the MAP TXS TF) in FIG. 11. A frame for allocating part of the wireless resources of the TXOP to another AP is one type of Trigger frame. When part of the wireless resources is allocated only to the shared AP2, RA field of the MAP TXS TF frame is set to the MAC address of the shared AP2.

For example, when the RA field of the MAP TXS TF specifies the MAC address of the AP2 itself, if the shared AP2 receives and decodes the MAP TXS TF, it is understood from the Type field and the Subtype field that the MAP TXS TF is a Trigger frame that is a Control frame as a frame type, and it is understood from the Trigger Type subfield that the MAP TXS TF is used by which an AP that is a MAP allocates part of the wireless resources of the TXOP to another AP. AP2 thus satisfies the condition that AP2 receives a frame that shares part of the wireless resources of the TXOP from another AP to the AP2 itself. If AP1 transmits, for example, a frame addressed to the STA in BSS1 including AP1 or a CTS frame addressed to AP1, AP2 receives the frame. But AP2 (transmission processing unit 80) can thus use the TXOP in accordance with the MAP TXS TF, ignoring the NAV, and can perform transmission for reallocating the allocated wireless resources to the STAs in the BSS that the AP2 itself configured, even though the NAV is set. The CTS frame addressed to the STA itself (including an AP) is specifically called a CTS-to-self frame. Being addressed to the STA itself means setting the RA field to the MAC address of the STA itself.

FIG. 11 shows an example in which AP2 that has received MAP TXS TF transmits to AP1 a response frame (corresponding to the Transmission Sharing Response frame (TXS RSP) in FIG. 11) for making a notification that it uses some of the allocated wireless resources and then transmits a Trigger frame (corresponding to the Trigger frame (TF) in FIG. 11) for instructing STA21 and STA22 connected to AP2 to perform UL MU transmission. For example, AP2 transmits the TXS RSP after SIFS of the MAP TXS TF and transmits the TF after SIFS of the TXS RSP. For example, when it is difficult for AP2 to prepare for transmission of the TXS RSP, AP2 negotiates adjustment time required by AP2 with AP1 in advance. When AP1 sets the MAP TXS TF in the physical frame for transmission, AP1 performs a padding process following the MAP TXS TF in accordance with the adjustment time so that AP2 can obtain the processing time to prepare for transmission while setting the actual time between physical packets as SIFS.

In order for AP2 to transmit the TXS RSP to AP1, there must be the SA field at the MAC header of the MAP TXS TF in addition to the RA field, and the MAC address of AP1 must be set to the SA field. AP2 copies the MAC address of AP1 set to the SA field of the MAP TXS TF and sets the MAC address of AP1 to the RA field of the TXS RSP. The TXS RSP preferably includes the SA field in order to identify AP at AP1 side which AP responded. When AP2 transmits the TXS RSP to AP1, AP2 sets the MAC address to the SA field.

When AP2 determines that the MAC address of AP2 is set to the RA field of the received frame and the frame is the MAP TXS TF, AP2 disregards the NAV and transmits the frame. In addition, the transmission condition may be further limited to when the AP of the same ESS is the transmission source AP. To determine this, the TA field of the MAP TXS TF can be used as described above. Since AP2 knows in advance that AP1 is one of the APs constituting the same ESS, AP2 can determine that AP1 in the same ESS has transmitted the frame when AP2 receives the MAP TXS TF whose TA is set to the MAC address of AP1. Since part of the wireless resources of the TXOP is used only when part of the wireless resources is allocated to the AP in the same ESS, it is also appropriate that the TXS RSP frame is transmitted on the condition that the MAP TXS RF is transmitted from one of the APs constituting the same ESS. This is because when no NAV is set at AP2 before AP2 receives the MAP TXS TF and when the MAP TXS TF is addressed to the AP2 itself, AP2 will not set NAV and AP2 can therefore transmit the TXS TF frame. However, even in this case, AP2 cannot transmit the TF frame to STA21 and STA22. The reason is as follows. No NAV is set when a STA (including an AP) receives a frame addressed to itself, but instead, it keeps a timer that is a similar concept to NAV to determine that it is during the TXOP of AP1 (which is the TXOP holder) that has started the TXOP. It should not attempt to obtain transmission opportunity during the TXOP.

When AP1 allocates part of the wireless resources of the TXOP to a plurality of APs, such as AP2 and AP3, a broadcast address is set to the RA field of the MAP TXS TF. AP2 thus determines that the MAP TXS TF allocates part of the wireless resources of the TXOP to AP2 itself by the fact that for example, the MAP TXS TF has an identifier allocated to AP2 itself in the AID12 subfield of any one of the User Info fields, like a conventional Trigger frame.

In order for the AP to easily determine that a frame is received from the AP in the same ESS, an SSID that is the identifier of the ESS may be set to the MAP TXS TF as described above. Note that the SSID is set to some Management frames but is expressed in the form of an Information Element. This is because the SSID has a variable length up to 32 octets. The Trigger frame is a Control frame and usually includes no Information Elements to reduce a processing load when the Control frame is received. In the Control frame, when a field whose length may vary is included, the field can be grasped by setting a detailed type, a special value that indicates the end of the field and the like, instead of inserting length information such as an Information Element. Similarly, when the SSID is set to the MAP TXS TF, it is set, for example, at the end of the Frame Body (before the FCS field) if a configuration that includes length information and SSID values is acceptable. Alternatively, like the value of the MAC address, a 6-octet value may be defined separately from the SSID (e.g., ESSID). If the ESSID is used, the ESSID should be known in the same ESS in advance.

Alternatively, in order for the AP to easily determine that a frame is received from another AP in the same ESS, an identifier, ESS Color, which differs from the SSID for identifying the same ESS, such as the BSS Color field, may be newly defined. The concept of entering an identifier for identifying the same ESS, for example, in the BSS Color field is basically followed, and it is usually used to identify the BSS itself, but for a certain value, it is used as a notification about the same ESS. The ESS Color value is determined by some method among APs in the same ESS and is shared among the APs in the same ESS. The ESS Color value may be determined, for example, by an AP such as one AP that started the configuration of the ESS, or may be input to each of the APs through a controller or the like after a user determines the value. The value may be changed in midstream like the value of the conventional BSS color value.

In example 1 of AP operation, there is a case when part of the wireless resources of the TXOP is allocated to AP2, while one of the STAs connected to AP2 has already obtained transmission opportunity and intra-BSS communication is performed, and AP1 does not detect it. Since, in this case, AP2 disregards the NAV and transmits a frame, the communication of AP2 is likely to collide with that of the intra-BSS communication. In addition, when AP1 does not detect communication in another BSS (which is not limited to the same ESS) but the communication is detected by AP2, AP2 disregards the NAV and transmits a frame, which may cause a collision with the communication in the other BSS. Next is a description of example 2 of the AP operation for eliminating the fear of these collisions.

Example 2 of AP Operation: Two NAVs According to 802.11ax-Standard (Basic NAV and Intra-BSS NAV)

In example 2 of AP operation, AP2 has two NAVs which are a basic NAV and an intra-BSS NAV. Example 2 of AP operation differs from example 1 thereof in that when the intra-BSS NAV is set, even though the AP receives a frame that shares part of the wireless resources of the TXOP from another AP, the AP cannot disregard the intra-BSS NAV and transmit a frame within the allocated wireless resources. On the other hand, when only the basic NAV is set, the AP can disregard the basic NAV and transmit a frame according to the frame allocated from another AP as in example 1 of AP operation.

FIG. 12A is a diagram illustrating example 2 of AP operation performed when only the basic NAV is set. Even though the basic NAV is set, unless the intra-BSS NAV is set, AP2 disregards the basic NAV, receives the MAP TXS TF for allocating the wireless resources for MAP operation from AP1, transmits the TXS RSP in response to the MAP TXS TF, and then transmits the TF to STA21 and STA22 connected to AP2. FIG. 12B is a diagram illustrating example 2 of AP operation performed when the intra-NAV is set. AP2 operates based on the intra-NAV, and neither transmits the TXS RSP to the MAP TXS TF nor transmits the TF to STA21 or STA22. If the intra-NAV ends in the middle of the MAP TXS TF and the intra-NAV is not set when AP2 determines whether to transmit the TXS RSP after the fixed time of the MAP TXS TF (for example, after SIFS as in the case of transmission of a normal TF), AP2 may transmit the TXS RSP in the same manner as shown in FIG. 12A even if the basic NAV is set.

FIG. 13 shows the relationship between the setting state of the two NAVs and the state as to whether an AP can use part of the wireless resources of the TXOP allocated from another AP (which is expressed as "MAP transmission" in FIG. 13) in example 2 of AP operation.

(1) If neither the basic NAV nor the intra-BSS NAV is "0" (that is, they are set), neither transmission opportunity can be obtained nor MAP transmission can be performed (that is, the allocated wireless resources are not available). This case corresponds to FIG. 12B.

(2) If the basic NAV is not "0" (that is, it is set) but the intra-BSS NAV is "0" (that is, it is not set), transmission opportunity cannot be obtained but MAP transmission can be performed (that is, the allocated wireless resources are available). This case corresponds to FIG. 12A.

(3) If the basic NAV is "0" (that is, it is not set) but the intra-BSS NAV is not "0" (that is, it is set), neither transmission opportunity can be obtained nor MAP transmission can be performed (that is, the allocated wireless resources are not available). This case corresponds to FIG. 12B.

(4) If both the basic NAV and the intra-BSS NAV are "0" (that is, neither of them is set), transmission opportunity can be obtained and MAP transmission can be performed (that is, the allocated wireless resources are available).

With the above configuration, an AP can perform transmission when part of the wireless resources is allocated from another cooperative AP.

Similar to example 1 of AP operation, in example 2 of AP operation, the condition that MAP transmission can be performed only when the AP in the same ESS is a transmission source, can be set. In addition, the method of determining whether the AP itself is allocated when the RA field of the MAP TXS TF is a broadcast address, is also the same as that in example 1 of AP operation. The method of allowing an AP to easily determine that the AP receives a frame or a physical packet from the AP in the same ESS in example 1 of AP operation, can also be applied to example 2 of AP operation.

In example 2 of AP operation, a mode of AP operation of example 1 can be avoided in which when AP1 does not detect that intra-BSS communication is being performed, AP2 performs transmission and the transmission collides with the intra-BSS communication. On the other hand, even in example 2 of AP operation, when there is communication in another BSS which is not detected by AP1 but detected by AP2 and when AP1 transmits the MAP TXS TF, AP2 can disregard the basic NAV and transmit a frame which may collide with the communication in the other BSS. Next is a description of example 3 of AP operation to avoid this collision.

Example 3 of AP Operation: Two NAVs (New ESS NAV for MAP (which Replaces Intra-BSS NAV of Non-AP STA in BSS) and Basic NAV)

Example 3 of AP operation includes two NAVs which are a NAV for MAP (referred to as an ESS NAV) which is set when a frame in the same ESS (including the BSS itself) is received and a NAV (referred to as a basic-NAV) which is set under other conditions (when a frame or packet not in the same ESS is received). In 802.11ax standard, a STA sets the intra-BSS NAV and the basic NAV. However, in example 3 of AP operation, the intra-BSS NAV is not set, and the ESS NAV is set regardless of whether a frame is received from an AP/STA in the BSS itself or a frame is received from another AP/STA in the same ESS. The ESS NAV is an extension of the intra-BSS NAV in the two NAVs set by 802.11ax standard. The ESS NAV comprehends the intra-BSS NAV.

When the RA field, TA field, or BSSID field value of the received MAC frame is the BSSID of the BSS itself (that is, the MAC address of the AP in the BSS itself) or the MAC address of the AP in the same ESS, the AP determines that the frame is received from an AP/STA in the same ESS and sets the ESS NAV. The AP also sets the ESS NAV when it can determine that the received frame is a response frame to the TXOP holder of the TXOP recognized as communication within the same BSS.

The above determination method is similar to that in the intra-BSS NAV in the NAVs according to 802.11ax standard. An AP can determine that its received frame or physical packet is one due to communication within the same ESS by determining the BSS color. The AP can determine the BSS color by setting the ESS Color (considered in example 1 of AP operation) to the header of the physical packet or making the BSS color of each BSS in the ESS previously mutually known to the BSSs by the existing BSS Color field. As a technique for setting the ESS Color to the header of the physical packet, for example, a specific value is defined to identify the same ESS and set to the BSS Color field, or a new ESS Color field is defined. A similar determination can be made using a Partial AID field.

The AP sets the basic NAV when the setting condition of the ESS NAV is not satisfied (including the case where the AP cannot determine whether it is in the same ESS). The setting condition of the basic NAV is slightly different from the conventional setting condition of the basic NAV in the two NAVs. In example 2 of AP operation, the AP operates based on the intra-BSS NAV, while in example 3 of AP operation, the AP operates based on the basic NAV which is a concept paired with the ESS NAV. This operation is analogous to the conventional case of setting the two NAVs, where a STA operates based on the basic NAV when responding to a Trigger frame from an AP. In example 3 of AP operation, when the basic NAV is set, even if an AP receives a frame that shares part of the wireless resources of the TXOP from another AP, the AP cannot disregard the basic NAV and cannot transmit a frame using the allocated wireless resources. On the other hand, when only the ESS NAV is set, the AP can disregard the ESS NAV and can transmit a frame according to an allocation frame from another AP.

Figures 14A, 14B:
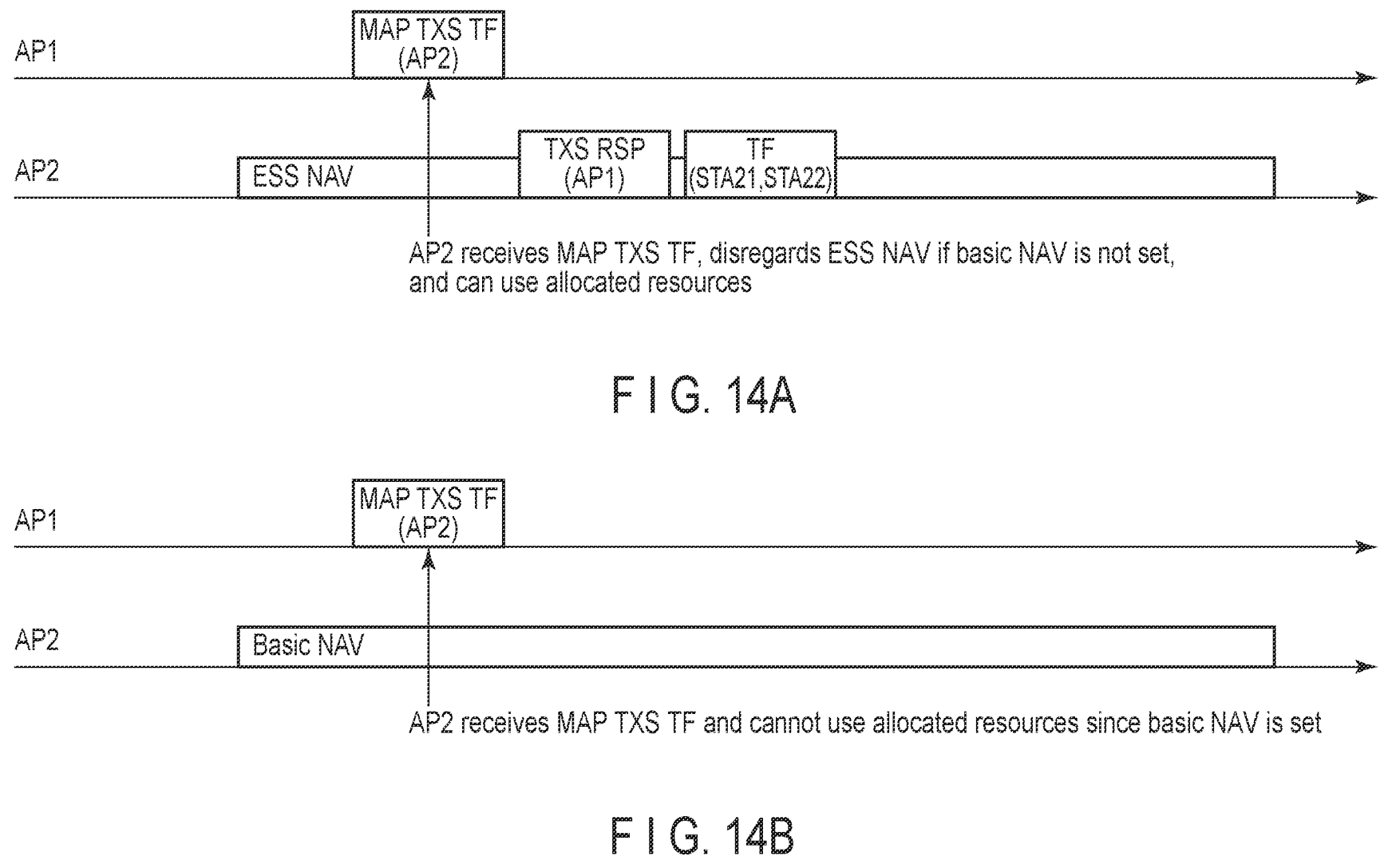

FIG. 14A is a diagram illustrating example 3 of AP operation performed when only the ESS NAV is set. The AP2 disregards the ESS NAV, transmits the TXS RSP in response to the MAP TXS TF from AP1, and then transmits the TF to STA21 and STA22 connected to AP2. FIG. 14B is a diagram illustrating example 3 of AP operation performed when the basic NAV is set. AP2 operates based on the basic NAV, and neither transmits the TXS RSP to the MAP TXS TF nor transmits the TF to STA21 or STA22. If the basic NAV ends in the middle of the MAP TXS TF and it is not set when AP2 determines whether to transmit the TXS RSP after the fixed time of the MAP TXS TF, AP2 may transmit the TXS RSP in the same manner as shown in FIG. 14A even if the ESS NAV is set.

FIG. 15 shows the relationship between the setting state of the two NAVs and the state as to whether an AP can use part of the wireless resources of the TXOP allocated from another AP (which is expressed as "MAP transmission" in FIG. 15).

(1) If neither the basic NAV nor the ESS NAV is "0" (that is, they are set), neither transmission opportunity can be obtained nor MAP transmission can be performed (that is, the allocated wireless resources are not available). This case corresponds to FIG. 14B.

(2) If the basic NAV is not "0" (that is, it is set) but the ESS NAV is "0" (that is, it is not set), neither transmission opportunity can be obtained nor MAP transmission can be performed (that is, the allocated wireless resources are not available). This case corresponds to FIG. 14B.

(3) If the basic NAV is "0" (that is, it is not set) but the ESS NAV is not "0" (that is, it is set), transmission opportunity cannot be obtained but MAP transmission can be performed (that is, the allocated wireless resources are available). This case corresponds to FIG. 14A.

(4) If both the basic NAV and the ESS NAV are "0" (that is, neither of them is set), transmission opportunity can be obtained and MAP transmission can be performed (that is, the allocated wireless resources are available).

Similar to example 1 of AP operation, in example 3 of AP operation, the condition that MAP transmission can be performed only when the AP in the same ESS is a transmission source, can be limited. In addition, the method of determining whether the AP itself is allocated when the RA field of the MAP TXS TF is a broadcast address, is also the same as that in example 1 of AP operation. The method of allowing an AP to easily determine that the AP receives a frame or a physical packet from the AP in the same ESS in example 1 of AP operation, can also be applied to example 3 of AP operation.

In example 3 of AP operation, when AP1 does not detect a situation in which communication is performed in the BSS of AP2 and AP2 detects the situation, AP2 performs transmission even though the ESS NAV is set, and this transmission may collide with the intra-BSS communication. On the other hand, when AP2 detects communication in a BSS other than the ESS, which is not detected by AP1, AP2 performs transmission. However, the situation in which the transmission by AP2 collides with the communication in the BSS other than the ESS, can be avoided. Next is a description of example 4 of AP operation to avoid the collision.

Example 4 of AP Operation: Three NAVs (Intra-BSS NAV, ESS NAV, and Basic NAV)

An example 4 of AP operation is similar to example 3 of AP operation, but they are different in the following. In example 3 of AP operation, the condition for setting the ESS NAV includes the reception of a frame of the BSS itself, whereas in example 4 of AP operation, the AP sets the ESS NAV and the intra-BSS NAV separately from each other, and then operates based on the basic NAV and intra-BSS NAV. Whether or not the intra-BSS NAV is set is the same as the condition for setting the intra-BSS NAV in the conventional case of the two NAVs. That is, when the AP demodulates a received packet to obtain a MAC frame, if it determines that the MAC header includes the same BSSID as the BSS itself of the AP, the AP takes a NAV value out of the MAC header and sets the NAV according to the value. When the AP cannot demodulate the received packet but receives a packet of the BSS itself based on the BSS color value of the header of the physical packet, the AP takes the TXOP out of the header of the physical packet and sets a NAV according to the TXOP. When the AP can determine that the communication is not within the BSS itself but within the same ESS, the AP sets the ESS NAV. In example 3 of AP operation, the condition for setting the ESS NAV is obtained by excluding the condition for setting the intra-BSS NAV from the condition for setting the ESS NAV. If neither the intra-BSS NAV setting condition nor the ESS NAV setting condition is satisfied, the AP sets the basic NAV. In example 4 of AP operation, when either the basic NAV or the intra-BSS NAV is set, even if the AP receives a frame that allocates part of the wireless resources of the TXOP from another AP, the AP does not perform communication. On the other hand, when only the ESS NAV is set, the AP can disregard the ESS NAV and perform communication according to the allocating frame from the other AP.

FIG. 16A is a diagram illustrating example 4 of AP operation performed when only the ESS NAV is set. When neither the basic NAV nor the intra-BSS NAV is set, even if the ESS NAV is set, the AP2 disregards the ESS NAV, transmits the TXS RSP in response to the MAP TXS TF from AP1, and then transmits the TF to STA21 and STA22 connected to AP2. FIG. 16B is a diagram illustrating example 4 of AP operation performed when at least one of the basic NAV and intra-BSS NAV is set. AP2 operates based on at least one of the basic NAV and intra-BSS NAV, and neither transmits the TXS RSP in response to the MAP TXS TF nor transmits the TF to STA21 or STA22. If the set basic NAV ends in the middle of the MAP TXS TF, and no basic NAV is set but only the ESS NAV is set when AP2 determines whether to transmit the TXS RSP after the fixed time of the MAP TXS TF, AP2 may transmit the TF in the same manner as shown in FIG. 16A. In addition, if the set intra-BSS NAV ends in the middle of the MAP TXS TF, and no intra-BSS NAV is set but only the ESS NAV is set when AP2 determines whether to transmit the TXS RSP after the fixed time of the MAP TXS TF, AP2 may transmit the TF in the same manner as shown in FIG. 16A.

FIG. 17 shows the relationship between the setting state of the three NAVs and the state as to whether an AP can use part of the wireless resources of the TXOP allocated from another AP (which is expressed as "MAP transmission" in FIG. 17).

(1) If none of the basic NAV, intra-BSS NAV, and ESS NAV is "0" (that is, they are set), neither transmission opportunity can be obtained nor MAP transmission can be performed (that is, the allocated wireless resources are not available). This case corresponds to FIG. 16B.

(2) If neither the basic NAV nor the intra-BSS NAV is "0" (that is, they are set) but the ESS NAV is "0" (that is, it is not set), neither transmission opportunity can be obtained nor MAP transmission can be performed (that is, the allocated wireless resources are not available). This case corresponds to FIG. 16B.

(3) If neither the basic NAV nor the ESS NAV is "0" (that is, they are set) but the intra-BSS NAV is "0" (that is, it is not set), neither transmission opportunity can be obtained nor MAP transmission can be performed (that is, the allocated wireless resources are not available). This case corresponds to FIG. 16B.

(4) If the basic NAV is not "0" (that is, it is set) but the intra-BSS NAV and the ESS NAV are both "0" (that is, neither of them is set), neither transmission opportunity can be obtained nor MAP transmission can be performed (that is, the allocated wireless resources are not available). This case corresponds to FIG. 16B.

(5) If the basic NAV is "0" (that is, it is not set) but neither the intra-BSS NAV nor the ESS NAV is "0" (that is, they are set), neither transmission opportunity can be obtained nor MAP transmission can be performed (that is, the allocated wireless resources are not available). This case corresponds to FIG. 16B.

(6) If the basic NAV and the ESS NAV are both "0" (that is, neither of them is set) but the intra-BSS NAV is not "0" (that is, it is set), neither transmission opportunity can be obtained nor MAP transmission can be performed (that is, the allocated wireless resources are not available). This case corresponds to FIG. 16B.

(7) If the basic NAV and the intra-BSS NAV are both "0" (that is, neither of them is set) but the ESS NAV is not "0" (that is, it is set), transmission opportunity cannot be obtained but MAP transmission can be performed (that is, the allocated wireless resources are available). This case corresponds to FIG. 16A.

(8) If the basic NAV, intra-BSS NAV, and ESS NAV are both "0" (that is, none of them is set), transmission opportunity can be obtained and MAP transmission can be performed (that is, the allocated wireless resources are available).

Similar to example 1 of AP operation, in example 4 of AP operation, the condition that MAP transmission can be performed only when the AP in the same ESS is a transmission source, can be limited. In addition, the method of determining whether the AP itself is allocated when the RA field of the MAP TXS TF is a broadcast address, is also the same as that in example 1 of AP operation. The method of allowing the received AP to easily determine that a frame or a physical packet is transmitted from the AP in the same ESS in example 1 of AP operation, can also be applied to example 4 of AP operation.

In example 4 of AP operation, even though AP2 detects a situation in which communication is performed in the BSS of AP2, and AP1 does not detect the situation, AP2 does not perform transmission because the intra-BSS NAV is set, and thus the transmission of AP2 can be prevented from colliding with the intra-BSS communication. In addition, when AP2 detects communication in a BSS other than the ESS, which is not detected by AP1, even though AP1 transmits the MAP TXS TF to AP2, AP2 does not perform transmission because the basic NAV is set. Thus, the situation in which the transmission of AP2 collides with the communication in the BSS other than the ESS, can be avoided.

Next is a description of an example of MAP operation implemented in the STA.

Example of Operation of Allocating Part of the Wireless Resources of TXOP from Another AP to AP (the AP Itself) to which STA is Connected and Using the Wireless Resources which are Allocated from the AP Itself to STA Here is a description of the operation of the STA under the shared AP. Since the STA adapted to 802.11ax standard corresponds to UL MU transmission, an example in which the STA maintains three NAVs as in example 4 of AP operation, and an example in which the STA maintains only one NAV to achieve the same operation as in the case where the STA maintains two NAVs will be described in order.

Example 1 of STA Operation: STA Determines that Frame Transmitted from AP in the Same ESS is the Same as Frame in the Same BSS In example 1 of STA operation, the STA maintains two NAVs, namely, the intra-BSS NAV and basic NAV, and determines that a frame transmitted from the AP in the same ESS is the same as a frame transmitted from the AP or STA in the same BSS. That is, upon receiving a frame from the AP in the same ESS, which differs from an AP to which the STA is connected, the STA sets the intra-BSS NAV in the same manner as in the case where the AP itself transmits the frame.

In order to achieve the above, the STA needs to determine in advance which AP is in the same ESS. For this purpose, for example, the AP to which the STA is connected sets information about the AP in the same ESS in the Beacon frame, Probe Response frame, and Association Response frame. This Information Element is used to make a notification about the information. This information may be added to the Information Element for making a notification of the capability of the preceding MAP operation, or an Information Element for making a notification about the information of the AP in the same ESS may be newly defined.

FIG. 18 is a diagram illustrating example 1 of STA operation. AP2 receives the MAP TXS TF from AP1, transmits the TXS RSP to AP1 as a response to the MAP TXS TF, and then transmits the TF to STA21 and STA22 connected to AP2. STA21 and STA22 determine that the transmission of TF from AP1 is transmission within the same ESS, and sets the intra-BSS NAV. Thus, STA21 and STA22 can respond to the TF from AP2 and transmits data frames Data1 and Data2 to AP2 by the UL MU transmission, respectively. If STA21 or STA22 sets the basic NAV, it does not respond to the TF (strictly speaking, when the CS Required subfield of the TF is "1").

STA21 and STA22 connected to AP2 determine whether the normal setting condition of the intra-BSS NAV is satisfied, based on whether the same BSSID as the MAC address of the AP to which the STA is connected is set to the address field of the received frame as described above. However, the STA capable of performing the MAP operation also determines whether the SA field of the received frame includes the MAC address of the AP in the same ESS in the determination of the setting condition. The STA sets the intra-BSS NAV when this condition is satisfied. When the header of the physical packet includes the ESS information and the like as described above, the STA determines that the frame received based on the ESS information and the like is a frame transmitted in the same BSS and sets the intra-BSS NAV. In FIG. 18, the SA field of the MAP TXS TF specifies AP1, and STA21 and STA22 recognize that AP1 and AP2 are in the same ESS and thus set the intra-BSS NAV. When the MAP TXS TF is transmitted by unicast from AP1 to AP2, AP2 is set to the RA field, with the result that the normal setting condition is satisfied and the intra-BSS NAV is set. However, even when the broadcast address is set to the RA field of the MAP TXS TF, since AP1 is set to the SA field, STA21 and STA22 set the intra-BSS NAV in accordance with the determination of the setting conditions described above.

In example 1 of STA operation, even if AP1 does not share part of the wireless resources of the TXOP with AP2, STA21 and STA22 set the intra-BSS NAV. If, therefore, AP2 does not detect the transmission which is detected by STA21 and STA22, STA21 and STA22 transmit a response to the TF transmitted by AP2.

To avoid the above situation, there is a method in which STA21 and STA22 do not set the intra-BSS NAV in all cases even when the AP in the same ESS transmits the MAP TXS TF, and STA21 and STA22 set the intra-BSS NAV only when the AP in the same ESS transmits the MAP TXS TF to the AP itself. In this case, STA21 and STA22 determine whether the RA field of the received frame specifies the AP itself. If the RA field of the received frame specifies the AP itself, STA21 and STA22 set the intra-BSS NAV. Alternatively, when a broadcast address is set to the RA field of the received frame, if there is a field, such as the AID12 field, which further specifies the individual STA/AP, STA21 and STA22 determine whether the AP itself is specified in the field. If the AP is specified, STA21 and STA22 set the intra-BSS NAV. However, in these cases, for example, when the sharing AP obtains the TXOP by first transmitting a CTS-to-self frame or the like, the intra-BSS NAV is not set. After that, part of the wireless resources of the TXOP is allocated to the AP to which the STA is connected. When the wireless resources are reallocated to the STA from the AP to which the STA is connected, the STA cannot perform transmission. An example of this solution method will be described in an example 4 of STA operation.

There is another solution method in which if the received-power level (which is notified as, for example, a receive signal strength indicator (RSSI)) is less than or equal to a certain value (at least less than −62 dBm, e.g., −72 dBm or −82 dBm) of a frame transmitted from another AP in the same ESS, the STA sets the intra-BSS NAV. If the received-power level is greater than the certain value, the STA sets the basic NAV. With this method, if a frame is received from an AP in the same ESS that is not a frame in the BSS itself and the received-power level is low to some extent, even if communications in different BSSs collide with each other, the signal-to-interference ratio (SIR) is large. Communication can thus be expected to continue. It is therefore considered acceptable to set the intra-BSS NAV. This is similar to the concept of the spatial reuse (SR) in 802.11ax standard.

In example 1 of STA operation, when AP1 allocates a part of the wireless resources of the TXOP to AP2 and then allocates another part of the wireless resources of the TXOP to AP3, AP3 and its subordinate STA sets the basic NAV in frame exchange with AP2 and its subordinate STA. Thus, when AP2 sets the time to cover the end of the TXOP of AP1 in the Duration/ID field or the TXOP field, AP3 and its subordinate STA cannot perform transmission because the basic NAV is set. If, therefore, AP2 sets the Duration/ID field or the TXOP field to cover only the time allocated by AP1, and the STA connected to AP2 also sets the Duration/ID field or the TXOP field in the similar manner as AP2, AP3 and its subordinate STA can perform transmission.

Next is a description of an example of AP/STA operation which is a modification to example 1 of STA operation. The example of AP/STA operation controls not only the operation of the STA but also the operation of the AP.

Example 1 of AP/STA Operation: Intra-BSS NAV Applied to Frame in ESS

In example 1, the intra-BSS NAV is set when a frame in the same ESS is received. In this case, the NAV setting condition is obtained by extending a portion corresponding to the BSSID itself to all other BSSIDs in the ESS in the above conventional setting condition. The NAV setting condition may be applied only to the STA connected to the AP, or may be applied to the AP and the STA connected thereto. Here is a description of an example of operation of setting the intra-BSS NAV to both the AP and STA. Assume that the STA can respond to the TF from the AP itself when only the intra-BSS NAV is set. Also, assume that the AP can respond to the MAP TXS TF from another AP in the same ESS when only the intra-BSS NAV is set.

FIG. 19 is a diagram illustrating an example of AP/STA operation. In order to protect the TXOP, AP1 or its subordinate STA transmits a CTS-to-self frame to AP2 and its subordinate STA, for example, at the beginning of frame exchange. Based on the CTS-to-self frame, AP2 and its subordinate STA21 and STA22 determine that AP1 is an AP in the ESS, and set the intra-BSS NAV. AP2 receives the MAP TXS TF from AP1. AP2 determines that the MAP TXS TF is a frame in the ESS. If only the intra-BSS NAV is set, AP2 disregards the intra-BSS NAV, transmits the TXP RES to AP1, and transmits the TF to its subordinate STA21 and STA22. STA21 and STA22 determine that the transmission of TF is transmission within the same ESS. If, therefore, the intra-BSS NAV is set, STA21 and STA22 disregard the intra-BSS NAV and transmit Data1 and Data2 to AP2.

The intra-BSS NAV setting condition according to the received-power level described in example 1 of STA operation may be added to example of AP/STA operation.

The example of AP/STA operation does not cause a situation in which even if AP1 allocates part of the wireless resources of the TXOP to AP2 and then allocates another part of the wireless resources to AP3, AP2 sets the basic NAV up to the end of the TXOP of AP1, with the result that AP3 or its subordinate STA cannot transmit a frame as in example 1 of STA operation. Therefore, AP2 may operate in the same manner as example 1 of STA operation. In example of AP/STA operation, AP2 and its subordinate STA set the time to cover the end of the TXOP of AP1 in the Duration/ID field or the TXOP field. Therefore, AP3 and its subordinate STA can be configured to transmit a frame.

In example of AP/STA operation, as shown in FIG. 19, even if AP1, which is a sharing source, transmits a CTS-to-self frame, for example, at the beginning of frame exchange to protect the TXOP before the transmission of the MAP TXS TF, the intra-BSS NAV is set, and STA21 and STA22 can respond to the TF from AP2. Thus, no problems occur.

Example 2 of STA Operation: NAV is not Set for Frame that Shares TXOP with Another AP In example 2 of STA operation, the STA maintains two NAVs of the intra-BSS NAV and basic NAV. Normally, when the STA receives a frame in which an AP shares part of the wireless resources of the TXOP with another AP, the STA sets the basic NAV or sets the intra-BSS NAV when the AP itself is specified in the RA field. In example 2 of STA operation, however, the STA sets neither of the two NAVs. Whether the STA has received a frame in which an AP shares part of the wireless resources of the TXOP with another AP can be determined by the type of the frame. If the frame is, for example, the MAP TXS TF that is one type of the Trigger frame as in the above example, the type of the frame is determined by the fact that the Type subfield of the Frame Control field is the Control frame, the Subtype subfield is the Trigger frame, and the Trigger Type subfield of the Common Info field is a MAP TXS variant. In accordance with a result of the determination, the STA can determine whether to set the NAV.

FIG. 20 is a diagram illustrating an example 2 of STA operation. When STA21 and STA22 determine that the type of a frame is the MAP TXS TF, they determine that the frame is a frame for which NAV is not set. Therefore, when AP2 subsequently transmits the TXS RSP to AP1 and STA21 and STA22 receive the TXS RSP, the intra-BSS NAV is set as in the prior art. If only the intra-BSS NAV is set, STA21 and STA22 can transmit a response to the TF transmitted from AP2 to STA21 and STA22.

In example 2 of STA operation, only the frame type, that is, whether the frame type is the MAP TXS TF or not, is used for the determination of NAV setting. Determining whether a frame is transmitted from the AP in the same ESS or whether the received frame is addressed to the AP itself (whether the AP itself is set to the RA field or specified in the AID12 subfield) is unnecessary for the determination of NAV setting. Since it is only necessary to simply confirm the frame type, the criteria for determining NAV setting can be simplified.

The TXOP cannot be protected because the NAV is not set by the MAP TXS TF. When the AP itself continues to transmit the TXS RSP, STA21 and STA22 set the intra-BSS NAV based on the TXS RSP. When part of the wireless resources of the TXOP is allocated to another AP and the other AP transmits the TXS RSP, STA21 and STA22 set the basic NAV based on the TXS RSP. Thus, the TXOP of the AP which has transmitted the MAP TXS TF is finally protected.

If the MAP TXS TF is transmitted to a plurality of APs, and the TXS PSP that is a response to the MAP TXS TF is MU transmission (referred to as inter-AP MU transmission) to the APs that have transmitted the MAP TXS TF, it is considered that STA21 and STA22 may set the basic NAV once. In this case, the ESS Color included in the header of the physical packet of the inter-AP MU transmission is not the BSS color of the BSS itself, STA21 and STA22 is assumed to set the basic NAV. When STA21 and STA22 set the basic NAV, they cannot transmit a response to the TF from AP2.

As one method of avoiding the above, it is considered that the STA receives the TF from the AP itself after SIFS from the end time of the NAV, sets the intra-BSS NAV, and cancels the basic NAV immediately before the intra-BSS NAV (sets a NAV value to 0). The STA does not cancel the basic NAV if the STA receives a frame by the inter-AP MU transmission during a period in which the basic NAV has been set, updates the NAV again, and sets the intra-BSS NAV after SIFS from the end time of the updated NAV. That is, the STA can cancel the basic NAV only when the basic NAV is newly set at SIFS immediately before the physical packet for which the intra-BSS NAV is set.

As another avoiding method, if the STA can determine from the ESS Color of the header of the received physical packet a frame in the same ESS, the STA sets the intra-BSS NAV instead of the basic NAV.

As still another avoiding method, the STA does not set the NAV for the physical packet of the inter-AP MU transmission immediately after it receives the MAP TXS TF (in this case, it does not particularly set the basic NAV) as in the case of receiving the MAP TXS TF.

In example 2 of STA operation, when AP1 allocates part of the wireless resources to AP2 and then allocates part of the wireless resources to another AP, the basic NAV is set at the frame exchange in the other BSS as in example 1 of STA operation. To avoid this, each AP sets the Duration/ID field or TXOP field to cover only the time allocated by the sharing AP. The STA connected to each AP makes setting in the same manner as the AP.

In example 2 of STA operation, furthermore, when AP1 that is a sharing AP transmits a CTS-to-self frame, for example, at the beginning of frame exchange to protect the TXOP before transmitting the MAP TXS TF, STA21 and STA22 set the basic NAV and cannot transmit a response to the TF from AP2 because the CTS-to-self frame has only the RA field as an address field and the RA field specifies AP1. In example 2 of STA operation, the STA enables a desired transmission in the MAP under as simple NAV setting conditions as possible. As a solution to the above situation, it is thus suitable to prohibit the transmission of the CTS-to-self frame in the AP that transmits the MAP TXF TF, which will be described as a solution to a similar situation in example 4 of STA operation described later, for example. However, another solution presented in example 4 of STA operation may be applied to the situation of example 2 of STA operation.

Example 3 of STA Operation: No NAV is Set for Frame that Shares TXOP to Another AP Including the AP Itself Similar to example 2 of STA operation, in example 3 of STA operation, the STA can set two NAVs of the intra-BSS NAV and basic NAV, but unlike in example 2 of STA operation, the STA checks whether the allocation destination is the AP itself in addition to the frame type.

FIG. 21 is a diagram illustrating example 3 of STA operation. In this example, AP1 transmits the MAP TXS TF to AP2 and another AP or other APs. The RA field of the MAP TXS TF specifies a broadcast address. Upon receiving the MAP TXS TF, STA21 and STA22 confirm whether the AP itself is specified as an allocation destination. That is, STA21 and STA22 confirm whether AP2 (APs themselves) is specified in one of the AID12 subfield in the User Info field of the received MAP TXS TF. If the received frame is the MAP TXS TF and the AP is specified, STA21 and STA22 do not set the basic NAV or intra-BSS NAV. If this condition is not satisfied, STA21 and STA22 make normal NAV setting.

For example, STA21 and STA22 set the basic NAV unless they can confirm that APs themselves are specified in the MAP TXS TF when they receive the MAP TXS TF. If AP2 is specified in the RA field of the MAP TXS TF (i.e., resources are allocated to AP2 only), STA21 and STA22 may set the intra-BSS NAV according to the procedure of normal NAV setting. If, therefore, the received frame is the MAP TXS TF and the RA field thereof is a unicast address, STA21 and STA22 set the NAV according to the normal procedure. That is, STA21 and STA22 set the intra-BSS NAV if the RA field specifies APs themselves, and set the basic NAV if the PA field specifies another AP. If the received frame is the MAP TXS TF and the RA field specifies a broadcast address, STA21 and STA22 confirm whether APs themselves are allocated. STA21 and STA22 do not set the NAV if APs themselves are allocated, and have only to set the basic NAV if they cannot confirm the allocation of APs themselves.

In example 3 of STA operation, it is unnecessary to confirm whether a frame is transmitted from the AP in the same ESS (that is, to confirm the TA field of the MAP TXS TF), whereas it is necessary to confirm the RA field and confirm an allocation destination depending on the setting of the RA field.

In example 3 of STA operation, when the received frame is the MAP TXS TF, and is addressed to a plurality of APs and part of the resources is allocated to the APs, the TXOP cannot be protected by the frame. It is expected that the TXS RSP transmission from the AP itself is performed by the inter-AP MU transmission. In this case, it is considered that STA21 and STA22 once set the basic NAV. This is the same as the situation in example 2 of STA operation. Once STA21 and the STA22 set the basic NAV, STA21 and STA22 cannot transmit a response to the TF from AP2.

To avoid the above, there is the following method. Like example 2 of the STA operation, if the STA can determine that the basic NAV set newly immediately before the inter-BSS NAV is set is to be canceled or a received physical packet is a physical packet from the same ESS based on the ESS Color of the header of the received physical packet, the STA sets the intra-BSS NAV instead of the basic NAV or does not set the NAV in the inter-AP MU transmission immediately after the MAP TXS TF for which no NV is set. In any case, when the transmission from the AP itself to the BSS itself continues to occur, the intra-BSS NAV is set on the STA side or the STA as a transmission destination of the AP includes a timer to transmit only a response frame to the AP. Thus, the wireless resources can be protected during the TXOP period allocated to the AP itself. In addition, when the wireless resources are further allocated to another AP, the basic NAV is set to protect the wireless resources. Since only the intra-BSS NAV is set when STA21 and STA22 receive the TF from AP2, they can transmit a response to the TF.

In example 3 of STA operation, AP1 allocates part of the wireless resources of the TXOP to AP2 and then allocates another part of the wireless resources of the TXOP to another AP. In this case, the basic NAV is set by the other BSS as in example 1 of STA operation. Thus, each AP sets the Duration/ID field or TXOP field to cover only the time allocated to the sharing AP. The STA connected to each AP also makes NAV setting according to the AP.

In example 3 of STA operation, too, for example, AP1 that is a sharing AP transmits the CTS-to-self frame at the beginning of frame exchange to protect the entire TXOP in advance. In this case, STA21 and STA22 set the basic NAV, which may cause a situation in which STA21 and STA22 cannot respond to the TF from AP2. To avoid this situation, the same solution as in an example 4 of STA operation to be described later has only to be applied.

Example 4 of STA Operation: Intra-BSS NAV is
Set by Frame that Shares TXOP to Another AP
Including the AP Itself In example 4 of STA operation, when the STA receives a frame in which the sharing AP allocates part of the wireless resources of the TXOP to the shared AP, and an AP connected to the STA is allocated as the shared AP of the wireless resources. In this case, the STA sets the intra-BSS NAV. In example 3 of STA operation, the basic NAV is not set when the received frame satisfies the same condition. In example 4 of STA operation, however, the intra-BSS NAV is set.

FIG. 22 is a diagram illustrating example 4 of STA operation. AP1 which has obtained transmission opportunity transmits the MAP TXS TF to AP2 and another AP or other APs to allocate part of the wireless resources. When the MAP TXS TF allocates part of the wireless resources to a plurality of APs, a broadcast address is set to the RA field as shown in FIG. 21 of example 3 of STA operation. If STA21 and STA22 determine that the received frame is a frame type of the MAP TXS TF, then they confirm whether AP2 (APs themselves) is a target for allocation. That is, STA21 and STA22 confirm whether AP2 is specified in any AID12 subfield of the User info field of the MAP TXS TF. If AP2 is specified, STA21 and STA22 set the intra-BSS NAV. If the intra-BSS NAV setting condition is not satisfied, STA21 and STA22 make normal NAV setting, that is, they set the basic NAV. When the MAP TXF TF is transmitted only to AP2 and the RA field specifies AP2, STA21 and STA22 set the intra-BSS NAV according to the procedure for setting normal NAV. Therefore, STA21 and STA22 first set the NAV according to the normal procedure if the RA field is a unicast address when the received frame is the MAP TXS TF. That is, STA21 and STA22 set the intra-BSS NAV if the RA field specifies APs themselves, and set the basic NAV if the RA field specifies another AP. If the RA field is a broadcast address when the received frame is the MAP TXS TF, STA21 and STA22 confirm whether APs themselves are allocated. If confirmed, they set the intra-BSS NAV. If not, they set the basic NAV.

When STA21 and STA22 receive the MAP TXS TF which allocates part of the wireless resources to AP2 (APs themselves), they set the intra-BSS NAV. STA21 and STA22 can thus respond to the TF from AP2.

In example 4 of STA operation, too, it is unnecessary to confirm whether a frame is transmitted from the AP in the same ESS (that is, to confirm the SA field of the MAP TXS TF) as in example 3 of STA operation, whereas it is necessary to confirm the RA field and confirm an allocation destination depending on the setting of the RA field.

Unlike in example 3 of STA operation, in example 4 of STA operation, even when the received frame Is the MAP TXS TF and is addressed to a plurality of APs, and part of the wireless resources is allocated to the AP itself, the TXOP can be protected by the MAP TXS TF. It is expected that the TXS RSP transmission from the AP itself is performed by the inter-AP MU transmission. In this case, when STA21 and STA22 determine that the BSS color in the header of the MU packet differs from BSSs themselves, they set the basic NAV. This is the same as the situation in example 2 or 3 of STA operation.

To avoid the above situation, there is a method adopted in examples 2 and 3 of STA operation. For example, the STA sets the intra-BSS NAV by the TF, but there is a method of canceling the basic NAV newly set immediately before the intra-BSS NAV. There is another method of including the ESS Color in the header of the physical packet in inter-AP communication though the BSS color is usually included therein. There is still another method of setting the intra-BSS NAV instead of the basic NAV if it is determined that communication is in the same ESS by providing a separate field in which the ESS Color is included. There is yet another method of setting a NAV, which is to be set by the TXS RSP, as the intra-BSS NAV instead of the basic NAV, if the intra-BSS NAV set by the MAP TXS TF and the basic NAV set by the TXS RSP are the same period (that is, both the NAVs have the same end time).

In example of FIG. 22, a physical packet (including the MAP TXS TF) which sets the intra-BSS NAV to be compared comes before a physical packet (including the TXS RSP) which determines whether to change the type of a NAV from the basic NAV to the intra-BSS NAV. However, as the physical packet which sets the intra-BSS NAV, a physical packet which comes after the physical packet including the TXS RSP and which stores the TF may be used. If, in this case, the basic NAV set by the TXS RSP and the intra-BSS NAV set by the TF which allocates part of the wireless resources to the STA of the BSS itself (a timer to be stored when the resources are allocated to the STA itself only) have the same time period (that is, both the NAVs end at the same time), the NAV set by the TXS RSP is changed to the intra-BSS NAV from the basic NAV. If the basic NAV is changed to the intra-BSS NAV when their time periods are the same, the constraints immediately before or immediately after the change may be combined. Determining immediately before or immediately after the basic NAV is changed is made according to whether the interval between two frames corresponds to, for example, SIFS. In order to change the basic NAV to the intra-BSS NAV only when the basic NAV is set, when STA21 and STA22 set a new basic NAV, they store, for example, the start point of the basic NAV (the end point of the physical packet) and the end point thereof in a temporary memory (for example, the memory 94 shown in FIG. 2). Then, STA21 and STA22 determine whether a difference between the start point of the physical packet and that of the basic NAV corresponds to SIFS when they set the intra-BSS NAV (or the timer to be stored). If the difference corresponds to SIFS, STA21 and STA22 also determine whether the end points of the two NAVs are the same. If these two conditions are satisfied, STA21 and STA22 do not set the basic NAV. If not, they may set the basic NAV. Alternatively, when STA21 and STA22 set a new basic NAV, they may store the end point of the basic NAV in a temporary memory, for example. If the frame interval between the basic NAV and its subsequent physical packet is equal to or longer than SIFS (the processing time for comparison and setting may be added to SIFS), STA21 and STA22 may delete the stored end point information to confirm the setting of the basic NAV. If information to be compared with the end point of the inter-BSS NAV (or the timer to be stored) of the next physical packet remains, STA21 and STA22 determine whether the end points of the NAVs become the same. If they are the same, STA21 and STA22 do not set the basic NAV. If not, they may set the basic NAV. In any case, a mechanism for storing information in a temporary memory is required. Accordingly, the allocated wireless resources can be protected during the TXOP allocated by the AP itself, and when part of the wireless resources of the TXOP is allocated only by another AP, the basic NAVI is set, with the result that the allocated wireless resources can be protected.

In example 4 of STA operation, if AP1 allocates part of the wireless resources to AP2 and then allocates another part of the wireless resources to another AP, the basic NAV is to be set to the other BSS, as in example 1 of STA operation. Thus, each AP sets the Duration/ID field and TXOP field to cover only the time allocated by the sharing AP, and a STA connected to the AP also makes the NAV setting in the same manner as the AP.

In example 4 of STA operation, too, AP1, which is a sharing source AP, transmits the CTS-to-self frame at the beginning of frame exchange and then allocates part of the wireless resources to AP2. In this case, STA21 and STA22 set the basic NAV. Therefore, even if STA21 and STA22 receive the TF from AP2, they cannot respond to the TF.

A first method of solving the above situation is as follows. If the received frame is, for example, the CTS-to-self frame transmitted from the AP in the same ESS, STA21 and STA22 set the intra-BSS NAV. If only some of the APs in the same ESS are capable of MAP operation (MAP candidate set) and STA21 and STA 22 receive the CTS-to-self frame transmitted from the AP in the MAP candidate set, STA21 and STA22 set the intra-BSS NAV.

A second method of solving the above situation is as follows. STA21 and STA22 set the basic NAV once upon receiving the CTS-to-self frame. When the same sharing AP allocates part of the wireless resources of the TXOP to the AP itself immediately after the setting of the basic NAV, that is, after SIFS, STA21 and STA22 set the intra-BSS NAV and cancel the basic NAV. The method of canceling the basic NAV set once is the same as that of canceling the basic NAV by the TXS RSP described above. Alternatively, the CTS-to-self frame transmission prior to transmission of a frame for allocating part of the wireless resources of the TXOP to another AP is inhibited.

A third method of solving the above situation is as follows. The CTS-to-self frame transmission prior to transmission of the TXOP sharing frame is inhibited. Accordingly, STA21 and STA22 are inhibited from setting the basic NAV, and can respond to the TF upon receiving the TF from AP2.

A fourth method of solving the above situation is as follows. Instead of the CTS-to-self frame, a CTS frame (CTS-to-ESSself frame) In which the RA field is a multicast address for the AP group in the ESS, is used. In this case, the multicast address needs to be known in advance to a STA connected to each AP. If the RA field is the multicast address when the STA receives the CTS frame (that is, the CTS-to-ESSself frame directed to the ESS), the STA may set the intra-BSS NAV. However, if AP1 protects not only the CTS-to-self frame but also the entire TXOP in advance by, for example, frame exchange with a STA connected to AP1, STA21 and STA22 set the basic NAV, and cannot respond to the TF from the AP after part of the wireless resources is allocated to the AP. In order to solve this situation most simply, it is considered to place limitations on the allocation of part of the wireless resources of the TXOP from AP1 to another AP. For example, even though the BSS configured by the sharing AP is the BSS itself, if the sharing AP uses the TXOP or if the sharing AP transmits the TF to the STA in the BSS configured by the sharing AP itself, the STA transmits the TF to the sharing AP, and the STA uses the TXOP, the TXOP periods used by the sharing AP and the shared AP are made the same. Alternatively, the TXOP is used after the period allocated to the shared AP, or the shared AP can be reduced and not increased after part of the wireless resources of the TXOP is allocated to the shared AP. This configuration makes it possible to avoid the situation that the STA under each AP cannot respond to the TF from the AP itself by the basic NAV.

Example 5 of STA Operation: One NAV (if it is Determined that the AP Itself Allocates Part of the Wireless Resources to the STA Itself by TF within Period of NAV Set by Frame Sharing TXOP from AP, NAV is Disregarded to Transmit Response Example 5 of STA operation is an example of operation to be performed even when the STA has only one NAV. The STA sets the NAV when the STA receives a frame (MAP TXF TF) in which the sharing AP shares part of the wireless resources of the TXOP to the AP itself. However, if the STA receives the TF from the AP itself within a fixed time period from a time when the STA receives the MAP TXT TF (precisely, when the physical packet including the MAP TXT TF ends on the wireless medium) and the TF allocates the STA itself, the STA disregards the NAV within the TXOP specified by the AP itself in the TF (actually part of the TXOP of the sharing AP allocated from the sharing AP) to continue an operation of responding to the TF. The fixed time is, for example, the sum of the occupancy time of a frame in which the shared AP transmits a response to a shared notification to the sharing AP and frame intervals required before and after the frame. When the occupancy time varies, it is regarded as, for example, the expected maximum value. In FIG. 23, the fixed time needs to be equal to or longer than at least a time period for determining that AP2 has transmitting the TXS RSP and AP2 has started to transmit the TF. The frame intervals required before and after the frame corresponds to SIFS. If the start of TF transmission can be determined from TXS RSP by SIFS+slot time (=PIFS), the slot time+occupancy time of the physical packet including at least 2×SIFS+TXS RSP is a fixed time. Since the occupancy time of the physical packet including the TXS RSP varies if the transmission rate and the frame length are variable, for example, the expected maximum time is used. For example, the fixed time is defined by a value.

Alternatively, the STA may disregard the NAV for transmitting a response on the condition that there is no free space equal to or greater than SIFS during which the CCA is recognized as idle (i.e., no medium is used) (example 5a of STA operation).

FIG. 23 is a diagram illustrating example 5 of the STA operation. AP1 transmits the MAP TXS TF to AP2, AP2 transmits the TXS RSP to AP1 after SIFS, and AP2 transmits the TF to STA21 and STA22 after SIFS. In this case, the time between the MAP TXS TF and the TF is the sum of 2×SIFS and the occupancy time of the physical packet including SIFS. For example, if the occupancy time is specified as a fixed value or an assumed maximum value, STA21 and STA22 can respond to the TF transmitted from their own APs within the fixed time of the MAP TXS TF. In addition, all the physical packets are exchanged at SIFS intervals. If, therefore, the exchange can be observed, there is no CCA time that is greater than SIFS, and the STA can respond to the TF transmitted from the AP itself when it satisfies the condition. Note the STA cannot respond to the TF because the condition that the occupancy time of the physical packet including SIFS is within the fixed time is not satisfied if the AP first reallocates part of the wireless resources to a STA and then reallocates them to another STA. This situation may not occur in example 5a of the STA operation.

Alternatively, if the AP itself responds to a frame in which part of the wireless resources of the TXOP is shared with another AP (since no decoding cannot be expected at a STA for the MU physical packet, it is limited to the SU transmission of a response frame to determine whether the AP itself has responded to the frame) or if the AP itself is allocated in a frame in which part of the wireless resources of the TXOP is shared with another AP, STA21 and STA22 may disregard the NAV within the TXOP and respond to the TF from the AP (example 5b of STA operation).

Alternatively, as described in example 4 of the STA operation, if the end point of the NAV set by the frame in which part of the wireless resources of the TXOP is shared with the AP itself is the same as that of the NAV set by the AP itself within a fixed time period or the timer to be stored, STA21 and STA22 may disregard the NAV and respond to the TF from the AP itself (example 5c of STA operation). The method of determining whether both the end points are the same is similar to that in example 4 of the STA operation.

If AP1 allocates part of the wireless resources of the TXOP to an AP and then allocates another part of the wireless resources of the TXOP to another AP, the STA cannot cancel the NAV or respond to the TF from the AP itself when the fixed time has exceeded in example 5 of the STA operation (to determine whether to disregard the NAV according to whether the TF addressed to the STA itself is transmitted within the fixed time of the MAP TXS TF). To avoid this situation, for example, the shared AP is configured not to increase in number after the sharing AP allocates part of the wireless resources of the TXOP to the shared AP, though it can decrease in number.

Example 5a of the STA operation (in which the presence or absence of a CCA idle period equal to or greater than SIFS is a condition) does not have the situation that the STA cannot respond to the TF from the AP itself if all the physical packets can be observed. Neither example 5b of the STA operation (the NAV is disregarded when it can be determined that part of the wireless resources of the TXOP is allocated to the AP itself from another AP) nor example 5c of the STA operation (in which the determination is made using the end point of the NAV) has the situation that the STA cannot respond to the TF from the AP itself.

Even though the transmission of the CTS-to-self frame occurs before that of a frame that shares part of the wireless resources of the TXOP with another AP, STA21 and STA22 can respond to TFs from their own APs in example 5 of the STA operation (to determine whether to disregard the NAV according to whether the TF addressed to the STA itself is transmitted within the fixed time of the MAP TXS TF) if the fixed time includes the occupancy time of the physical packet including the CTS-to-self frame and SIFS prior to transmission of the frame that shares part of the wireless resources of the TXOP with another AP. If the frame interval between the MAP TXS TF and its preceding CTS-to-self frame corresponds to SIFS, the fixed time is set to cover the time required for the transmission of the CTS-to-self frame and SIFS. The fixed time requires 3×SIFS+occupancy time of a physical packet including the CTS-to-self frame+ occupancy time of a physical packet including the TXS RSP+slot time. Taking it into consideration that the CTS-to-self frame is transmitted, a longer time has only to be specified as the fixed time. However, in special cases, STA21 or STA22 cannot respond to the TFs from their own APs. For example, when a frame exchange is performed to protect all the TXOP between a sharing AP and another STA before the transmission of a frame that shares part of the wireless resources of the TXOP with another AP, STA21 and STA22 cannot respond to the TF from their own APs. To avoid this situation, there is a method similar to the method of avoiding the same situation in example 4 of the STA operation. None of example 5a of the STA operation (the STA disregards the NAV to transmit a response when it determines whether there is a CCA idle period longer than SIFS), example 5b of the STA operation (the STA disregards the NAV when it determines that the AP itself is allocated part of the wireless resources of the TXOP from another AP), and example 5c of the STA operation (the STA determines whether it disregards the NAV using the end point of the NAV) has the situation that STA21 or STA22 cannot respond to the TFs from APs themselves.

Example 6 of STA Operation: Three NAVs

In example 6 of the STA operation, the ESS NAV is introduced as a third NAV into a STA in addition to the conventional basic NAV and intra-BSS NAV. The ESS NAV is set when the STA determines that the received frame/ physical packet is not one within the BSS itself (that is, no intra-BSS NAV is applied), but is one within the same ESS. The STA having two conventional NAVs sets the basic NAV when the received frame/physical packet is not one within the BSS itself. In example 6 of the STA operation, the STA adds identification of whether a frame/physical packet outside the BSS itself is one within the same ESS. If the STA determines that the frame/physical packet outside the BSS is one within the ESS itself, it sets the ESS NAV. If not, it sets the conventional basic NAV. FIG. 24 is a flowchart showing an example of the NAV setting of the STA in example 6 of the STA operation. The STA determines whether the received frame/physical packet is one within the BSS itself (step S102). If the STA determines that the received frame/ physical packet is one within the BSS itself, it sets the intra-BSS NAV (step S104). If the STA determines that the received frame/physical packet is not within the BSS itself, it determines whether the received frame/physical packet is one within the ESS itself (step S106). If the STA determines that the received frame/physical packet is one within the ESS itself, it sets the ESS NAV (step S108). If the STA determines that the received frame/physical packet is not one within the ESS itself, it sets the basic NAV (step S110).

The determination to set the ESS NAV is basically the same as the foregoing method for setting the intra-BSS NAV. The information for use in determining the setting of the intra-BSS NAV in example 6 of the STA operation differs from the foregoing information for use in determining the setting of the intra-BSS NAV.

In example 6 of the STA operation, if the STA can receive a physical packet, and decode the physical packet, and extract an address field from a MAC frame included in the physical packet, it determines whether the received frame is a frame within the ESS itself in accordance with the address field. Alternatively, if the MAC frame does not have the TA field but the RA field, the STA determines whether the received frame is a frame within the ESS itself from the relationship between the value specified by the PA field and the MAC address of the TXOP holder that previously obtained transmission opportunity. The STA has previously obtained the MAC address of another AP in the ESS itself (that is, the BSSID of another BSS in the ESS itself) from an AP connected to the STA.

When the STA cannot decode the received physical packet, the STA determines whether a received physical packet is a packet transmitted by communication within the same ESS based on the header of the physical packet, and sets the ESS NAV based on the determination. For this determination, for example, a BSS Color field may be used as described above. Alternatively, an ESS Color value may be set to the BSS Color field as described above. Alternatively, when a new physical packet to which an ESS Color field is added separately from the BSS Color field is defined, the STA may make the determination based on the value of the ESS Color field. In this case, the value of the TXOP field of the physical header is used as a value for setting any NAV. In order to determine that the received packet is a physical packet transmitted by communication in the same ESS without specifically defining the ESS Color in the BSS Color field, the STA needs to determine not only the BSS color of the BSS itself but also the BSS color of another BSS in the same ESS. The STA has only to obtain the information from the AP connected to the STA. In order for the AP to determine the BSS color of another BSS in the same ESS, the STA has only to receive a notification of the BSS color of the other BSS in the same ESS from another AP in the same ESS through the Beacon frame or an Action frame or the like for use between APs. For example, if an AP in an ESS notifies the BSS color used in other APs in the same ESS, each of the APs need not obtain the BSS color individually from other APs, which can be improved in efficiency.

When the ESS Color is specifically defined so that it can be notified in the BSS Color field, the STA determines whether the BSS color of the BSS itself is set to the BSS Color field (step S102). If the BSS color of the BSS itself is not set to the BSS Color field, the STA determines whether the ESS Color of the ESS itself is set to the BSS Color field (step S106). If a new physical packet including the ESS Color field separately from the BSS Color field is defined, the STA first determines whether the BSS color of the BSS itself is set to the BSS Color field (step S102). If the STA determines that the BSS color of the BSS itself is not set to the BSS Color field, then it determines whether the ESS Color of the ESS itself is set to the ESS Color field (step S106). This ESS Color should also be determined and shared by some method between APs in the same ESS and should be known to the STAs to which the APs are connected. The STA can respond to the TF from the AP itself unless the basic NAV is set.

FIG. 25 is a diagram illustrating example 6 of the STA operation. STA21 and STA22 connected to AP2 receive the MAP TXS TF which is transmitted from AP1 to AP2 and another AP. The RA field of the MAP TXS TF is a broadcast address, and the TA field specifies AP1. STA21 and STA22 determine that the TA field of the MAP TXS TF is not the BSSIDs of BSSs themselves (that is, the MAC addresses of the AP itself) but one of the BSSIDs of other BSSs recognized as one within the same ESS (that is, the MAC address of an AP other than the AP itself which can be recognized as one within the same ESS). Thus, STA21 and STA22 set the ESS NAV using the TXOP field value of the physical header of the physical packet including the MAP TXS TF at an end of the physical packet on the wireless medium.

After that, AP2 transmits the TXS RSP to AP1 by MU transmission as a response to the MAP TXS TF. In this case, AP2 sets, for example, an ESS Color in the BSS Color field of the physical header of the physical packet transmitted by MU transmission. For example, when the AP performs inter-AP communication, if the AP determines that the physical packet to be transmitted includes the BSS Color field, the AP sets the ESS Color in the BSS Color field. STA21 and STA22 determine that not the BSS color of their own BSS but the ESS Color of their own ESS is set to the BSS Color field of the physical header of the TXS RSP transmitted by MU transmission, and extract the TXOP field value of the physical header of the physical packet including the TXS RSP. If the NAV set by the TXS RSP is longer than the ESS NAV previously set by the MAP TXS TF, STA21 and STA22 overwrite the ESS NAV with the TXOP field value of the physical header of the physical packet including the TXS RSP. For example, AP2 sets the same value as the NAV set by the MAP TXS TF, that is, a value covering up to the end point of the TXOP obtained by AP1, in the Duration/ID field of the TXS RSP or the TXOP field of the physical packet. In this case, the ESS NAV set by STA21 and STA22 is set by the MAP TXS TF until the end of the TXOP obtained by AP1. It is therefore unnecessary to overwrite the ESS NAV with the MAP TXS TF.

Then, it is assumed that STA21 and STA22 set only the ESS NAV when they receive the TF from AP2. Upon receiving the TF from AP2, STA21 and STA22 recognize that the TF is a frame of their own BSS, and set the intra-BSS NAV because the STA itself is not the TXOP holder. In this case, STA21 and STA22 (and AP2) determine that the TXOP holder is AP1 transmitting the TF that sets the ESS NAV. When the TF is received, the ESS NAV and intra-BSS NAV are set, but the basic NAV is not set. STA21 and STA22 can thus transmit a frame as a response to the TF.

In example 6 of the STA operation, even when AP1 allocates part of the wireless resources of the TXOP to the BSS and other APs and then allocates another part of the wireless resources of the TXOP to AP2 or a plurality of APs including AP2, STA21 and STA22 set the ESS NAV instead of the conventional basic NAV during a time period during which part of the wireless resources of the TXOP is allocated to other AP. Therefore, it does not matter if the Duration/ID field or TXOP field is set to protect the entire TXOP by AP1 and APs (including AP2) to which part of the wireless resources of the TXOP is allocated. That is, even if STA21 and STA22 receive the TF from AP2 within the period, they can transmit a response to the TF.

In addition, even if AP1 first performs an operation to protect the TXOP by the CTS-to-self frame or the like, STA21 and STA22 set the ESS NAV instead of the conventional basic NAV and then transmit a response to the TF from AP2.

FIG. 26 shows how three NAVs of the basic NAV, intra-BSS NAV and ESS NAV are set such that a STA can respond to the TF from the AP itself (Trigger frame response @non-AP STA). FIG. 26 also shows a condition (MAP transmission @AP) under which the AP can transmit a response when part of the wireless resources of the TXOP is allocated to the AP in the foregoing example 4 of the AP operation from another AP. The STA can respond to the TF from the AP itself by replacing the communication between MAPs in which the conventional basic NAV is set with the communication in which the ESS NAV is set.

(1) If none of the basic NAV, intra-BSS NAV, and ESS NAV is "0" (that is, they are set), no transmission opportunity can be obtained, no TF response can be made (that is, the STA cannot use the allocated wireless resources), or no MAP transmission can be performed (that is, the AP cannot use the allocated wireless resources).

(2) If neither the basic NAV nor the intra-BSS NAV is "0" (that is, they are set) but the ESS NAV is "0" (that is, it is not set), no transmission opportunity can be obtained, no TF response can be made (that is, the STA cannot use the allocated wireless resources), or no MAP transmission can be performed (that is, the AP cannot use the allocated wireless resources).

(3) If neither the basic NAV nor the ESS NAV is "0" (that is, they are set) but the intra-BSS NAV is "0" (that is, it is not set), no transmission opportunity can be obtained, no TF response can be made (that is, the STA cannot use the allocated wireless resources), or no MAP transmission can be performed (that is, the AP cannot use the allocated wireless resources).

(4) If the basic NAV is not "0" (that is, it is set) but the intra-BSS NAV and the ESS NAV are both "0" (that Is, neither of them Is set), no transmission opportunity can be obtained, no TF response can be made (that is, the STA cannot use the allocated wireless resources), or no MAP transmission can be performed (that is, the AP cannot use the allocated wireless resources).

(5) If the basic NAV is "0" (that is, it is not set) and neither the intra-BSS NAV nor the ESS NAV is "0" (that is, they are set), no transmission opportunity can be obtained, the TF response can be made (that is, the STA can use the allocated wireless resources), and no MAP transmission can be performed (that is, the AP cannot use the allocated wireless resources).

(6) If the basic NAV and the ESS NAV are both "0" (that is, neither of them is set) but the intra-BSS NAV is not "0" (that is, it is set), no transmission opportunity can be obtained and no MAP transmission can be performed (that is, the AP cannot use the allocated wireless resources), but the TF response can be made (that is, the STA can use the allocated wireless resources).

(7) If the basic NAV and the intra-BSS NAV are both "0" (that is, neither of them is set) but the ESS NAV is not "0" (that is, it is set), no transmission opportunity can be obtained, but the TF response can be made (that is, the STA can use the allocated wireless resources) and MAP transmission can be performed (that is, the AP can use the allocated wireless resources).

(8) If the basic NAV, intra-BSS NAV, and ESS NAV are both "0" (that is, none of them is set), transmission opportunity can be obtained, the TF response can be made (that is, the STA can use the allocated wireless resources), and MAP transmission can be performed (that is, the AP can use the allocated wireless resources).

Similar to examples 2 to 4 of the STA operation, in example 6 of the STA operation, the type of a frame received when the ESS NAV is set may be limited to the MAP TXS TF, and a limitation that the allocation destination is the AP itself may be added. In this case, however, the following situations occur. When AP1 allocates parts of the wireless resources of the TXOP to different APs (or a group of APs) in a time division manner as described above, the basic NAV is set by the STA connected to the later-allocated AP and thus the allocated wireless resources cannot be used, and the basic NAV is set by the CTS-to-self frame and thus the allocated wireless resources cannot be used. Therefore, any measures and limitations are required as described above.

Example 7 of STA Operation: Introduction of Frame to Truncate Basic NAV

In examples 1 to 6 of the STA operation, the operation for the NAV on the STA side is changed from the conventional one to allow the STA to transmit a response to the TF from the AP itself by MAP communication. In example 7 of the STA operation, however, the situation in which the STA cannot transmit a response to the TF from the AP itself when the basic NAV is set by the conventional technique, is solved by transmitting on the AP side a frame that resets the basic NAV to 0. Resetting the NAV is otherwise called truncating the TXOP.

As a frame to reset the NAV, there is a CF-End frame. The CF-End frame is one type of Control frame. First is a description of an operation to be performed when the conventional CF-End frame is received.

(Conventional operation of CF-End)

FIG. 27 shows an example of the format of the CF-End frame. The CF-End frame includes a Frame Control field, a Duration field, two address fields, and an FCS. The Duration field is set to 0. The first address field is an RA field, which includes a reception destination address field. In the CF-End frame, a broadcast address is set to the RA field. The second address field is a BSSID (TA field) field, which includes the MAC address of a STA (including an AP) which transmits the CF-End frame.

When a STA (including an AP) that manages only one NAV receives the CF-End frame, the STA resets a NAV if the NAV is set. Specifically, the timing with which the NAV is reset is the end of a physical packet including the CF-End frame. When only one NAV is managed by an AP (HE AP) according to 802.11ax standard, the NAV should be reset unless it is determined that a frame in which the set NAV is last updated is transmitted by a physical packet in the BSS itself and a physical packet including the CF-End frame is transmitted from another BSS. The NAV should be also reset unless it is determined that a frame in which the set NAV is last updated is transmitted by a physical packet in another BSS and a physical packet including the CF-End frame is transmitted from the BSS itself.

An STA (including an AP) which manages two NAVs of the basic NAV and intra-BSS NAV, receives the CF-End frame. When the STA determines that a physical packet including the CF-End frame is transmitted from another BSS, the STA resets the basic NAV. When the STA determines that the physical packet including the CF-End frame is transmitted from the BSS itself, it resets the intra-BSS NAV.

If the BSS Color field of the physical header of the physical packet can be decoded as described above or the MAC frame can be decoded, it is determined as to whether a physical packet is transmitted from the BSS itself or from another BSS based on the address field of the MAC frame (taking into consideration the past history because the address field is limited depending upon the frame type). If the CF-End frame can be extracted, it is determined as to whether a physical packet is transmitted from the BSS itself or from another BSS by determining whether the MAC address of the AP set to the BSSID (TA field) field of the CF-End frame is the same as the MAC address of the AP itself.

Similar to example 6 of the STA operation described above, the STA that manages three NAVs of the basic NAV, intra-BSS NAV, and ESS NAV receives the CF-End frame. When the STA determines that the physical packet including the CF-End frame is transmitted from the BSS itself, the STA may reset the intra-ESS NAV. When the STA determines that the physical packet including the CF-End frame is not transmitted from the BSS itself but from the same ESS, the STA may reset the ESS NAV. When it determines that the physical packet including the CF-End frame is neither transmitted from the BSS itself nor the same ESS, that is, the physical packet is transmitted from outside the same ESS, it may reset the basic NAV.

As in the case where the STA determines whether the physical packet is in the same ESS or in the BSS itself, the determination has only to be made based on the BSS Color field of the physical header of the physical packet or the address field of the MAC frame if the MAC frame can be decoded from the physical packet.

Return to example 7 of the STA operation. The example 7 is directed to a method for allowing a STA that manages two NAVs to transmit a response to the TF from the AP itself under the MAP using a frame for resetting the basic NAV.

In the conventional CF-End frame, the STA enters the MAC address of the AP itself in the BSSID (TA field) field. Therefore, when the STA manages two NAVs, it transmits the CF-End frame to reset the NAV of the BSS itself, that is, the intra-BSS NAV, and the basic NAV remains not being reset. The AP of a BSS cannot transmit the MAC address of another AP with the MAC address set to the BSSID (TA field) field. Even if the MAC address can be set to the BSSID (TA field) field and transmitted, the basic NAV is reset by the conventional CF-End frame when it is determined to be from another BSS. Therefore, in this case, the basic NAV is reset not only by an AP to which part of the wireless resources of the TXOP is allocated from the sharing AP and a STA connected to the AP, but also by all surrounding APs and STAs connected to the APs.

In example 7 of the STA operation, therefore, a frame is newly defined to limit an AP and a STA in which the basic NAV is reset. This frame is referred to as a CF-End2 frame for convenience. Like the CF-End frame, the CF-End2 frame is treated as one type of Control frame. The CF-End2 frame is of a subtype other than the type of the CF-End frame.

As a format, the CF-End2 frame may be similar to the CF-End frame. The Duration field is set to 0. However, unlike in the CF-End frame, in the CF-End2 frame, the BSSID of a BSS to which the basic NAV is reset is specified in the RA field. Since the RA field is a field that specifies the BSSID, it may be expressed as a BSSID (RA) field instead. If the basic NAV is set, a STA included in a BSS having the same BSSID as the value specified in the RA field resets the basic NAV. Even if the intra-BSS NAV is set by the STA of a target BSS, it is not reset but left. For example, the transmission of the CF-End2 frame is restricted only from the AP. The AP then sets its MAC address in the BSSID (TA field) field. The STA that has received the frame may reset the basic NAV only when the BSSID (TA field) field is the MAC address of the AP itself. Alternatively, if it is acceptable to transmit the CF-End2 frame targeted at the BSS of another AP from an AP in the same ESS, the STA has only to reset the basic NAV when the BSSID (TA field) field is the MAC address of another AP in the same ESS. In this case, the STA determines the MAC address of an AP other than the AP itself in the same ESS in advance by the foregoing method or the like. In the CF-End2 frame, a format including no BSSID (TA field) can be obtained only by specifying a BSS to which the basic NAV is reset to the RA field. In this case, the STA that has received the frame resets the basic NAV if the RA field matches the BSSID of the BSS itself. However, this cannot prevent any STA from setting the basic NAV. Thus, the STA that has received the CF-End2 frame may confirm the transmission source address of the frame based on the BSSID (TA field) field, and reset the basic NAV only when a certain condition is satisfied in the BSSID (TA field) field (for example, in the case of the AP itself as described above or the AP of the ESS itself). In order to easily determine whether an AP is in the same ESS by the STA that has received the CF-End2 frame, the CF-End2 frame may include a field in which the identifier of the ESS is set or a field in which this ESSID is set instead of the TA field. The ESS identifier is typically an SSID as described above. Thus, the SSID is set at the end of a Frame Body portion of the CF-End2 frame, which is a Control frame, as described in example 1 of the AP operation, because the SSID has a variable length. Alternatively, length information and SSID values are set to the CF-End2 frame, if possible. Alternatively, as an ESS identifier, an ESSID of fixed 6 octets is defined separately from the SSID, and this ESSID is used.

FIG. 28 is a diagram illustrating example 7 of the STA operation. In example 7, the STA can transmit a response to the TF from the AP itself under the MAP using the CF-End2 frame. AP1 transmits the MAP TXS TFs of AP2 and other APs. Assume that the PA field of the MAP TXS TFs is a broadcast address and a TA field specifies AP1. In this case, STA21 and STA22 connected to AP2 can decode a physical packet including the MAP TXS TFs. Even though STA21 and STA22 can extract the MAP TXS TFs, they determine that the received physical packet is a physical packet of another BSS and set the basic NAV, because neither the RA field nor the TA field is the BSSID of the BSS itself.

After that, AP2 MU-transmits, to AP1, the TXS RSP to the MAP TXS TF transmitted from AP1. When the BSS color of a BSS configured by AP2 is not described in the physical header of the MU-transmitted physical packet, STA21 and STA22 determine that the physical packet is also a physical packet from another BSS, and compare a period set by the TXOP field value of the physical header and a period of the basic NAV set by the MAP TXS TF to determine whether to set the TXOP field value of the physical header as a basic NAV. AP2 sets a value, which is obtained by subtracting the occupancy time length of the physical packet including SIFS and the TXS RSP frames from the Duration field value in the MAP TXS TF, to the TXOP field value of the physical header, that is, when AP2 is configured to protect the same period as the TXOP obtained by the MSP TXS TF. In this case, STA21 and STA22 need not overwrite the basic NAV because the end point of the basic NAV already set by STA21 and STA22 and the end point of the NAV value indicated by the physical packet including the TXS RSP frame.

Then, AP2 reallocates the allocated wireless resources to STA21 and STA22, and before the reallocation, it transmits a CF-End2 frame to reset the basic NAV of STA21 and STA22. Since the BSS to reset the basic NAV is the BSS of AP2, AP2 sets the BSSID of the BSS of AP2 (BSSID is represented as BSSID2 in FIG. 28, and BSSID2 is the MAC address of AP2) in the RA field of the CF-End2 frame. In FIG. 28, the parenthesis in the CF-End2 frame indicates the setting status of the RA field, that is, the setting of the BSSID2. AP2 transmits the CF-End2 frame within the wireless resources allocated from AP1. As described above, when STA21 and STA22 receive the CF-End2 frame and determine that the BSSID of the BSS itself is specified, it resets the set basic NAV to 0 at the end of the physical packet including the CF-End2 frame.

AP2 transmits the CF-End2 frame and then transmits the TF to reallocate the wireless resources to STA21 and STA22. Since the RA field of the TF is a broadcast address and a TA field specifies AP2. Thus, STA21 and STA22 determine that the physical packet including the TF is a physical packet in the BSS itself. In addition, they set the intra-BSS NAV because the TF is not the TXOP holder but a received frame. Since the set NAV is the intra-BSS NAV, STA21 and STA22 can respond to the TF, for example, they can transmit a data frame after SIFS.

In FIG. 28, AP2 transmits the CF-End2 frame. Since, however, the MAP TXS TF is also transmitted to APs other than AP2, the APs that have received MAP TXS TF also MU-transmit the TXS RSP and then transmit the CF-End2 frame in the allocated wireless resources in the same manner. If the APs are assigned different frequency channels from AP1, each of the APs can transmit a CF-End2 frame on its corresponding frequency channel. The STA connected to each of the APs can receive a CF-End2 frame from the AP itself if it is waiting under the assigned frequency channel.

Since radio resources have already been allocated, it is more appropriate that the shared AP transmits the CF-End2 frame, but the sharing AP1 may transmit it (indicated by broken lines in FIG. 28). In this case, AP1 has to reset the basic NAV in the BSSs of APs in addition to the BSS (BSSID2) of AP2. Thus, a plurality of BSSIDs have to be set as the CF-End2 frame. Since the CF-End2 frame is a Control frame, there is a method of providing a fixed number of RA fields, taking into consideration that the frame length must be fixed or there must be a restriction that the final frame length can be predicted in advance in the first half of a field. For example, four PA fields of an RA1 field, an RA2 field, an RA3 field and an RA4 field are defined in the CF-End frame 2, while one RA field is defined in the CF-End frame. Accordingly, a maximum of four BSSIDs can be specified. To specify the BSSIDs, the fields are used in the order presented. If they are not used up, for example, all the fields (for example, 6 octets) are filled with "0". It does not matter if a flexible Control frame in which length information can be entered can be configured, as described above. There is another method of providing a multicast address for designating a plurality of BSSIDs in advance and entering it into the RA field. One field is sufficient for this method. If, however, there are a number of combinations of BSSIDs, it is necessary to specify their corresponding addresses, and it is necessary to make them known in the ESS in advance.

When each AP transmits a CF-End2 frame to the STA included in the BSS itself, the conventional STA does not recognize the subtype of the CF-End2 frame because it is a new frame as described above. Even if the STA receives the frame, it does not perform an expected operation of resetting the basic NAV. Note that since the Duration field is set to 0, there is no concern that a new basic NAV is set upon receipt of a CF-End2 frame by the conventional STA. The new frame of the CF-End2 frame is essentially required in the STA adapted to the new extension standard, for example. Thus, the CF-End2 frame can be used to reset the basic NAV in the STA included in the target BSS, not only for the MAP under a new extension standard but also to reset the basic NAV under the new extension standard. In this case, an AP can also transmit the CF-End2 frame to reset the basic NAV in the BSS of another AP. Alternatively, the adaption to the CF-End2 frame is an optional function under the new extended standard. In this case, when the STA transmits an Association Request frame or a Reassociation Request frame to the AP itself, it notifies the AP itself of whether it is adaptable to the CF-End2 frame, and the AP can determine in advance which of the subordinate STAs can receive the CF-End2 frame and reset the basic NAV. Alternatively, the MAP is an optional function in the new extension standard, and the adaption to the CF-End2 frame is also required in the STA adapted to the MAP. In this case, when the STA transmits an Association Request frame or a Reassociation Request frame to the AP itself, it notifies the AP of whether it is adaptable to the MAP. The AP determines which of the subordinate STAs is adaptable to the MAP and can transmit the CF-End2 frame to reset the basic NAV of the STA adapted to the MAP. If the STA is adapted to the MAP and is essential to a response to the CF-End2 frame, an AP can transmit the CF-End2 frame to the BSS to which the STA belongs in order to respond to the TF-transmission from the AP itself under the MAP.

If the CF-End2 frame is caused to perform an operation of resetting the basic NAV only in the STA adapted to the MAP, the AP naturally transmits the CF-End2 frame under the MAP. When the AP transmits the TF thereafter, it is better to limit only the STA adapted to the MAP or only the STA adapted to the CF-End2 frame as a STA to which part of the wireless resources is allocated, so that the number of STAs that can respond to the TF is increased and the wireless resources are effectively used.

In the above method using the CF-End2 frame, for example, when AP1 allocates part of the wireless resources to AP2 and other APs and then allocates part of the wireless resources to a different group of APs, the STAs under the first allocation-target APs, such as STA21 and STA22, receive the MAP TXS TF from AP1 again or receive the TXS RSP from a new allocation-target AP group instead of receiving the MAP TXS TF, thereby setting the basic NAV again and not interfering with communications. Also, in this method, even though the TXOP is protected in advance by the CTS-to-self frame and the like, the basic NAV that is protected by the CF-End2 frame can be canceled. Thus, the STA can transmit a response to the TF from the AP itself.

In example 7 of the STA operation, the following situation occurs. When the basic NAV is set in advance in a frame that is unrelated to the MAP, it is overwritten with 0 by the CF-End2 frame. The STA is likely to transmit frames which should have been protected to cause the frames to collide with each other. This situation will be solved by the following examples 7a, 7b, and 7c of the STA operation.

Example 7a of STA Operation: The Basic NAV is Reset Only when it is Set by the MAP TXS TF and the CF-End2 Frame is Received Before the End of NAV In example 7a of the first operation, the STA sets the basic NAV by d frame (the MAP TXS TF In the previous example) in which the sharing AP allocates part of the wireless resources to the shared AP, and resets the basic NAV only when the STA receives a CF-End2 frame targeted to the BSS itself before the basic NAV expires, that is, before the basic NAV ends.

As an example of how to perform the STA operation in example 7a, the STA may have a flag indicating whether the basic NAV is set by the MAP TXF TF. When the basic NAV is extended by another frame or a physical packet, the STA sets the flag in an OFF state. If the basic NAV is already set when the STA receives the MAP TXS TF, the STA does not set the flag in an ON state, but keeps it in the OFF state. In addition, if the flag is in an ON state when the STA receives the CF-End2 frame targeted for the BSS itself, the STA resets the basic NAV.

However, in example 7a, the basic NAV is set before the MAP TXS TF when the TXOP is protected in advance by the CTS-to-self frame or the like or when part of the wireless resources is allocated to the AP of the STA after another AP is allocated part of the wireless resources. In this case, the STA cannot respond to the TF from the AP itself. If, therefore, the basic NAV is already set at the stage of receiving the MAP TXS TF, the STA does not set the flag in an ON state. If, however, the end point of the expected basic NAV set by the MAP TXS TF and that of the existing basic NAV are the same, the STA may set the flag in an ON state.

Example 7b of STA Operation: A Value to Cover the Remaining the TXOP in the CF-End2 Frame, and the STA Resets the Basic NAV if its End Time is the Same as that of the Basic NAV In example 7b, a time period to cover the remaining the TXOP is set to the CF-End2 frame, and the STA receives the CF-End2 frame targeted for the BSS itself. If the remaining period of the set basic NAV and the period described in the CF-End2 frame are the same, that is, if the end point of the remaining the TXOP described in the CF-End2 frame and the end point of the set basic NAV are the same, the STA resets the basic NAV. The period for covering the remaining the TXOP may be set to the Duration field defined in the same manner as in the case of the CF-End frame. In the CF-End frame, a value of "0" is set to the Duration field, but in the CF-End2 frame, a value of "1" or more can be set to the Duration field. In the conventional STA, the value set to the Duration field of the CF-End2 frame is extracted as a NAV setting candidate. Since, however, the NAV is not overwritten if it ends at the same time or earlier than the already set NAV, there is no effect caused by the reception of the CF-End2 frame. Alternatively, the Duration field is left, and "0" is set therein to reset the NAV as the CF-End frame. A new field, such as the TXOP Duration field, may be defined to describe the remaining the TXOP therein. It is appropriate to set the new field to 2 octets as the conventional Duration field.

When the sharing AP transmits the CF-End2 frame, the TXOP obtained by the shared AP is recognized by a frame transmitted by the shared AP, such as the MAP TXS TF, and the remaining the TXOP is set to the CF-End2 frame. Since the shared AP determines that the sharing AP is the TXOP holder, it can determine the TXOP obtained by the sharing AP. Conventionally, the TXOP holder is held only when the frame is a frame transmitted in the same BSS. However, it is assumed that an AP that performs a MAP operation can recognize, as the TXOP holder, at least a physical packet in the same ESS and hold it even if another BSS is transmitted. Alternatively, of APs that perform a MAP operation, only the APs in the same ESS may be recognized as the TXOP holders and held.

When the sharing AP transmits the CE-End2 frame, it is the sharing source AP itself. The remaining the TXOP can thus be described in the CF-End2 frame.

The STA receives the CF-End2 frame targeted for the BSS itself. When the basic NAV is set, the STA compares the value of the basic NAV with the remaining period of the TXOP described in the CF-End2 frame. If the end points are the same, that is, if the periods are the same, the STA resets the basic NAV.

Example 7c of STA Operation: A the TXOP Holder is Set to the CF-End2 Frame, and the Basic NAV is Reset Only when it Coincides with Information Held in the STA In example 7c, the TXOP holder recognized by the AP that transmits the CF-End2 frame is set to the CF-End2 frame. When the STA sets the basic NAV, it extracts and holds the TXOP holder of an original frame for setting the basic NAV. That is, the STA holds the TA field of the original frame as the TXOP holder. When the frame is a CTS-to-self frame, the STA holds the RA field as the TXOP holder. The STA receives the CF-End2 frame targeted for the BSS itself. If the STA determines that the MAC address held as the TXOP holder of the basic NAV described in the CF-End2 frame and set as the TXOP holder is the same, it resets the basic NAV. As described above, conventionally, the STA holds the TXOP holder only when it is transmitted within the STA's own BSS. However, it is assumed that a STA, which can transmit a response to the TF from the AP itself under MAP operation, can recognize and hold the source AP of a received packet as the TXOP holder if it determines that the received packet is a physical packet from at least the same ESS even though it is from another BSS. Alternatively, the STA may recognize and hold only AP in the same ESS as the TXOP holder.

For example, the AP may set a BSS for which the basic NAV is reset in the RA field of the CF-End2 frame as described above, set the address of a transmitting AP in the BSSID field (TA field) of the CF-End2 frame, and then set a new field, namely, TXOP Holder field to which the TXOP holder is set. The new field should be 6 octets, like the other address fields.

Alternatively, the AP may set the address of the TXOP holder to the RA field of the CF-End2 frame instead of setting the BSSID of the BSS for which the basic NAV is reset. Considering MAP communication, the TXOP holder to be set must be one of the APs. Since the MAC address of the AP is the BSSID, the BSSID is set to the RA field. Note that the first address field (RA field) may be changed to the TXOP Holder field. In example 7 shown in FIG. 28, AP2 transmits the BSSID2, which is the BSSID of AP2, with it included in the RA field of the CF-End2 frame. In example 7c, however, AP2 transmits the BSSID1, which is the BSSID of AP1, with it included in the RA field of the CF-End2 frame. For example, if the AP of the BSS for which the basic NAV is reset transmits the CF-End2 frame, the STA can determine whether the basic NAV is reset using the BSSID field (TA field). When AP2 transmits the CF-End2 frame, the BSSID2, which is the MAC address of AP2, is set to the BSSID (TA field) of the CF-End2 frame, and only AP2 itself and the STA connected to AP2 reset NAV. When the TXOP holder of the basic NAV held in the AP/STA matches the MAC address (BSSID1 (AP1)) set to the PA field of the CF-End2 frame, the basic NAV is reset.

When the basic NAV is extended, the STA, for example, extracts the TXOP holder from the original frame in which the NAV is extended, and overwrites the held TXOP holder with the extracted TXOP holder.

When the STA limits the holding condition for the TXOP holder of the basic NAV to, for example, the reception of a physical packet transmitted from the same ESS or to the reception of a physical packet transmitted from an AP in the same ESS, if the STA receives a physical packet not for holding the TXOP holder to set the basic NAV, the STA leaves the TXOP holder (specifically, a storage area therefor) empty (void). When the basic NAV is extended by receiving a physical packet make the TXOP holder empty (void), if the TXOP holder is held, the TXOP holder is made empty (void). The STA does not reset the basic NAV if the TXOP holder is not held (that is, if it is empty (void)) when the STA receives the CF-End2 frame.

The following is a description of a configuration of the AP or STA.

FIG. 29 is a functional block diagram of an AP 400. The AP 400 includes a communication processing unit 401, a transmission unit 402, a reception unit 403, d plurality of antennas 42A, 42B, 42C, and 42D, a network processing unit 404, a wired interface (I/F) 405 and a memory 406. The AP 400 is connected to a server 407 via the wired I/F 405. The communication processing unit 401 has a function similar to that of the MAC common processing unit 70 shown in FIG. 2. The transmission unit 402 has a function similar to that of the transmission processing unit 80 shown in FIG. 2. The reception unit 403 has a function similar to that of the reception processing unit 90 shown in FIG. 2. The network processing unit 404 has a function similar to that of the higher layer processing unit 10 shown in FIG. 2. The communication processing unit 401 may include a buffer for transmitting data to and receiving data from the network processing unit 404. The buffer may be a volatile memory such as a DRAM or a nonvolatile memory such as a NAND memory and an MRAM.

The network processing unit 404 controls data exchange with the communication processing unit 401, data writing to/reading from the memory 406, and communication with the server 407 via the wired I/F 405. The network processing unit 404 may perform a communication process for a higher layer of a MAC layer, such as a TCP/IP layer and a UDP/IP layer, and a process for an application layer. The operation of the network processing unit 404 may be performed by software (programs) executed by a processor such as a CPU, by hardware, or by both software and hardware.

As an example, the communication processing unit 401 corresponds to a baseband integrated circuit, and the transmission unit 402 and reception unit 403 correspond to an RF integrated circuit that transmits and receives a frame. The communication processing unit 401 and network processing unit 404 may be configured by one integrated circuit (one chip). A portion of each of the transmission unit 402 and reception unit 403, which performs a process for a digital signal and a portion thereof which performs a process for an analog signal may be configured by different chips. In addition, the communication processing unit 401 may perform a communication process for a higher layer of the MAC layer, such as the TCP/IP layer and UDP/IP layer. The number of antennas is four, but may be at least one.

The memory 406, for example, stores data received from the server 407 and data received by the reception unit 403. The memory 406 may be, for example, a volatile memory such as a DRAM or a nonvolatile memory such as a NAND memory and an MRAM. The memory 406 may be an SSD, an HDD, an SD card, an eMMC, or the like. The memory 406 may be provided outside the AP 400.

The wired I/F 405 transmits data to and receives data from the server 407. In FIG. 29, the AP 400 communicates with the server 407 by wire, but communicates with the server 407 by radio. In this case, a wireless I/F has only to be used in place of the wired I/F 405.

The server 407 is a communication device that receives a data transfer request requesting the transmission of data and returns a response including the requested data. As the communication device, for example, an HTTP server (Web server) and an FTP server are used. However, the communication device is not limited to these servers as long as it has a function of returning the requested data. The communication device may be one operated by d user, such as d PC and a smartphone. Also, the communication device may communicate with the AP 400 wirelessly.

When the STA included in the BSS of the AP 400 issues a data transfer request to the server 407, a packet regarding the data transfer request is transmitted to the AP 400. The AP 400 receives the packet via the antennas 42A, 42B, 42C, and 42D. The reception unit 403 performs, for example, a process for the physical layer, and the communication processing unit 401 performs, for example, a process for the MAC layer.

The network processing unit 404 analyzes the packet received from the communication processing unit 401. Specifically, the network processing unit 404 confirms a destination IP address, a destination port number and the like. If the data of the packet is a data transfer request such as an HTTPGET request, the network processing unit 404 determines whether the data requested by the data transfer request (for example, data that is included in a URL requested by the HTTPGET request) is cached (stored) in the memory 406.

The memory 406 stores a table in which URLs (or their reduced expressions, such as hash values and alternative identifiers) and data are associated with each other. Here, the fact that data is cached in the memory 406 is expressed as the existence of cache data in the memory 406.

When no cache data exists in the memory 406, the network processing unit 404 transmits a data transfer request to the server 407 via the wired I/F 405. That is, the network processing unit 404 transmits a data transfer request to the server 407 as a representative of the STA. Specifically, the network processing unit 404 generates an HTTP request, performs a protocol process such as addition of a TCP/IP header, and transfers the packet to the wired I/F 405. The wired I/F 405 transmits the received packet to the server 407.

The wired I/F 405 receives from the server 407 a packet that is a response to the data transfer request. The network processing unit 404 determines that a received packet is addressed to the STA based on the IP header of the packet received via the wired I/F 405, and transfers the packet to the communication processing unit 401. The communication processing unit 401 performs, for example, a process of the MAC layer for the packet. The transmission unit 402 performs, for example, a process of the physical layer for the packet to transmit the packet addressed to the STA from the antennas 42A, 42B, 42C, and 42D. The network processing unit 404 stores the data received from the server 407 in the memory 406 as cache data in association with the URL (or its reduced expression).

If the cache data exists in the memory 406, the network processing unit 404 reads data requested by the data transfer request from the memory 406 and transmits the data to the communication processing unit 401. Specifically, the network processing unit 404 adds, for example, an HTTP header to the data read from the memory 406 to perform a protocol process such as addition of a TCP/IP header and transmits a packet to the communication processing unit 401. At this time, as an example, the transmission source IP address of the packet is set to the same IP address as that of the server 407, and the source port number is also set to the same port number as that of the server 407 (the destination port number of a packet transmitted by the STA that has issued the data transfer request to server 407). When viewed from the STA, it appears as if the STA communicates with the server 407. The communication processing unit 401 performs, for example, a process of the MAC layer for the packet, and the transmission unit 402 performs, for example, a process of the physical layer to transmit the packet addressed to the STA from the antennas 42A, 42B, 42C, and 42D.

With the above operation, a response will be made to frequently accessed data based on the cached data stored in the memory 406, with the result that traffic between the server 407 and the AP 400 can be reduced. Note that the operation of the network processing unit 404 is not limited to the foregoing operation. Another operation may be performed as long as it is a general cache proxy which obtains data from the server 407 in place of the STA, caches the data in the memory 406, and responds to a data transfer request for the same data from the cached data in the memory 406.

The AP described with reference to at least one of FIGS. 1 to 28 can be used as the AP 400. The frames, data, or packets described with reference to FIGS. 1 to 28 may be transmitted using the cached data stored in the memory 406. In addition, information obtained in the frames, data, or packets received by the AP described with reference to FIGS. 1 to 28 may be cached in the memory 406. The frames transmitted by the AP described with reference to FIGS. 1 to 28 may include cached data or information based on that data. The information based on the data may be, for example, information on the presence or absence of data addressed to the STA, information on the size of data, or information on the size of a packet necessary for data transmission. The information may also be information of, for example, a modulation method necessary for data transmission.

The AP having a cache function has been described with reference to FIG. 29. An STA having a cache function can be achieved with the same block configuration as that of FIG. 29. This STA is a non-AP STA (as described above, the AP is also a form of a wireless communication device). In this case, the wired I/F 405 may be excluded. The transmission of frames, data, or packets by the STA described with reference to FIGS. 1 to 28 may be performed using cached data stored in the memory 406. In addition, the information obtained in frames, data or packets received by the STA described with reference to FIGS. 1 to 28 may be cached in the memory 406. The frames transmitted by the STA described with reference to FIGS. 1 to 28 may include cached data or information based on the data. The information based on the data may be, for example, information on the presence or absence of data to be transmitted, information on the size of data or information on the size of a packet necessary for data transmission. The information may also be information of, for example, a modulation method necessary for data transmission.

FIG. 30 shows an example of the overall configuration of the STA (non-AP STA) or the AP. This configuration is not limited to example. The STA or AP includes one or more antennas $147_1$ to $147_n$ (n is an integer of 1 or more), a wireless LAN module (or wireless communication device) 148, and a host system 149. The wireless LAN module 148 includes a host interface and is connected to the host system 149 via the host interface. The wireless LAN module 148 is connected to the host system 149 via a connection cable, and may also be directly connected thereto. In addition, the wireless LAN module 148 can be so configured that it is mounted on a substrate by solder or the like and connected to the host system 149 via a line of the substrate. The host system 149 communicates with an external device using the wireless LAN module 148 and the antenna $147_1$ to $147_n$ in accordance with an optional communication protocol. The communication protocol may include a TCP/IP and its higher-layer protocol. Alternatively, the TCP/IP may be provided for the wireless LAN module 148, and the host system 149 may execute only the higher-layer protocol. In this case, the configuration of the host system 149 can be simplified. The STA shown in FIG. 30 may be a mobile STA, a TV set, a digital camera, a wearable device, a tablet, a smartphone, a game device, a network storage device, a monitor, a digital audio player, a web camera, a video camera, a projector, a navigation system, an external adapter, an internal adapter, a set-top box, a gateway, a printer server, a mobile access point, a router, an enterprise/service provider access point, a portable device, a handheld device, an automobile, and the like. The wireless LAN module 148 may include not only the function of IEEE 802.11 but also the functions of other wireless communication standards such as long term evolution (LTE) and LTE-advanced (standards for mobile phones).

FIG. 31 shows a hardware configuration example of the wireless LAN module 148. This configuration example is applicable when the wireless LAN module 148 is mounted on either the non-AP STA or the AP. In this configuration example, only one antenna is provided, but two or more antennas may be provided. In this case, a plurality sets of a transmission system (216, 222 to 225), a reception system (217, 232 to 235), a PLL 242, a crystal oscillator (reference signal source) 243, and a switch 245 may be arranged to correspond to their respective antennas, and each of the sets may be connected to a baseband circuit 212. The PLL 242 or crystal oscillator 243 or both correspond to an oscillator.

The wireless LAN module 148 includes a baseband integrated circuit (IC) 211, a radiofrequency (RF) IC 221, a balun 225, a switch 245, and an antenna 247.

The baseband IC 211 includes the baseband circuit (control circuit) 212, a memory 213, a host interface 214, a CPU 215, a digital-to-analog converter (DAC) 216, and an analog-to-digital converter (ADC) 217.

The baseband IC 211 and RF IC 221 may be formed on the same substrate. The baseband IC 211 and RF IC 221 may also be configured by one chip. Both or either of the DAC 216 and ADC 217 may be located on the RF IC 221 or on another IC. Either or both of the memory 213 and CPU 215 may be located on an IC other than the baseband IC 211.

The memory 213 stores data to be transferred to and to be received from the host system. The memory 213 also stores information to be notified to the STA or AP, information notified by the STA or AP, or both the information. The memory 213 may also store programs necessary for executing the CPU 215 and may be used as a work area when the CPU 215 executes the programs. The memory 213 may be a volatile memory such as an SRAM and a DRAM or a nonvolatile memory such as a NAND memory and an MRAM.

The host interface 214 is an interface for connecting to the host system. Any interface such as UART, SPI, SDIO, USB and PCI Express can be used.

The CPU 215 is a processor that controls the baseband circuit 212 by executing a program. The baseband circuit 212 mainly performs a process for the MAC layer and physical layer. The baseband circuit 212, CPU 215, or both correspond to a communication control device or a controller that controls communications.

At least one of the baseband circuit 212 and CPU 215 includes a clock generator that generates a clock. The internal time is managed by the clock generated by the clock generator.

The baseband circuit 212 performs a physical layer process for a frame to be transmitted, such as addition of a physical header, encoding, encryption, and modulation and generates, for example, two different digital baseband signals (referred to as a digital I signal and a digital Q signal hereinafter).

The DAC 216 converts a signal supplied from the baseband circuit 212 to an analog signal. More specifically, the DAC 216 converts the digital I signal to an analog I signal and converts the digital Q signal to an analog Q signal. Note that there may be a case where a signal is transmitted as a single-system without orthogonal modulation. When a plurality of antennas are provided and single-system or plural-system signals are distributed to the antennas, respectively, the number of DACs or the like has only to correspond to the number of antennas.

As one example, the RF IC 221 is an RF analog IC, an RF IC, or both. The RF IC 221 includes a filter 222, a mixer 223, a preamplifier (PA) 224, and a phase locked loop (LLP) 242, a low noise amplifier (LNA), a balun 235, a mixer 233, and a filter 232. Some of these elements may be located on the baseband IC 211 or another IC. The filters 222 and 232 may be band-pass filters or low-pass filters.

The filter 222 extracts a signal of a desired band from each of the analog I and Q signals supplied from the DAC 216. The PLL 242 divides and/or multiplies the oscillation signal supplied from the crystal oscillator 243 to generate a signal of a constant frequency, which is synchronized with the phase of an input signal. Note that the PLL 242 includes a voltage controlled oscillator (VCO) and performs feedback control using the VCO in response to the oscillation signal from the crystal oscillator 243 to obtain a signal of the constant frequency. The generated signal of the constant frequency is input to the mixers 223 and 233. The PLL 242 corresponds to an example of an oscillator that generates a signal of a constant frequency.

The mixer 223 up-converts the analog I and Q signals, which have passed through the filter 222, to analog I and Q signals of radio frequency using the signal of the constant frequency supplied from the PLL 242. The preamplifier (PA) 224 amplifies the analog I and Q signals of radio frequency generated by the mixer 223 to a signal of a desired output power. The balun 225 is a converter that converts a balanced signal (differential signal) into an unbalanced signal (single-ended signal). In the RF IC 221, the balanced signal is used, but the unbalanced signal is used from the output of the RF IC 221 to the antenna 247. These signals are thus converted by the balun 225.

The switch 245 is connected to the balun 225 on the transmission side for transmission, and is connected to the RF IC 221 or the balun 235 on the reception side for reception. The control of the switch 245 may be performed by the baseband IC 211 or the RF IC 221, or by another circuit.

The analog I and Q signals of radio frequency amplified by the preamplifier 224 are subjected to balanced-unbalance conversion by the balun 225, and then are radiated from the antenna 247 to the space as radio waves.

The antenna 247 may be a chip antenna, an antenna formed by lines on a printed circuit board, or an antenna formed using a linear conductor element.

The LNA 234 in the RF IC 221 amplifies the signal received from the antenna 247 via the switch 245 to a signal of a demodulable level with low noise. The balun 235 unbalanced-to-balanced-converts the signal amplified by the LNA 234. The mixer 233 down-converts the received signal converted to a balanced signal by the balun 235 to a baseband signal using the signal of the constant frequency supplied from the PLL 242. More specifically, in response to the signal of the constant frequency supplied from the PLL 242, the mixer 233 includes a means for generating carriers whose phases are 90° shifted from each other to quadrature-demodulate the received signal converted by the balun 235 by the carriers and thus generate an in-phase (I) signal having the same phase as the received signal and a quad-phase (Q) signal whose phase is delayed by 90°. The filter 232 extracts a signal of a desired frequency component from the I and Q signals. The I and Q signals extracted by the filter 232 are output from the PF IC 221 after their gains are adjusted.

The ADC 217 in the baseband IC 211 AD-converts an input signal from the RF IC 221. More specifically, the ADC 217 converts the I signal to a digital I signal and converts the Q signal to a digital Q signal. Note that there may be a case where only a one-system signal is received without orthogonal demodulation.

If a plurality of antennas are provided, ADCs 217 the number of which corresponds to the number of antennas may be provided. In response to the digital I and Q signals, the baseband circuit 212 performs a physical layer process, such as a demodulation process, an error correction encode process, a physical header process, and the like to generate a frame. The baseband circuit 212 performs a MAC layer process for the frame. Note that the baseband circuit 212 may be configured to perform a TCP/IP process when a TCP/IP is implemented.

FIGS. 32A and 32B are perspective views of another two examples of the wireless STA. The wireless STA in FIG. 32A is a notebook PC 301, and the wireless STA in FIG. 32B is a mobile terminal 321. The notebook PC 301 and mobile terminal 321 are equipped with wireless communication devices 305 and 315, respectively. As the wireless communication devices 305 and 315, the wireless communication device mounted on the STA and/or the wireless communication device mounted on the AP, which have been so far described, can be used. The wireless STA equipped with a wireless communication device is not limited to a notebook PC or a mobile terminal. For example, the wireless STA can be mounted on a TV set, a digital camera, a wearable device, a tablet, a smartphone, a game device, a network storage device, a monitor, a digital audio player, a web camera, a video camera, a projector, a navigation system, an external adapter, an internal adapter, a set-top box, a gateway, a printer server, a mobile access point, a router, an enterprise/service provider access point, a portable device, a handheld device, an automobile, and the like.

The wireless communication device mounted on the wireless STA and/or AP can also be mounted on a memory card. FIG. 33 shows an example in which the wireless communication device is mounted on a memory card. The memory card 331 includes a wireless communication device 355 and a memory card body 332. The memory card 331 utilizes the wireless communication device 355 for wireless communication with an external device (wireless STA and/or AP). Note that other elements (for example, a memory) in the memory card 331 are excluded from FIG. 33.

Another example of the wireless communication device (wireless communication device of AP and/or wireless communication device of wireless STA) will be described. This examples may include a bus, a processor unit, and an external interface unit. The processor unit and the external interface unit are connected to an external memory (buffer) via the bus. Firmware runs on the processor unit. If the wireless communication device is configured to include firmware, its function can easily be changed by rewriting the firmware. The processor unit on which the firmware runs may be a processing unit or a processor that performs a process of the processing unit, or may be another processor that performs a process of expanding or modifying a function of the process. An AP and/or a wireless STA include the processor unit on which firmware runs. Alternatively, the processor unit may be included in an integrated circuit in the wireless communication device mounted on the AP or an integrated circuit in the wireless communication device mounted on the wireless STA.

The wireless communication device (wireless communication device of AP and/or wireless communication device of wireless STA) according to the foregoing embodiment may also include a clock generation unit. The clock generation unit generates a clock and outputs it from an output terminal to the outside of the radio communication device. If the clock generated at the interior of the wireless communication device is output to the outside, and the host is operated by the clock, the host and the wireless communication device can be operated in synchronization with each other.

The wireless communication device (wireless communication device of AP and/or wireless communication device of wireless STA) according to the foregoing embodiment may also include a power supply unit, a power control unit, and a wireless power feeding unit. The power control unit is connected to the power supply unit and the wireless power feeding unit to select a power supply that supplies power to the wireless communication device. The power supply is controlled to decrease power consumption.

The wireless communication device according to the foregoing embodiment may also include a SIM card. The SIM card is connected to, for example, a control unit in a wireless communication device. The SIM card makes it possible to perform an authentication process easily.

The wireless communication device according to the foregoing embodiment may also include a moving image compression/expansion unit. The moving image compression/expansion unit is connected to the bus. The moving image compression/expansion unit makes it possible to transmit the compressed moving image and expand the received compressed moving image easily.

The wireless communication device (wireless communication device of AP and/or wireless communication device of wireless STA) according to the foregoing embodiment may also include an LED unit. The LED unit is connected to the transmission unit, the reception unit, the control unit, or some of these units. The LED unit makes it possible to easily notify a user of the operating state of the wireless communication device.

The wireless communication device (wireless communication device of AP and/or wireless communication device of wireless STA) according to the foregoing embodiment may also include a vibrator unit. The vibrator unit is connected to, for example, the control unit in the wireless communication device. The vibrator unit makes it possible to easily notify a user of the operating state of the wireless communication device.

The wireless communication device (wireless communication device of AP and/or wireless communication device of wireless STA) according to the foregoing embodiment may also include a display. The display may be connected to the control unit of the wireless communication device via a bus. The display can thus display the operating state of the wireless communication device to notify a user of the operating state easily.

The following are descriptions of [1] a frame type in the wireless communication system, [2] a method of disconnecting wireless communication devices, [3] an access method of the wireless LAN system, and [4] a frame interval of the wireless LAN.

[1] Frame Type in Wireless Communication System

In general, the frames handled on wireless access protocols in the wireless communication system are roughly classified into three types, which are the data frame, Management frame, and Control frame. These types are usually indicated by a header portion common to the frames. The three different frames may be displayed to be distinguished by one field or by the combination of two fields. According to IEEE 802.11 standard, a frame type is identified by two fields of Type and Subtype in the Frame Control field in the header portion of a MAC frame. The rough classification among the data frame, Management frame, and Control frame is performed in the Type field, and the subclassification among the roughly-classified frames, such as the identification of the Beacon frame in the Management frame, is performed in the Subtype field.

The Management frame is used to manage a physical communication link between wireless communication devices. For example, there are a frame for performing communication setting between wireless communication devices, a frame for releasing (that is, disconnecting) a communication link, and a frame for performing a power save operation in the wireless communication device.

The data frame is a frame for transmitting data generated in a wireless communication device to another wireless communication device after the former wireless communication device establishes a physical communication link with the latter wireless communication device. The data is generated in the higher layer of the embodiment through a user's operation, for example.

The Control frame is a frame used to control transmission/reception (exchange) of the data frame between wireless communication devices. When a wireless communication device receives the data frame and Management frame, a response frame to be transmitted for acknowledgment of the reception belongs to the Control frame. The response frame is, for example, the ACK frame or BlockACK frame. The RTS frame and CTS frame are also the Control frames.

The above three different frames are transmitted as physical packets via an antenna through a process as required in the physical layer. IEEE 802.11 standard (including an extended standard such as IEEE Std 802.11ac-2013 described above) includes an association process as one of the procedures for establishing a connection. In the association process, an AssociationRequest frame and an AssociationResponse frame are used, and these frames are Management frames and also unicast Management frames. Thus, the AssociationRequest frame and AssociationResponse frame request the reception-side wireless communication device to transmit the ACK frame which is a response frame. The ACK frame is the Control frame as described above.

[2] Method of Disconnecting Wireless Communication Devices

The disconnecting (releasing) method includes an explicit method and an implicit method. In the explicit method, either one of the wireless communication devices establishing a connection transmits a frame for disconnection. This frame corresponds to the Deauthentication frame in IEEE 802.11 standard and is classified as the Management frame. Normally, the wireless communication device on the transmission side determines a disconnection when it transmits the frame for disconnection, and the wireless communication device on the reception side determines a disconnection when it receives the frame for disconnection. If the wireless communication device is a non-AP wireless communication device, it returns to an initial state in the communication phase, such as a state of searching for a BSS to be connected. When a wireless communication AP is disconnected from a certain wireless communication device, if the wireless communication AP includes a connection management table for managing a wireless communication device that enters the BSS itself, information concerning the wireless communication device is deleted from the connection management table. For example, when the wireless communication AP permits each wireless communication device that enters the BSS itself to be connected in the association process, if an AID is allocated, holding information associated with the AID of a disconnected wireless communication device may be deleted, and the AID may be released and allocated to a newly entered wireless communication device.

In the implicit method, when a wireless communication device does not detect a frame (Data and Management frames or a response frame) transmitted from another wireless communication device that has established a connection thereto for a fixed period of time, it determines whether they are disconnected. This implicit method is based on the reason that in the foregoing disconnection determination, a physical wireless link cannot be secured such as that a wireless communication device cannot receive a wireless signal or decode it because a communication distance between the wireless communication device and another one connected thereto, that is, it cannot receive a frame for disconnection.

A specific example of determining a disconnection in the implicit method is the use of a timer. For example, when a data frame requesting an acknowledgement response frame is transmitted, a first timer (for example, a retransmission timer for the data frame) that limits a retransmission period of the data frame is started. The data frame is retransmitted if an acknowledgement response frame to the data frame is not received until the first timer expires (that is, until d desired retransmission period elapses). The first timer is stopped when the acknowledgement response frame is received.

On the other hand, when the first timer expires without receiving an acknowledgement response frame, for example, a wireless communication device transmits a Management frame for confirming whether there is still a wireless communication device connected thereto (in a communication range) (in other words, whether a wireless link can be secured) and at the same time starts a second timer (for example, a retransmission timer for Management frame) for limiting a retransmission period of the Management frame. If no acknowledgement response frame to the frame is received until the second timer expires like the first timer, the frame is retransmitted, and it is determined that the wireless communication device is disconnected if the second timer expires. When it is determined that the wireless communication device is disconnected, a frame for the disconnection may be transmitted.

Alternatively, when a wireless communication device receives a frame from another wireless communication device connected thereto, it starts a third timer, stops the third timer each time it receives a frame from said the other wireless communication device, and starts the third timer again from the initial value. If the third timer expires, as described above, a wireless communication device transmits a Management frame for confirming whether there is still a wireless communication device connected thereto (in a communication range) (in other words, whether a wireless link can be secured) and at the same time starts the second timer (for example, a retransmission timer for Management frame) for limiting a retransmission period of the Management frame. In this case, too, if no acknowledgement response frame to the frame is received until the second timer expires like the first timer, the frame is retransmitted, and it is determined that the wireless communication device is disconnected if the second timer expires. In this case, too, when it is determined that the wireless communication device is disconnected, a frame for the disconnection may be transmitted. The Management frame in the latter case may be different from that in the former case. As a timer for limiting the retransmission of the Management frame in the latter case, the same timer as in the former case is used as the second timer, but a different timer may be used.

[3] Access Method of Wireless LAN System

For example, there is a wireless LAN system in which a plurality of wireless communication devices communicate with each other or a plurality of wireless communications collide with each other In IEEE 802.11 wireless LAN, carrier sense multiple access with carrier avoidance (CSMA/CA) is the basis of the access method. In a method in which a plurality of wireless communication devices detect the transmission of a certain wireless communication device and transmit a frame after a fixed period of time has elapsed from the end of the detected transmission, the wireless communication devices transmit the frames simultaneously, with the result that wireless signals collide and the wireless communication devices fail in frame transmission. If the wireless communication devices detect the transmission of a certain wireless communication device and wait for a random period of Lime after the end of the detected transmission, the transmission of the wireless communication devices that has detected the transmission of the certain wireless communication device is distributed probabilistically. If, therefore, one wireless communication device selects the shortest time from the random period of time, it succeeds in frame transmission to prevent the frames from colliding with each other. The obtainment of transmission opportunity is made fair among a plurality of wireless communication devices on the basis of random values. The method employing the carrier avoidance can be said to be a method suitable to share a wireless medium among the wireless communication devices.

[4] Frame Interval of Wireless LAN

The frame interval used in IEEE 802.11 wireless LAN includes a distributed coordination function interframe space (DIFS), an arbitration interframe space (AIFS), a point coordination function interframe space (PIFS), a short interframe space (SIFS), an extended interframe space (EIFS), a reduced interframe space (RIFS), and the like.

The frame interval is defined in IEEE 802.11 wireless LAN system as a continuous period set before transmission upon confirming a carrier sense idle. A period from the exact preceding frame is not discussed. The definition is thus followed in the description of IEEE 802.11 wireless LAN system. In IEEE 802.11 wireless LAN system, the waiting time for random access based on the CSMA/CA is defined as the sum of fixed time and random time to clarify the fixed time.

The DIFS and AIFS are frame intervals used based on the CSMA/CA when a wireless communication device attempts to start to exchange frames during a contention period of time during which communication of another wireless communication device collides with communication of the device itself. The DIFS is used when no priorities are assigned by a traffic identifier (TID), and the AIFS is used when priorities are assigned by the TID.

Since the operations regarding the DIFS and AIFS are similar, the operation regarding the AIFS will mainly be described below. In IEEE 802.11 wireless LAN, access control including the start of frame exchange is performed on the MAC layer. In addition, in the case of quality of service (QoS) is performed when data is transferred from the higher layer, a traffic type is notified together with data, and the data is classified in priority at the time of access based on the traffic type. This classification will be referred to as an access category (AC). Accordingly, the value of AIFS is set for each access category.

PIFS is a frame interval for allowing a wireless communication device to perform access with higher priority than other competing wireless communication devices, and is shorter than the DIFS and AIFS. The SIFS is a frame interval that can be used when a wireless communication device continues a frame exchange in a burst when it transmits the Control frame which is a response system or after it obtains transmission opportunity. The EIFS is a frame interval that is activated when a wireless communication device fails in its frame reception (when it determines that the received frame is an error).

The RIFS is a frame interval which can be used when a wireless communication device transmits a plurality of frames continuously to the same wireless communication device in a burst after it obtains transmission opportunity. The wireless communication device does not require a response frame from a wireless communication device of the transmission partner during the RIFS.

FIG. 34 shows an example of frame exchange in a collision period based on the random access in IEEE 802.11 wireless LAN.

Assume that a wireless communication device determines a medium to be busy (a busy medium) as a result of carrier sense when it is requested to transmit a data frame (W_DATA field1). In this case, the wireless communication device transmits the data frame W_DATA field1 to another wireless communication device during the random backoff time after the AIFS of a fixed time from when the carrier sense becomes idle. If the wireless communication device determines that a medium is not busy but idle as a result of the carrier sense, it transmits the data frame W_DATA field1 to another wireless communication device when the AIFS of the fixed time has elapsed from a time when the carrier sense is started.

The random time is given as an integer from 0 by multiplying a pseudorandom integer derived from a uniform distribution in the contention window (CW) by slot time. Multiplying the CW by the slot time is called a CW time width. The initial value of the CW is given by CWmin, and the value of the CW is increased to CWmax each time it is retransmitted. CWmin and CWmax each have a value for each access category just like the AIFS. The wireless communication device of the transmission destination of W_DATA field1 successfully receives the data frame, and transmits a response frame (W_ACK1) after SIFS time from the time of termination of occupation of a physical packet including the data frame on a wireless medium if the data frame is a frame requesting transmission of the response frame. When the wireless communication device that has transmitted the W_DATA field1 receives the W_ACK1, it can transmit the next frame (e.g., W_DATA field2) within the transmission burst time limit and after SIFS time from the time of termination of occupation of a physical packet including the W_ACK1 on a wireless medium.

AIFS, DIFS, PIFS, and EIFS are functions of SIFS and slot time. The SIFS and slot time are defined for each physical layer. The parameters whose values are set for each access category, such as AIFS, CWmin, and CWmax, can be set for each communication group (Basic Service Set (BSS) in IEEE 802.11 wireless LAN), but default values are set thereto.

For example, in 802.11ac standard, SIFS is 16 μs and the slot time is 9 μs. Accordingly, PIFS is 25 μs and the DIFS is 34 μs. In the AIFS, the frame interval whose access category is BACKGROUND (AC_BK) has a default value of 79 μs, the frame interval whose access category is BESTEFFORT (AC_BE) has a default value of 43 μs, and the frame interval whose access category is VIDEO (AC_VI) and VOICE (AC_VO) has a default value of 34 μs. The default values of CWmin and CWmax are 31 and 1023 for AC_BK and AC_BE, 15 and 31 for AC_VI, and 7 and 15 for AC_VO. Note that the EIFS is basically the sum of SIFS, DIFS, and the time length of a response frame when it is transmitted at the lowest essential physical rate. A wireless communication device capable of having an efficient EIFS can estimate the occupancy time length of a physical packet transferring a response frame to the physical packet that has activated the EIFS, thus making it the sum of SIFS, DIFS, and estimated time.

The frames of the embodiment may be referred to as packets in IEEE 802.11 standard or a standard conforming thereto, such as a Null Data Packet.

The frames to be multiplexed by a plurality of STAs may have different contents or the same content. In the wording "a plurality of STAs transmit or receive X frames", generally, the contents of the X frames may be the same or different. X is an optional value.

The terms used in the embodiment should be broadly interpreted. For example, the term "processor" may include a general-purpose processor, a central processing unit (CPU), a microprocessor, a digital signal processor (DSP), a controller, a microcontroller, a state machine, and the like. According to the circumstances, the "processor" may refer to an application-specific integrated circuit (ASIC), a field programmable gate array (FPGA), a programmable logic circuit (PLD), and the like. The term "processor" may refer to a combination of processing devices, such as a plurality of microprocessors, a combination of DSPs and microprocessors, and one or more microprocessors cooperating with a DSP core.

As another example, the term "memory" may include electronic components capable of storing electronic information. The "memory" may refer to a random access memory (RAM), a read-only memory (ROM), a programmable read-only memory (PROM), an erasable programmable read-only memory (EPROM), an electrically erasable PROM (EEPROM), a non-volatile random access memory (NVRAM), a flash memory, and a magnetic or optical data storage, information of which can be read by a processor. It can be said that the memory electrically communicates with the processor if the processor reads information from and/or writes information to the memory. The memory may be integrated with the processor and, in this case, too, it can be said that the memory electrically communicates with the processor. The circuit may be a plurality of circuits arranged on a single chip, or may be one or more circuits distributed on a plurality of chips or a plurality of devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device in a first wireless communication group,
   wherein:
   the first wireless communication group includes a first terminal;
   the first wireless communication group and a second wireless communication group are in an extended service set;
   the second wireless communication group includes a second wireless communication device and a second terminal;
   the wireless communication device is configured to:

receive a first frame for allocating a part of a first transmission opportunity of a communication medium to the wireless communication device, the transmission opportunity being obtained by the second wireless communication device; and transmit a second transmission frame to the first terminal when using the part, the second transmission frame including a first field including information indicating the part;

the first terminal is configured to generate first information indicating that the communication medium is virtually busy during the part based on the information in the first field, and to transmit a third frame including the first information in response to the second transmission frame;

the part of the first transmission opportunity includes a first channel;

the first terminal is configured to transmit the third frame using a second channel; and the second channel overlaps the first channel.

2. The wireless communication device of claim 1, wherein:

the wireless communication device is configured to transmit a physical packet to the first terminal when using the part; and the physical packet includes a physical header including a second field including the information indicating the part.

3. The wireless communication device of claim 2, wherein the first terminal is configured to generate information indicating that the communication medium is busy during the part based on the information in the second field.

4. The wireless communication device of claim 1, wherein the wireless communication device is configured to:

acquire a transmission opportunity of a packet;

acquire a second transmission opportunity of the communication medium; and transmit a fourth frame to the second wireless communication device, wherein the fourth frame is for allocating a part of the second transmission opportunity to the second wireless communication device.

5. The wireless communication device of claim 4, wherein:

the fourth frame includes a third field and a fourth field;

the third field includes information indicating the part of the second transmission opportunity; and the fourth field includes an identifier of the second wireless communication device.

6. The wireless communication device of claim 5, wherein:

the wireless communication device is configured to allocate the part of the second transmission opportunity to the first terminal by using the fourth frame;

the fourth field includes the identifier of the second wireless communication device or an identifier of the first terminal;

the identifier of the first terminal has a value in a first range;

the identifier of the second wireless communication device has a value in a second range; and the second range is different from the first range.

7. The wireless communication device of claim 1, wherein:

the wireless communication device conforms to 802.11ax standard; and the first field is a Duration/ID field.

8. The wireless communication device of claim 2, wherein:

the wireless communication device conforms to 802.11ax standard; and the second field is a TXOP field.

9. The wireless communication device of claim 5, wherein:

the wireless communication device conforms to 802.11ax standard; and the fourth field is an AID12 field.

* * * * *